US012766735B2

(12) United States Patent
McCall et al.

(10) Patent No.: US 12,766,735 B2
(45) Date of Patent: Oct. 20, 2026

(54) EXTERIOR COVERING SYSTEM FOR A HUMANOID ROBOT

(71) Applicant: FIGURE AI INC., San Jose, CA (US)

(72) Inventors: David McCall, San Jose, CA (US); Brett Adcock, San Jose, CA (US)

(73) Assignee: FIGURE AI INC., San Jose, CA (US)

( * ) Notice: Subject to any disclaimer, the term of this patent is extended or adjusted under 35 U.S.C. 154(b) by 0 days.

(21) Appl. No.: 19/381,887

(22) Filed: Nov. 6, 2025

(65) Prior Publication Data

US 2026/0061625 A1 Mar. 5, 2026

Related U.S. Application Data

(63) Continuation of application No. 19/066,122, filed on Feb. 27, 2025, which is a continuation-in-part of application No. 29/889,764, filed on Apr. 17, 2023.

(60) Provisional application No. 63/759,665, filed on Feb. 18, 2025, provisional application No. 63/757,440, filed on Feb. 12, 2025, provisional application No. 63/697,793, filed on Sep. 23, 2024, provisional (Continued)

(51) Int. Cl.

| | |
|---|---|
| ***B25J 11/00*** | (2006.01) |
| ***B25J 9/00*** | (2006.01) |
| ***B25J 19/00*** | (2006.01) |

(52) U.S. Cl.

CPC ......... *B25J 11/0015* (2013.01); *B25J 9/0009* (2013.01); *B25J 19/00* (2013.01)

(58) Field of Classification Search

USPC .................................................. 700/245–264

See application file for complete search history.

(56) References Cited

U.S. PATENT DOCUMENTS

| | | | |
|---|---|---|---|
| 552,557 | A | 1/1896 | Weber |
| 1,290,140 | A | 1/1919 | Elleby |

(Continued)

FOREIGN PATENT DOCUMENTS

| | | |
|---|---|---|
| AU | 202413544 | 7/2024 |
| CA | 137209 | 5/2011 |

(Continued)

OTHER PUBLICATIONS

Available online at https://www.youtube.com/watch?v=DrNcXgoFv20, at least as early as Oct. 18, 2024.

(Continued)

*Primary Examiner* — Jonathan L Sample

(57) ABSTRACT

The present disclosure provides a humanoid robot comprising a torso, at least one limb operably coupled to the torso, an energy attenuation assembly comprising a torso energy attenuation member disposed about at least a portion of the torso and including a plurality of lattice cells, and a cover assembly that includes a torso cover positioned adjacent to at least a portion of the torso energy attenuation member. The plurality of lattice cells may include at least one strut-based lattice cell. The torso cover is configured to stretch, deform, or articulate with movement of the humanoid robot. The cover assembly includes a textile material designed to provide the humanoid robot with an approachable appearance. The humanoid robot may further comprise a plurality of actuators providing greater than 30 degrees of freedom, wherein a majority are coupled to tendons.

25 Claims, 14 Drawing Sheets

Related U.S. Application Data application No. 63/697,816, filed on Sep. 23, 2024, provisional application No. 63/626,028, filed on Feb. 27, 2024.

(56) References Cited

U.S. PATENT DOCUMENTS

| | | | |
|---|---|---|---|
| 2,362,597 A | | 11/1944 | Vince |
| 3,010,223 A | | 11/1961 | Alderson |
| 3,060,445 A | | 10/1962 | Brockman |
| 3,458,864 A | | 8/1969 | Austin |
| D246,201 S | | 10/1977 | Ogawa |
| D251,627 S | | 4/1979 | McQuarrie |
| D255,283 S | | 6/1980 | Piche |
| 4,294,240 A | * | 10/1981 | Thill ...................... A61L 15/12 602/21 |
| 4,678,952 A | | 7/1987 | Peterson |
| 4,804,220 A | | 2/1989 | Rosheim |
| 4,834,761 A | | 5/1989 | Walters |
| 4,986,723 A | | 1/1991 | Maeda |
| D314,465 S | | 2/1991 | Campbell |
| D332,514 S | | 1/1993 | Brandoff |
| 5,280,431 A | | 1/1994 | Summerville |
| 5,394,766 A | | 3/1995 | Johnson |
| 5,447,403 A | | 9/1995 | Engler, Jr. |
| 5,673,367 A | | 9/1997 | Buckley |
| D389,803 S | | 1/1998 | Nishio |
| 5,985,483 A | | 11/1999 | Verhoog |
| D418,276 S | | 1/2000 | Bengtsson |
| D421,329 S | | 3/2000 | Adams |
| 6,477,058 B1 | | 11/2002 | Luebs |
| 6,538,410 B2 | | 3/2003 | Mori |
| D476,404 S | | 6/2003 | Chen |
| 6,732,015 B2 | | 5/2004 | Maeda |
| D502,924 S | | 3/2005 | Sirichai |
| 6,901,313 B2 | | 5/2005 | Mori |
| D505,918 S | | 6/2005 | Conway |
| 6,980,889 B2 | | 12/2005 | Ito |
| 7,024,276 B2 | | 4/2006 | Ito |
| 7,031,806 B2 | | 4/2006 | Kuroki |
| 7,054,718 B2 | | 5/2006 | Miyamoto |
| 7,072,741 B2 | | 7/2006 | Nagashima |
| D526,467 S | | 8/2006 | Kent |
| 7,099,747 B2 | | 8/2006 | Mikami |
| D528,507 S | | 9/2006 | Brown |
| 7,113,849 B2 | | 9/2006 | Kuroki |
| D536,010 S | | 1/2007 | Takahashi |
| D536,859 S | | 2/2007 | Carreras |
| 7,186,212 B1 | * | 3/2007 | McMullen ............ A63H 3/003 600/38 |
| D541,353 S | | 4/2007 | Takahashi |
| 7,230,402 B2 | | 6/2007 | Kumagai |
| D550,735 S | | 9/2007 | Takahashi |
| D555,878 S | | 11/2007 | Bay |
| 7,308,336 B2 | | 12/2007 | Takenaka |
| 7,319,918 B2 | | 1/2008 | Takenaka |
| 7,330,775 B2 | | 2/2008 | Orita |
| 7,337,040 B2 | | 2/2008 | Takenaka |
| 7,379,789 B2 | | 5/2008 | Takenaka |
| 7,386,364 B2 | | 6/2008 | Mikami |
| 7,386,366 B2 | | 6/2008 | Dariush |
| D574,404 S | | 8/2008 | Maisonnier |
| D580,874 S | | 11/2008 | Amidon |
| D588,783 S | | 3/2009 | Olstorn |
| 7,664,569 B2 | | 2/2010 | Shimizu |
| D620,231 S | | 7/2010 | Parker |
| D622,332 S | | 8/2010 | Pence |
| D628,609 S | | 12/2010 | Linn |
| D631,612 S | | 1/2011 | Tajima |
| 7,864,159 B2 | | 1/2011 | Sweetser |
| 7,912,574 B2 | | 3/2011 | Wurman |
| D639,023 S | | 6/2011 | Iamartino |
| D639,025 S | | 6/2011 | Holder |
| 7,966,093 B2 | | 6/2011 | Zhuk |
| D641,137 S | | 7/2011 | Evans |
| D641,808 S | | 7/2011 | Matsuda |
| 8,084,117 B2 | * | 12/2011 | Lalvani .................. B32B 29/00 52/670 |
| D663,101 S | | 7/2012 | Best |
| 8,224,652 B2 | | 7/2012 | Wang |
| D668,758 S | | 10/2012 | Hall |
| 8,315,454 B2 | * | 11/2012 | Tanaka .................. G06N 3/008 706/62 |
| D675,784 S | | 2/2013 | Riahi |
| D677,743 S | | 3/2013 | Koshiishi |
| D685,158 S | | 7/2013 | Lambertz |
| 8,486,507 B2 | * | 7/2013 | De Luca ............ B29C 44/5654 428/137 |
| D687,619 S | | 8/2013 | Savage |
| D687,908 S | | 8/2013 | Hoang |
| 8,511,964 B2 | | 8/2013 | Linn |
| D689,566 S | | 9/2013 | Wong |
| 8,600,550 B2 | | 12/2013 | Kurzweil |
| D698,524 S | | 2/2014 | Roberts |
| D698,525 S | | 2/2014 | Roberts |
| D698,527 S | | 2/2014 | Roberts |
| D698,730 S | | 2/2014 | Hori |
| 8,660,695 B2 | | 2/2014 | De La Rosa Tames |
| 8,676,381 B2 | | 3/2014 | Kwon |
| 8,706,299 B2 | | 4/2014 | Sanders |
| 8,770,749 B2 | | 7/2014 | Mccabe |
| D712,598 S | | 9/2014 | Mehra |
| D712,983 S | | 9/2014 | Gan |
| D714,525 S | | 10/2014 | Payne |
| D717,246 S | | 11/2014 | Ilkhanov |
| 8,942,848 B2 | | 1/2015 | Pratt |
| 8,942,849 B2 | | 1/2015 | Maisonnier |
| D732,999 S | | 6/2015 | Siegel |
| D733,400 S | | 7/2015 | Cunningham |
| D736,496 S | | 8/2015 | Gonzalez |
| 9,134,547 B2 | | 9/2015 | Mccabe |
| D742,622 S | | 11/2015 | Oygarden |
| 9,180,595 B2 | | 11/2015 | Inada |
| 9,205,556 B1 | | 12/2015 | Magnusson |
| 9,205,560 B1 | | 12/2015 | Edsinger |
| D746,550 S | | 1/2016 | Roberts |
| 9,230,159 B1 | | 1/2016 | Vijayanarasimhan |
| D749,821 S | | 2/2016 | Mcclora |
| D749,823 S | | 2/2016 | Grosbøl |
| 9,301,556 B2 | | 4/2016 | Koller |
| 9,302,393 B1 | | 4/2016 | Rosen |
| 9,346,165 B1 | | 5/2016 | Metzger |
| 9,376,151 B2 | | 6/2016 | Park |
| D764,146 S | | 8/2016 | Lopez |
| 9,448,560 B2 | | 9/2016 | Raffaello |
| D770,730 S | | 11/2016 | Borovicka |
| 9,494,415 B2 | | 11/2016 | Sweetser |
| D774,148 S | | 12/2016 | Hong |
| D775,789 S | | 1/2017 | Damon |
| 9,569,976 B2 | | 2/2017 | Krauss |
| 9,574,646 B1 | | 2/2017 | Edsinger |
| 9,575,335 B1 | | 2/2017 | Mccabe |
| 9,592,603 B2 | | 3/2017 | Hardouin |
| D784,657 S | | 4/2017 | Adrovic |
| D784,658 S | | 4/2017 | Adrovic |
| 9,669,280 B2 | | 6/2017 | Hua |
| D794,692 S | | 8/2017 | Haranaka |
| D795,320 S | | 8/2017 | Liu |
| D795,321 S | | 8/2017 | Liu |
| D798,029 S | | 9/2017 | Edmiston |
| D800,229 S | | 10/2017 | Baker |
| 9,789,607 B1 | | 10/2017 | Whitman |
| 9,789,612 B2 | | 10/2017 | Hoffman |
| 9,796,078 B2 | | 10/2017 | Angle |
| 9,821,466 B2 | | 11/2017 | Bingham |
| 9,842,585 B2 | | 12/2017 | Huang |
| D808,127 S | | 1/2018 | Hedrick |
| 9,868,210 B1 | | 1/2018 | Whitman |
| 9,975,248 B2 | | 5/2018 | Stephens, Jr. |
| 9,992,474 B2 | | 6/2018 | Grunnet-Jepsen |
| 10,007,994 B2 | | 6/2018 | Grunnet-Jepsen |
| 10,018,256 B1 | | 7/2018 | Magnusson |
| D831,308 S | | 10/2018 | Lu |
| D833,116 S | | 11/2018 | Rapp |

(56) References Cited

U.S. PATENT DOCUMENTS

| | | | | |
|---|---|---|---|---|
| D835,214 | S | 12/2018 | Xiong | |
| D838,759 | S | 1/2019 | Kowalski | |
| 10,189,158 | B2 | 1/2019 | Edsinger | |
| D841,708 | S | 2/2019 | Koshiishi | |
| 10,203,209 | B2 | 2/2019 | Roumeliotis | |
| 10,213,923 | B2 * | 2/2019 | Corkum | B25J 9/1676 |
| D843,690 | S | 3/2019 | Edmiston | |
| 10,310,362 | B2 | 6/2019 | Grunnet-Jepsen | |
| 10,349,245 | B2 | 7/2019 | Tokuchi | |
| D856,593 | S | 8/2019 | Burke | |
| 10,369,071 | B2 | 8/2019 | Klassen | |
| 10,399,238 | B2 | 9/2019 | Waita | |
| D866,684 | S | 11/2019 | Früh | |
| D868,866 | S | 12/2019 | Gable | |
| D872,152 | S | 1/2020 | Xiong | |
| D873,320 | S | 1/2020 | Clerc | |
| 10,532,464 | B1 | 1/2020 | Guzman | |
| 10,537,998 | B2 | 1/2020 | Salisbury | |
| 10,545,497 | B1 | 1/2020 | Cui | |
| 10,571,896 | B2 | 2/2020 | Benaim | |
| D880,427 | S | 4/2020 | Milroy | |
| D885,451 | S | 5/2020 | Chen | |
| D888,120 | S | 6/2020 | Hurst | |
| D890,102 | S | 7/2020 | Messadek | |
| D892,886 | S | 8/2020 | Klassen | |
| D892,887 | S | 8/2020 | Klassen | |
| D893,573 | S | 8/2020 | Yan | |
| D896,470 | S | 9/2020 | Eckensweiler | |
| 10,780,578 | B2 | 9/2020 | Blankespoor | |
| D898,789 | S | 10/2020 | Nazarikhorram | |
| D900,251 | S | 10/2020 | Ouyang | |
| D901,608 | S | 11/2020 | Okabe | |
| 10,890,921 | B2 | 1/2021 | Gillett | |
| D911,459 | S | 2/2021 | Xiong | |
| 10,921,558 | B2 | 2/2021 | Yao | |
| 10,924,638 | B2 | 2/2021 | Swaminathan | |
| 10,946,528 | B2 | 3/2021 | Gupta | |
| 10,960,539 | B1 | 3/2021 | Kalakrishnan | |
| 10,963,493 | B1 | 3/2021 | Hu | |
| 10,988,192 | B1 | 4/2021 | Thorne | |
| D917,833 | S | 5/2021 | Conway | |
| D918,979 | S | 5/2021 | Mullan | |
| D921,081 | S | 6/2021 | Laplante | |
| D927,134 | S | 8/2021 | Robinson | |
| D932,531 | S | 10/2021 | Xu | |
| 11,179,848 | B2 | 11/2021 | Hume | |
| 11,180,205 | B2 | 11/2021 | Amino | |
| 11,188,821 | B1 | 11/2021 | Kalakrishnan | |
| D938,139 | S | 12/2021 | Alamdar | |
| 11,193,736 | B2 * | 12/2021 | Pope | F41H 5/0485 |
| 11,200,816 | B2 | 12/2021 | Wang | |
| 11,247,738 | B2 | 2/2022 | Lavalley | |
| 11,279,041 | B2 | 3/2022 | Mahoor | |
| 11,292,126 | B2 | 4/2022 | Christensen | |
| 11,333,954 | B2 | 5/2022 | Bull | |
| 11,347,030 | B2 | 5/2022 | Yao | |
| D960,517 | S | 8/2022 | Ejiawoko | |
| 11,416,003 | B2 | 8/2022 | Whitman | |
| 11,433,544 | B2 * | 9/2022 | Deyle | B25J 9/1697 |
| 11,435,745 | B2 | 9/2022 | Lee | |
| 11,457,983 | B1 | 10/2022 | Roh | |
| 11,498,223 | B2 | 11/2022 | Williams | |
| D972,815 | S | 12/2022 | Wang | |
| D975,363 | S | 1/2023 | Paulson | |
| 11,546,504 | B2 | 1/2023 | Kim | |
| 11,554,484 | B2 | 1/2023 | Jung | |
| D981,686 | S | 3/2023 | Hasson | |
| 11,600,010 | B2 | 3/2023 | Doutre | |
| 11,602,853 | B2 | 3/2023 | Stoianovici | |
| 11,612,825 | B2 * | 3/2023 | Hayashi | A63H 3/52 446/385 |
| 11,623,354 | B2 | 4/2023 | Caron L'Ecuyer | |
| 11,632,991 | B2 | 4/2023 | Hull | |
| D985,643 | S * | 5/2023 | Li | D15/199 |
| 11,645,444 | B2 | 5/2023 | Scheutz | |
| 11,668,554 | B2 * | 6/2023 | Shen | B25J 13/084 324/207.2 |
| 11,686,884 | B2 | 6/2023 | Shinohara | |
| D991,347 | S | 7/2023 | Ding | |
| 11,699,884 | B2 | 7/2023 | Braun | |
| 11,707,852 | B1 | 7/2023 | Hurst | |
| 11,736,677 | B2 | 8/2023 | Grunnet-Jepsen | |
| D998,285 | S | 9/2023 | Yang | |
| 11,807,067 | B2 | 11/2023 | Mancini | |
| 11,833,680 | B2 | 12/2023 | Deits | |
| 11,850,738 | B2 | 12/2023 | Chernyak | |
| 11,851,120 | B2 | 12/2023 | Fay | |
| D1,012,031 | S | 1/2024 | Leung | |
| 11,886,772 | B2 | 1/2024 | Atarot | |
| D1,013,637 | S | 2/2024 | Leung | |
| 11,924,023 | B1 | 3/2024 | Smith | |
| D1,024,427 | S | 4/2024 | Li | |
| 11,999,423 | B2 | 6/2024 | Whitman | |
| 12,036,670 | B2 | 7/2024 | Geating | |
| 12,054,208 | B2 | 8/2024 | Swilling | |
| 12,070,863 | B2 | 8/2024 | Whitman | |
| D1,041,405 | S | 9/2024 | Zhou | |
| 12,077,229 | B2 | 9/2024 | Whitman | |
| 12,092,536 | B1 * | 9/2024 | Wang | A61B 5/6802 |
| 12,097,626 | B2 | 9/2024 | Ikeda | |
| 12,122,044 | B2 | 10/2024 | Webb | |
| D1,049,562 | S | 11/2024 | Frawley | |
| D1,051,193 | S | 11/2024 | Mahoor | |
| 12,134,181 | B2 | 11/2024 | Klingensmith | |
| D1,055,176 | S | 12/2024 | Qin | |
| 12,172,537 | B2 | 12/2024 | Gonano | |
| 12,205,214 | B2 | 1/2025 | Starke | |
| 12,214,497 | B2 | 2/2025 | Whitman | |
| 12,235,652 | B2 | 2/2025 | Whitman | |
| 12,240,117 | B2 | 3/2025 | Chebotar | |
| 12,246,441 | B1 | 3/2025 | Abate | |
| 12,251,831 | B2 | 3/2025 | Murphy | |
| D1,069,875 | S * | 4/2025 | Belon | D15/199 |
| 12,263,591 | B1 | 4/2025 | Clerc | |
| D1,074,130 | S | 5/2025 | Guo | |
| D1,082,878 | S | 7/2025 | Grummas | |
| D1,082,881 | S * | 7/2025 | Wang | D15/199 |
| D1,085,192 | S | 7/2025 | Abroff | |
| 12,365,094 | B2 | 7/2025 | Mccall | |
| D1,089,451 | S | 8/2025 | Lin | |
| 12,403,611 | B2 | 9/2025 | Mccall | |
| 12,420,434 | B1 | 9/2025 | Goldsmith | |
| 12,472,648 | B1 | 11/2025 | Hadas | |
| 12,482,243 | B1 | 11/2025 | Cass | |
| D1,105,195 | S | 12/2025 | Liu | |
| D1,107,770 | S | 12/2025 | Wang | |
| 12,510,426 | B2 * | 12/2025 | Lu | B25J 13/082 |
| 12,515,706 | B2 | 1/2026 | Li | |
| D1,114,356 | S | 2/2026 | Dau | |
| D1,114,898 | S | 2/2026 | Feldman | |
| 12,539,618 | B1 | 2/2026 | Mccall | |
| 12,554,325 | B2 * | 2/2026 | Hussami | A61B 5/316 |
| 12,558,791 | B1 | 2/2026 | Bernards | |
| 12,558,801 | B2 | 2/2026 | Shannon | |
| D1,115,887 | S | 3/2026 | Wang | |
| D1,117,383 | S | 3/2026 | Wang | |
| D1,118,726 | S | 3/2026 | Mccall | |
| 12,578,733 | B2 | 3/2026 | Lynch | |
| 2002/0103576 | A1 | 8/2002 | Takamura | |
| 2002/0157167 | A1 | 10/2002 | Paul | |
| 2003/0060930 | A1 | 3/2003 | Fujita | |
| 2003/0070202 | A1 | 4/2003 | Paul | |
| 2003/0173926 | A1 | 9/2003 | Hattori | |
| 2004/0003950 | A1 | 1/2004 | Ogawa | |
| 2004/0015265 | A1 | 1/2004 | Asano | |
| 2004/0019485 | A1 | 1/2004 | Kobayashi | |
| 2004/0039483 | A1 | 2/2004 | Kemp | |
| 2004/0044417 | A1 | 3/2004 | Finn | |
| 2004/0075168 | A1 | 4/2004 | Azuma | |
| 2004/0103740 | A1 | 6/2004 | Townsend | |
| 2004/0176875 | A1 | 9/2004 | Iribe | |
| 2004/0230340 | A1 | 11/2004 | Fukuchi | |
| 2004/0237168 | A1 | 12/2004 | Braun | |
| 2005/0072558 | A1 | 4/2005 | Whitney | |

(56) References Cited

U.S. PATENT DOCUMENTS

2006/0128261 A1 6/2006 Kawabe
2006/0217838 A1 9/2006 Sugino
2007/0035143 A1 2/2007 Blackwell
2008/0239678 A1 10/2008 Ploeg
2008/0240889 A1 10/2008 Yokoyama
2008/0256008 A1 10/2008 Kwok
2009/0055019 A1* 2/2009 Stiehl .................... B25J 9/1671 901/17
2009/0059033 A1 3/2009 Shimada
2009/0321150 A1 12/2009 Kwon
2010/0057253 A1 3/2010 Kwon
2010/0061835 A1 3/2010 Sim
2010/0116566 A1 5/2010 Ohm
2010/0229663 A1 9/2010 Wang
2010/0280662 A1 11/2010 Abdallah
2011/0058800 A1 3/2011 Lee
2011/0067517 A1 3/2011 Ihrke
2011/0067520 A1 3/2011 Ihrke
2011/0068595 A1 3/2011 Ihrke
2011/0071671 A1 3/2011 Ihrke
2011/0071673 A1 3/2011 Ihrke
2011/0071678 A1 3/2011 Ihrke
2011/0071679 A1* 3/2011 Barajas .................. B25J 9/1674 700/258
2011/0178636 A1 7/2011 Kwon
2011/0186362 A1 8/2011 Alfayad
2012/0072215 A1 3/2012 Yu
2012/0078419 A1 3/2012 Kim
2012/0155775 A1 6/2012 Ahn
2012/0215539 A1 8/2012 Juneja
2012/0247226 A1* 10/2012 Muroyama ............. G01L 1/142 73/862.046
2012/0310412 A1 12/2012 Seo
2013/0175816 A1 7/2013 Kawasaki
2013/0345863 A1 12/2013 Linder
2014/0039675 A1 2/2014 Ead
2014/0132210 A1 5/2014 Partovi
2014/0217762 A1 8/2014 Ihrke
2014/0265401 A1 9/2014 Allen Demers
2014/0279432 A1 9/2014 Holman
2014/0316566 A1 10/2014 Mazel
2015/0192399 A1 7/2015 Raab
2015/0290795 A1 10/2015 Oleynik
2016/0008988 A1 1/2016 Kennedy
2016/0052574 A1 2/2016 Khripin
2016/0064263 A1 3/2016 Hosek
2016/0167222 A1 6/2016 Ead
2016/0361844 A1* 12/2016 Jackson .............. B29C 33/3835
2017/0028551 A1 2/2017 Hemken
2017/0028563 A1 2/2017 Hemken
2017/0032035 A1 2/2017 Gao
2017/0075143 A1 3/2017 Saylor
2017/0080582 A1 3/2017 Mugnier
2017/0086704 A1* 3/2017 Gwin ................... A61B 5/1038
2017/0106738 A1 4/2017 Gillett
2017/0125008 A1 5/2017 Maisonnier
2017/0299898 A1 10/2017 Gallina
2017/0305014 A1* 10/2017 Gildert ..................... B25J 9/161
2017/0326736 A1 11/2017 Nagatsuka
2018/0073942 A1* 3/2018 Wu ......................... G01L 5/165
2018/0104823 A1 4/2018 Kaku
2018/0136912 A1 5/2018 Venkataramani
2018/0182260 A1 6/2018 Ciniello
2018/0186015 A1 7/2018 Xiong
2018/0232201 A1 8/2018 Holtmann
2018/0281179 A1 10/2018 Michalakis
2018/0293517 A1 10/2018 Browne
2018/0297214 A1* 10/2018 Lessing .................... B25J 9/142
2018/0357552 A1 12/2018 Campos
2019/0005374 A1 1/2019 Shankar
2019/0025611 A1 1/2019 Saylor
2019/0079924 A1 3/2019 Sugiura
2019/0082811 A1 3/2019 Gray
2019/0105783 A1 4/2019 Al Moubayed
2019/0130896 A1 5/2019 Zhou
2019/0163985 A1 5/2019 Wang
2019/0178736 A1* 6/2019 Shimizu .................. G01L 1/127
2019/0232490 A1 8/2019 Kim
2019/0278079 A1 9/2019 Mccabe
2019/0329413 A1 10/2019 Johnson
2019/0337166 A1 11/2019 Keeney-Ritchie
2019/0366558 A1 12/2019 Gupta
2019/0371307 A1 12/2019 Zhao
2019/0374161 A1 12/2019 Ly
2020/0003256 A1 1/2020 Koroyasu
2020/0009739 A1 1/2020 Moon
2020/0030706 A1* 1/2020 Hayashi ................... B25J 19/00
2020/0086479 A1 3/2020 Messier
2020/0114506 A1 4/2020 Toshev
2020/0117214 A1 4/2020 Jonak
2020/0117336 A1 4/2020 Mani
2020/0141818 A1* 5/2020 Bao ....................... G01L 1/2287
2020/0167631 A1* 5/2020 Rezgui ................... B25J 11/008
2020/0171669 A1* 6/2020 Jackson .................. F16H 21/44
2020/0180145 A1 6/2020 Xiong
2020/0180146 A1 6/2020 Xiong
2020/0180167 A1 6/2020 Xiong
2020/0182336 A1 6/2020 Xiong
2020/0182337 A1 6/2020 Xiong
2020/0330246 A1 10/2020 Tognetti
2020/0369333 A1* 11/2020 Lavalley ............. B25J 11/0035
2020/0409183 A1 12/2020 Saylor
2021/0146214 A1 5/2021 Lim
2021/0162602 A1 6/2021 Kawaguchi
2021/0181716 A1 6/2021 Quinlan
2021/0193138 A1 6/2021 Yu
2021/0331313 A1 10/2021 Klingensmith
2021/0387346 A1 12/2021 Gillett
2021/0390420 A1 12/2021 Barnett
2021/0398524 A1 12/2021 Gao
2022/0019796 A1 1/2022 Mcnichols
2022/0186787 A1 6/2022 Thompson
2022/0226996 A1 7/2022 Ishizuka
2022/0227010 A1 7/2022 Takabu
2022/0252475 A1* 8/2022 Hussein .................. G01L 5/162
2022/0287853 A1 9/2022 Ren
2022/0294062 A1 9/2022 Kamon
2022/0307581 A1 9/2022 Johansen
2022/0388174 A1 12/2022 Stathis
2022/0390952 A1 12/2022 Yu
2022/0395974 A1 12/2022 Balasubramanian
2022/0410380 A1 12/2022 Lu
2023/0031545 A1* 2/2023 Oleynik ................ A47J 36/321
2023/0033779 A1 2/2023 Gazeau
2023/0048725 A1 2/2023 Barbour
2023/0112596 A1 4/2023 Yang
2023/0126906 A1 4/2023 Kranski
2023/0143315 A1 5/2023 Whitman
2023/0154055 A1 5/2023 Besenbruch
2023/0168921 A1 6/2023 Kim
2023/0173683 A1 6/2023 Gomez
2023/0182296 A1 6/2023 Sermanet
2023/0222454 A1 7/2023 Cella
2023/0287941 A1 9/2023 Dellon
2023/0306302 A1 9/2023 Mori
2023/0347514 A1 11/2023 Xiao
2023/0351203 A1 11/2023 Ozay
2023/0390948 A1 12/2023 Hsu
2024/0003380 A1 1/2024 Vyas
2024/0044331 A1 2/2024 Sterling
2024/0091964 A1* 3/2024 Smith ...................... B25J 19/02
2024/0095077 A1 3/2024 Singh
2024/0181637 A1* 6/2024 Gillett ...................... B25J 17/00
2024/0193848 A1 6/2024 Wang
2024/0199068 A1 6/2024 Pavone
2024/0217096 A1 7/2024 Maleki
2024/0217104 A1 7/2024 Neville
2024/0228191 A1 7/2024 Kumar
2024/0289606 A1 8/2024 Wang
2024/0289973 A1 8/2024 Liu
2024/0294219 A1 9/2024 Gildert
2024/0299195 A1 9/2024 Perry
2024/0300109 A1 9/2024 Shaw
2024/0430464 A1 12/2024 Kalva

(56) References Cited

U.S. PATENT DOCUMENTS

| | | | |
|---|---|---|---|
| 2025/0018583 | A1 | 1/2025 | Monti |
| 2025/0042020 | A1 | 2/2025 | Fleury |
| 2025/0042024 | A1 | 2/2025 | Dijkman |
| 2025/0050507 | A1 | 2/2025 | Camasmie |
| 2025/0103064 | A1 | 3/2025 | Shan |
| 2025/0131347 | A1 | 4/2025 | Wells |
| 2025/0147517 | A1 | 5/2025 | Swilling |
| 2025/0187202 | A1 | 6/2025 | Mccall |
| 2025/0196326 | A1 | 6/2025 | Katz |
| 2025/0196327 | A1 | 6/2025 | Geating |
| 2025/0205908 | A1 | 6/2025 | Goldsmith |
| 2025/0218160 | A1 | 7/2025 | Wang |
| 2025/0242500 | A1 | 7/2025 | Mccall |
| 2025/0269518 | A1 | 8/2025 | Ragusila |
| 2025/0312911 | A1 | 10/2025 | Ragusila |
| 2025/0319614 | A1 | 10/2025 | Michael |
| 2025/0322372 | A1 | 10/2025 | Dana |
| 2025/0367837 | A1 | 12/2025 | Webb |
| 2025/0375905 | A1 | 12/2025 | Goldsmith |
| 2026/0008178 | A1 | 1/2026 | Mccall |
| 2026/0016809 | A1 | 1/2026 | Shu-Xing Cheng |
| 2026/0027736 | A1 | 1/2026 | Yeganeh |
| 2026/0034678 | A1 | 2/2026 | Mccall |
| 2026/0070216 | A1 | 3/2026 | Webb |
| 2026/0084309 | A1 | 3/2026 | Wu |
| 2026/0103253 | A1 | 4/2026 | Wood |

FOREIGN PATENT DOCUMENTS

| | | | | |
|---|---|---|---|---|
| CA | 233700 | | | 7/2025 |
| CN | 102357889 | | | 2/2012 |
| CN | 302064216 | S | | 9/2012 |
| CN | 302255798 | | | 12/2012 |
| CN | 302255798 | S | | 12/2012 |
| CN | 308637925 | | | 5/2014 |
| CN | 303298408 | | | 7/2015 |
| CN | 304998646 | S | | 1/2019 |
| CN | 305154358 | S | | 5/2019 |
| CN | 209615545 | | | 11/2019 |
| CN | 111267126 | A | | 6/2020 |
| CN | 210998685 | | | 7/2020 |
| CN | 306231734 | | | 12/2020 |
| CN | 212287717 | | | 1/2021 |
| CN | 112959343 | | | 6/2021 |
| CN | 306894068 | S | | 10/2021 |
| CN | 114147745 | | | 3/2022 |
| CN | 114147745 | A | | 3/2022 |
| CN | 307563528 | | | 9/2022 |
| CN | 307563528 | S | | 9/2022 |
| CN | 115503013 | | | 12/2022 |
| CN | 115649316 | | | 1/2023 |
| CN | 115871816 | A | * | 3/2023 |
| CN | 218802294 | | | 4/2023 |
| CN | 308117231 | S | | 7/2023 |
| CN | 116714698 | | | 9/2023 |
| CN | 117047810 | | | 11/2023 |
| CN | 117301022 | | | 12/2023 |
| CN | 117462367 | | | 1/2024 |
| CN | 308675468 | S | | 6/2024 |
| CN | 308733683 | S | | 7/2024 |
| CN | 308157136 | S | | 8/2024 |
| CN | 118809620 | A | | 10/2024 |
| CN | 309012925 | | | 12/2024 |
| CN | 309115067 | S | | 2/2025 |
| CN | 309180560 | S | | 3/2025 |
| CN | 309225998 | S | | 4/2025 |
| CN | 309319491 | S | | 6/2025 |
| CN | 309417137 | S | | 8/2025 |
| CN | 309456813 | S | | 8/2025 |
| DE | 3345607 | A1 | | 6/1985 |
| DE | 10217020 | | | 11/2003 |
| DE | 10217020 | B4 | | 2/2004 |
| DE | 112018003604 | T5 | | 5/2020 |
| DE | 402020100743 | | | 2/2021 |
| DE | 102022107533 | | | 10/2023 |
| DE | 102022107553 | A1 | | 10/2023 |
| DE | 112018003604 | | | 11/2023 |
| EP | 2186552 | A1 | | 5/2010 |
| ES | 59639 | U | | 6/1957 |
| FR | 2595950 | A1 | | 9/1987 |
| GB | 2446885 | A | | 8/2008 |
| GB | 2472046 | | | 4/2013 |
| GB | 2496335 | | | 5/2013 |
| GB | 90038381840001 | | | 11/2017 |
| GB | 90058203540003 | | | 3/2019 |
| GB | 90068598980011 | | | 3/2020 |
| GB | 6367851 | | | 6/2024 |
| GB | 6420068 | | | 2/2025 |
| GB | 6420070 | | | 2/2025 |
| JP | 1106466 | | | 4/2001 |
| JP | 1162349 | | | 1/2003 |
| JP | 2003266362 | A | | 9/2003 |
| JP | 1301180 | | | 5/2007 |
| JP | 1349407 | | | 1/2009 |
| JP | 1412554 | | | 5/2011 |
| JP | 1602569 | | | 4/2018 |
| JP | D1638014 | | | 7/2019 |
| JP | 6775862 | B1 | | 10/2020 |
| JP | 1698172 | | | 10/2021 |
| KR | 20180107353 | | | 10/2018 |
| KR | 300994127 | | | 2/2021 |
| KR | 3020240036125 | | | 9/2024 |
| SU | 1734994 | | | 5/1992 |
| TW | 105306360 | | | 2/2018 |
| WO | 243074 | | | 5/2002 |
| WO | 2009030922 | | | 3/2009 |
| WO | 2017103682 | | | 6/2017 |
| WO | 2017103682 | A2 | | 6/2017 |
| WO | 2019234706 | | | 12/2019 |
| WO | 2020190594 | | | 9/2020 |
| WO | 2020190594 | A1 | | 9/2020 |
| WO | 2022207106 | | | 10/2022 |
| WO | 2023110778 | | | 6/2023 |
| WO | D224613 | | | 10/2023 |
| WO | 2023210914 | A1 | | 11/2023 |
| WO | 2023246994 | | | 12/2023 |
| WO | 2023246995 | | | 12/2023 |
| WO | 2024058844 | | | 3/2024 |
| WO | 2024072966 | | | 4/2024 |
| WO | 2024073076 | A1 | | 4/2024 |
| WO | 2024085904 | | | 4/2024 |
| WO | 2024111509 | A1 | | 5/2024 |
| WO | 2024112350 | | | 5/2024 |
| WO | 2024112351 | | | 5/2024 |
| WO | 2024123766 | | | 6/2024 |
| WO | 2024163992 | | | 8/2024 |
| WO | D243074010 | | | 10/2024 |
| WO | 2025019583 | | | 1/2025 |
| WO | WODM243074 | | | 1/2025 |
| WO | 2025042802 | | | 2/2025 |
| WO | 2025072321 | | | 4/2025 |
| WO | 2025103557 | | | 5/2025 |
| WO | 2025103557 | A1 | | 5/2025 |
| WO | 2025221916 | A1 | | 10/2025 |

OTHER PUBLICATIONS

Available online at https://www.youtube.com/watch?v=iWC8rSjDywU, at least as early as Oct. 18, 2024.

Available online at https://www.youtube.com/watch?v=bUrLuUxv9gE, at least as early as Aug. 30, 2024.

Available online at https://www.youtube.com/watch?v=-9EM5_VFlt8, at least as early as Apr. 16, 2024.

Available online at https://www.youtube.com/watch?v=29ECwExc-_M&t=2s, at least as early as Apr. 17, 2024.

Available online at https://www.youtube.com/watch?v=bdVrWxjK2vo, at least as early as Sep. 17, 2024.

Available online at https://www.youtube.com/watch?v=qw2y0kceAv0, at least as early as Oct. 15, 2024.

Available online at https://www.youtube.com/watch?v=B_l2k7MZEKg, at least as early as Jun. 30, 2024.

Available online at https://www.youtube.com/watch?v=CbA9wA9etGA, at least as early as Sep. 19, 2024.

(56) References Cited

OTHER PUBLICATIONS

Available online at https://www.youtube.com/watch?v=zLhA-RWBBYU, at least as early as Jul. 5, 2024.
Available online at https://www.youtube.com/watch?v=UBbk180ZbTc, at least as early as Oct. 14, 2024.
Available online at https://www.youtube.com/watch?v=UHe1zSQwep0, at least as early as Oct. 14, 2024.
Available online at https://www.youtube.com/watch?v=MCbGeC-kuBM, at least as early as Aug. 5, 2024.
Available online at https://www.youtube.com/watch?v=ujdK3yd2gHY, at least as early as Jul. 2, 2024.
Available online at https://www.youtube.com/watch?v=-HizP4UQvug, at least as early as Apr. 25, 2024.
Available online at https://www.youtube.com/watch?v=zmqWU2dQKZ8, at least as early as Oct. 24, 2024.
Available online at https://www.youtube.com/watch?v=q8ldbodRG14, at least as early as Feb. 26, 2024.
Gao et al., Development of a low motion-noise humanoid neck: Statics analysis and experimental validation, 2010, IEEE, p. 1203-1208 (Year: 2010).
Nakada et al., Deep Learning of Neuromuscular and Visuomotor Control of a Biomimetic Simulated Humanoid, 2020, IEEE, p. 3952-3959 (Year: 2020).
Lim et al., Basic emotional walking using a biped humanoid robot, 1999, IEEE, p. 954-959 (Year: 1999).
Albers et al., Upper Body of a new Humanoid Robot—the Design of ARMAR III, 2006, IEEE, p. 308-309 (Year: 2006).
Available online at https://x.com/Tesla_Optimus/status/1866171391156113740, at least as early as Dec. 9, 2024.
Available online at https://x.com/Tesla_Optimus/status/1862116407594377698, at least as early as Nov. 28, 2024.
Available online at https://x.com/Tesla_Optimus/status/1844789517833629717, at least as early as Oct. 11, 2024.
Available online at https://x.com/elonmusk/status/1752516361799258318, at least as early as Jan. 30, 2024.
Available online at https://www.youtube.com/watch?v=r2r26ebhtYQ, at least as early as Feb. 25, 2025.
Available online at https://www.youtube.com/watch?v=uVcBa6NXAbk, at least as early as Feb. 21, 2025.
Available online at https://www.youtube.com/watch?v=F_7IPm7f1vl, at least as early as Oct. 30, 2024.
Available online at https://www.youtube.com/watch?v=LdxlegrxsBQ, at least as early as Dec. 6, 2024.
Duran-Hernandez et al., "Control Implementation in a Low-cost Designed Biped Robot to Reproduce Squats," The 10th International Conference on Control, Mechatronics and Automation, Nov. 9, 2022.
Hao et al., Design and kinematics analysis of a 4-DOF articulated steering mechanism, 2015, IEEE, p. 5875-5880 (Year: 2015).
Or, Computer Simulations of a Humanoid Robot Capable of Walking Like Fashion Models, 2012, IEEE, p. 241-248 (Year: 2012).
Available online at https://www.youtube.com/watch?v=Fb_R6IDDU4A, at least as early as Oct. 9, 2020.
Available online at https://www.youtube.com/watch?v=_mQJw8VhZ7w, at least as early as Oct. 5, 2022.
Available online at https://www.youtube.com/watch?v=a-R4H8-8074, at least as early as Jun. 6, 2015.
Available online at https://www.youtube.com/watch?v=1fC7b2LjVW4, at least as early as Jul. 12, 2016.
Ophaswongse et al., Optimal Design of a Novel 3-DOF Orientational Parallel Mechanism for Pelvic Assistance on a Wheelchair: An Approach Based on Kinematic Geometry and Screw Theory, 2020, IEEE, p. 3315-3322 (Year: 2020).
Shafti et al., Real-time Robot-assisted Ergonomics, 2019, IEEE, p. 1975-1981 (Year: 2019).
Luo et al., Human body trajectory generation using point cloud data for robotics massage applications, 2014, IEEE, p. 5612-5617 (Year: 2014).
Cheng et al., Human posture estimation using voxel data for "smart" airbag systems: issues and framework, 2004, IEEE, p. 84-89 (Year: 2004).
Or, Humanoids Grow a Spine: The Effect of Lateral Spinal Motion on the Mechanical Energy Efficiency, 2012, IEEE, p. 1-11 (Year : 2012).
Souissi et al., Influence of the No. of humanoid vertebral column pitch joints in flexion movements, 2011, IEEE, p. 227-282 ( Year: 2011).
Han et al., Mechanical design of robot lower body based on four-bar linkage structure for energy efficient bipedal walking, 2016, IEEE, p. 402-407 (Year: 2016).
Park et al., Design of a lower limb exoskeleton including roll actuation to assist walking and standing up, 2015, IEEE, p. 359-354 ( Year: 2015).
Tsagarakis et al., Lower body realization of the baby humanoid 'iCub', 2007, IEEE, p. 3616-3622 (Year: 2007).
Machine translation of CN-114147745-A (Year: 2022).
Machine translation of DE-112018003604-T5 (Year: 2020).
Machine translation of WO-2020190594-A1. (Year: 2020).
Available online at https://www.youtube.com/watch?v=q8ldbodRG14, at least as early as May 22, 2019.
Available online at https://www.youtube.com/watch?v=0XBYZxa25vc&t=1s, at least as early as Apr. 3, 2013.
Available online at https://www.youtube.com/watch?v=LBeml9AmTT4, at least as early as Apr. 7, 2015.
Available online at https://www.youtube.com/watch?v=IE-YBaYjbqY, at least as early as Dec. 10, 2013.
Available online at https://www.youtube.com/watch?v=y-j4dixQQml&t=222s, at least as early as May 22, 2012.
Available online at https://www.youtube.com/watch?v=Bmglbk_Op64&t=1s, at least as early as Nov. 10, 2011.
Available online at https://www.youtube.com/watch?v=20GHG-R9eFI, at least as early as Mar. 6, 2023.
Available online at https://www.youtube.com/watch?v=67CUudkjEG4, at least as early as Oct. 26, 2009.
Available online at https://www.youtube.com/watch?v=yBmatGQ0giY&t=1s, at least as early as Aug. 11, 2022.
Available online at https://www.youtube.com/watch?v=_mQJw8VhZ7w&t=111s, as least as early as Oct. 5, 2022.
Available online at https://www.youtube.com/watch?v=UPOLcE1vwA0, at least as early as Apr. 28, 2016.
Available online at https://www.youtube.com/watch?v=ioOkbUQqmZ0, at least as early as Nov. 9, 2022.
Available online at https://www.youtube.com/watch?v=CUhuhleQNos, at least as early as May 22, 2019.
Available online at https://www.youtube.com/watch?v=dY57qnD_O7U, at least as early as Jul. 27, 2021.
Pateromichelakis et al., Head-eyes system and gaze analysis of the humanoid robot Romeo, 2014, IEEE, p. 1374-1379 (Year: 2014).
Jeung et al., Realization of human neck motion with novel robotic mechanism, 2016, IEEE, p. 482-486 (Year: 2016).
Barker et al., Natural head movement for HRI with a muscular-skeletal head and neck robot, 2017, IEEE, p. 587-592 (Year: 2017).
Keselman et al., "Intel RealSense stereoscopic depth cameras," in Proceedings of the IEEE Conference on Computer Vision and Pattern Recognition Workshops, pp. 1-10, 2017.
Mikayla Tetteh-Martey, (date posted Nov. 3, 2024), Blurring Lines: Resurgence of 'I, Robot', Cornellsun.com, URL: (https:// www.cornellsun.com/article/2024/11/blurring-lines-resurgence-of-i-robot), (Year: 2024).
Mike Oitzman, (date posted Aug. 6, 2024), Figure 02 humanoid robot is ready to get to work, therobotreport.com, URL: (https://www.therobotreport.com/figure-02-humanoid-robot-is-ready-to-get-to-work/), (Year: 2024).
Park et al., Mechanical Design of Humanoid Robot Platform KHR-3 (KAIST Humanoid Robot 3: HUBO), 2005, IEEE, p. 321-3226 (2005).
Englsberger et al., "Overview of the Torque-Controlled Humanoid Robot TORO," 2014 14th IEEE-RAS International Conference on Humanoid Robots (Humanoids), Nov. 18-20, 2014. Madrid, Spain.
Hebi Robotics, "T-Series Actuator," Jan. 29, 2024.

(56) References Cited

OTHER PUBLICATIONS

Cheng et al., "Human Posture Estimation Using Voxel Data for "Smart" Airbag Systems: Issues and Framework," IEEE, p. 84-89 (2004).
Droeschel et al., "Learning to Interpret Pointing Gestures with a Time-of-Flight Camera," IEEE, p. 481-488 (2011).
Frohlich et al., "Design and Impementation of a Spherical Joint for Mobile Manipulators," IEEE, p. 251-258 (2016).
Netzev et al., "Many Faced Robot—Design and Manufacturing of a parametric, Modular and Open Source Robot Head," IEEE, p. 342-348 (2019).
Netzev et al., Design and implementation of a spherical joint for mobile manipulators, 2019, IEEE, p. 342-348 (Year: 2019).
Haddadin et al., The "DLR crash report": Towards a standard crash-testing protocol for robot safety—Part II: Discussions, 2009, IEEE, p. 280-287 (Year: 2009).
Yaghoubi et al., Region-Based CNNs for Pedestrian Gender Recognition in Visual Surveillance Environments, 2019, IEEE, p. 1-5 (Year: 2019).
Pateromichelakis et al., Head-eyes system and gaze analysis of the humanoid robot Romeo, 2014, IEEE, p. 1374-131379 (Year: 2014).
Mokhtari et al., Taban:A Retro-Projected Social Robotic—Head for Human-Robot Interaction, 2019, IEEE, p. 46-51 (Year: 2019).
Merged original document with English translation (CN 112959343); Paragraphs added for citation purposes. (Year: 2021).
Merged original document (KR 20180107353) with English Translation (Year: 2018).
Available online at https://youtu.be/GtPs_ygfaEA?si=7lv6MEFvFoaacKfa, at least as early as Aug. 15, 2023.
Available online at https://youtu.be/_MBd_XfXy9M?si=PbEHUJpRUFqaxS3J, at least as early as Jun. 26, 2023.
Available online at https://youtu.be/SHPxcRBIXN0?si=VbJqbK7jzUqtZGmn, at least as early as Sep. 26, 2023.
Available online at https://youtu.be/BvFxD-8AhJA?si=Vx1F4a76tbQDUX48, at least as early as Nov. 16, 2023.
Available online at https://youtu.be/XiQkeWOFwmk?si=1qOPC8gXgmmGvXRT, at least as early as May 16, 2023.
Available online at https://youtu.be/cpraXaw7dyc?si=JvPaT6eMA18psrmU, at least as early as Dec. 13, 2023.
Available online at https://youtu.be/BNSZ8Fwcd20?si=_YnVgjYblVuhASk1, at least as early as Oct. 27, 2023.
Available online at https://youtu.be/SS3Ga2HQQ0s?si=Dwr3sJuCsOeUoSLj, at least as early as Nov. 20, 2023.
Available online at https://youtu.be/sihlDeJ4Hmk?si=fJsKpvRFPzFejmS6, at least as early as Dec. 27, 2023.
Available online at https://www.youtube.com/watch?v=zkBnFPBV3f0, at least as early as Jul. 11, 2013.
Available online at https://www.youtube.com/watch?v=G6JE7mNYz2A, at least as early as Oct. 17, 2024.
Available online at https://www.youtube.com/watch?v=FuNFr7V7KFQ, at least as early as Aug. 19, 2024.
Available online at https://www.youtube.com/watch?v=GzX1qOIO1bE, at least as early as May 13, 2024.
Available online at https://www.youtube.com/watch?v=jWTWWWuzB6Cg, at least as early as Aug. 27, 2024.
Available online at https://www.youtube.com/watch?v=B-ebMigAHzQ, at least as early as Sep. 30, 2024.
"A lightweight robotic leg prosthesis replicating the biomechanics of the knee, ankle, and toe joint", published Nov. 23, 2022 retrieved from Wayback machine URLhttps://www.science.org/doi/10.1126/scirobotics.abo3996 on Feb. 22, 2026 (Year: 2022).
A Resilient and Energy-Aware Task Allocation Framework for Heterogeneous Multi-Robot Systems (Year: 2021).
Advancing Physical AI with NVIDIA Cosmos World Foundation Model Platform, avaiable at https://developer.nvidia.com/blog/advancing-physical-ai-with-nvidia-cosmos-world-foundation-model-platform/ (Jan. 9, 2025).
Asano et al., Achievement of twist squat by musculoskeletal humanoid with screw-home mechanism, 2013, IEEE, p. 4649-4654 ( Year: 2013).
Available on line at https://generalistai.com/blog/nov-04-2025-GEN-0, at least as early as Nov. 24, 2024.
Available on line at https://www.physicalintelligence.company/blog/openpi, at least as early as Feb. 4, 2025.
Black, Kevin, et al. "π0: A vision-language-action flow model for general robot control. CoRR, abs/2410.24164, 2024. doi: 10.48550." arXiv preprint ARXIV.2410.24164.
Black, Kevin, Manuel Y. Galliker, and Sergey Levine. "Real-Time Execution of Action Chunking Flow Policies." arXiv preprint arXiv:2506.07339 (2025).
Brohan, Anthony, et al. "Rt-1: Robotics transformer for real-world control at scale." arXiv preprint arXiv:2212.06817 (Dec. 13, 2022).
Brown et al., "Language Models are Few-Shot Learners," arXiv:2005.14165v4 (Jul. 22, 2020).
Calvert, Duncan, et al. "A fast, autonomous, bipedal walking behavior over rapid regions." 2022 IEEE-RAS 21st International Conference on Humanoid Robots (Humanoids). IEEE, 2022.
Chang et al., "A Survey on Evaluation of Large Language Models," ACM Trans. Intell. Syst. Technol., vol. 15, No. 3, Article 39. (Mar. 2024).
Chen et al., "InternVL: Scaling up Vision Foundation Models and Aligning for Generic Visual-Linguistic Tasks," https://github.com/OpenGVLab/InternVL (2024).
Dafarra, Stefano, et al. "Non-linear trajectory optimization for large step-ups: Application to the humanoid robot atlas." 2020 IEEE/RSJ International Conference on Intelligent Robots and Systems (IROS). IEEE, 2020.
Ding, M., Yang, Z., Hong, W., Zheng, W., Zhou, C., Yin, D., & Tang, J. (2021). Cogview: Mastering text-to-image generation via transformers. arXiv:2105.13290v3. (Year: 2021).
Ding, Tianli, et al. "Goalseye: Learning high speed precision table tennis on a physical robot." arXiv preprint arXiv:2210.03662 (Oct. 13, 2022).
Driess, Danny, et al. "Palm-e: An embodied multimodal language model." (Mar. 6, 2023).
Dwibedi, Debidatta, et al. "Learning actionable representations from visual observations." 2018 IEEE/RSJ international conference on intelligent robots and systems (IROS). IEEE, Feb. 2, 2018).
English Translation of CN-118809620-A (Year: 2024).
Garcia, Gabriel, Robert Griffin, and Jerry Pratt. "0-step capturability, motion decomposition and global feedback control of the 3D variable height-inverted pendulum." arXiv preprint arXiv:1912.06078 (2019).
Gia et al., "Densely Connected Feature Pyramid Network for Image Segmentation," 2020 8th International Conference on Digital Home (ICDH).
Griffin, Robert J., et al. "Capture point trajectories for reduced knee bend using step time optimization." 2017 IEEE-RAS 17th International Conference on Humanoid Robotics (Humanoids). IEEE, 2017.
Griffin, Robert J., et al. "Footstep planning for autonomous walking over rough terrain." 2019 IEEE-RAS 19th international conference on humanoid robots (humanoids). IEEE, 2019.
Griffin, Robert J., et al. "Straight-leg walking through underconstrained whole-body control." 2018 IEEE International Conference on Robotics and Automation (ICRA). IEEE, 2018.
Griffin, Robert J., et al. "Walking stabilization using step timing and location adjustment on the humanoid robot, atlas." 2017 IEEE/RSJ International Conference on Intelligent Robots and Systems (IROS). IEEE, 2017.
Gupta, Abhishek, et al. "Bootstrapped autonomous practicing via multi-task reinforcement learning." arXiv preprint arXiv:2203.15755 (Mar. 29, 2022).
Gupta, Abhishek, et al. "Relay policy learning: Solving long-horizon tasks via imitation and reinforcement learning." arXiv preprint arXiv:1910.11956 (Oct. 25, 2019).
Haywood et al., A novel 3D printed leg design for a biped robot, 2017, IEEE, p. 1-6 (Year: 2006).
Heravi, Negin, et al. "Visuomotor control in multi-object scenes using object-aware representations." arXiv preprint arXiv:2205.06333 (May 12, 2022).
htp://www.analyticsinsight.net/artificial-inteligence/xiaomis-cyberone-a-new-humanoid-obot-to-fight-teslabot(Sep. 8, 2022) (Year: 2022).

(56) References Cited

OTHER PUBLICATIONS https://electrek.co/2023/05/16/tesla-bot-sideshow-new-footage-robots/ 5/16/2023 (Year: 2023).
https://lifearchitect.ai/humanoids/ (Year: 2023).
https://robotsguide.com/robots/figure (Year: 2023).
https://robotsguide.com/robots/hrp4 (Year: 2010).
https://robotsguide.com/robots/optimus (Year: 2022).
https://supercarblondie.com/unitree-humanoid-robot-word-speed-record/(Year 2024).
https://web.archive.org/web/20220702203427/https://singularityhub.com/2010/01/20/ iwalk-presents-worlds-first-actively-powered-foot-and-ankle/ (Year: 2010).
https://www.cnn.com/2022/09/30/business/tesla-bot-robot 10.1.2022 (Year: 2022).
https://www.economist.com/science-and-technology/2024/06/05/he-uesto-buld-obots-that-look-and-behavelike-humans(Year 2024).
https://www.hola.com/US/celebrities/20221003337667/elon-musk-unveils-robot/ Oct. 3, 2022 (Year: 2022).
https://www.humanoidsdaily.com/news/figure-reveals-fgure-03-in-new-teaser-full-unveling-set-for-october-10 (Oct. 7, 2025) (Year: 2025).
Jang, Eric, et al. "Bc-z: Zero-shot task generalization with robotic imitation learning." Conference on Robot Learning. PMLR, (Feb. 4, 2022).
Jiang et al. "Active Retrieval Augmented Generation," Dec. 6-10, 2023, Proceedings of the 2023 Conference on Empirical Methods in Natural Language Processing, pp. 7969-7992. (Year: 2023).
Jin et al., "Unified Language-Vision Pretraining in LLM With Dynamic Discrete Visual Tokenization," arXiv:2309.04669v3 [cs. CV] Mar. 22, 2024.
Kawamura et al., One-leg Jumping with Virtual Spring Principle, 2008, IEEE, p. 34-39 (Year: 2008).
Kim et al., "Giving Robots a Hand: Learning Generalizable Manipulation with Eye-in-Hand Human Video Demonstrations," arXiv:2307.05959v1 (Jul. 12, 2023).
Kim et al., "Parallel Feature Pyramid Network for Object Detection," ECCV 2018.
Kim, Moo Jin, et al. "Openvla: An open-source vision-language-action model." arXiv preprint arXiv:2406.09246 (Jun. 13, 2024).
Kirillov et al., "Panoptic Feature Pyramid Networks," IEEE Xplore (2019).
Lee et al., "Learning Robot Activities from First-Person Human Videos Using Convolutional Future Regression," IEEE Xplore (2017).
Yin et al., "A Survey on Multimodal Large Language Models," arXiv:2306.13549v2 (Apr. 1, 2024).
Zhang et al., "An Object Attribute Guided Framework for Robot Learning Manipulations from Human Demonstration Videos," 2019 IEEE/RSJ International Conference on Intelligent Robots and Systems (IROS) Macau, China, (Nov. 4, 2019).
Zhang et al., "Llama-Adapter: Efficient Fine-Tuning of Large Language Models With Zero-Initialized Attention," arXiv:2303.16199v3 (Sep. 18, 2024).
Zhang et al., "MM-LLMs: Recent Advances in MultiModal Large Language Models," arXiv:2401.13601v5 (May 28, 2024).
Zhou et al., "Watch, Try, Learn: Meta-Learning From Demonstrations and Rewards," arXiv:1906.03352v4 (Jan. 30, 2020).
Zitkovich, Brianna, et al. "Rt-2: Vision-language-action models transfer web knowledge to robotic control." Conference on Robot Learning. PMLR, (Jul. 28, 2023).
English translation of DE-102022107553-A1 (Year: 2023).
English translation of DE-10217020-B4 (Year: 2004).
https:/www.humanoidsdaily.com/news/figure-reveals-figure-03-in-new-teeser-full-unveiling-set-for-october-10 (Oct. 7, 2025) (Year: 2025).
https://www.analyticsinsight.net/artificial-inteligence/xiaomis-cyberone-a-new-humanoid-obot-to-fight-teslabot (Sep. 8, 2022) (Year: 2022).
htp/ww.usatoday.com/story/tech/gaming/2021/08/20/tesla-bot-elon-musk-humanoid-robots/8208107002/(Year: 2021).
CyberOne Robots_ Your Guide to the World of Robotics (Year: 2022).
Scarcia et al., Towards simplicity: On the design of a 2-DOFs wrist mechanism for tendon-driven robotic hands, 2015. OEEE, p. 1317-1322 (Year: 2015).
Bridgwater et al., The Robonaut 2 hand—designed to do work with tools, 2012, IEEE, p. 3425-3430 (Year: 2012).
Hand et al., FAS A flexible antagonistic spring element for a high performance over, 2011, IEEE, p. 1366-1372 (Year: 2011).
Dalley et al., Design of a Multifunctional Anthropomorphic Prosthetic Hand With Extrinsic Actuation, 2009, IEEE, p. 1-8 (Year: 2009).
Kamogawa et al., Development of tendon-driven robotic hand for biped humanoid robot, 2014. IEEE, p. 914-917 (Year: 2014).
Toedtheide et al., An Integrated, Force-Sensitive, Impedance Controlled, Tendon-Driven Wrist: Design, Modeling, and Control, 2020, IEEE, p. 25-32 (Year: 2020).
Mizuuchi et al., Design and development of a compressor-embedded pneumatic-driven musculoskeletal humanoid Publisher: IEEE, 2012, p. (Year: 2012).
Cilmi et al., "Design and Implementation of Real Time Face Tracking Humanoid Robot," 2018 , IEEE, p. 1-6 (Year: 2018).
https://gagadget.com/en/announce/156738- xiaomi-presenteda-robot-humanoid-cyberone-it-can-communicate-recognize-emotions-and-give-fowers/(Aug. 11, 2022) (Year: 2022).
"Powered Ankle-Foot Prosthesis for the improvement of Amputee Ambulation." Published 23-26. (Year: 2007).
"An Underactuated Active Transfemoral Prosthesis with Series Elastic Actuators Enables Multiple Locomotion Tasks."—Jun. 17, 2024.
https://humanoid.guide/what-is-a-humanoid/ (Year: 2026).
https://humanoidroboticstechnology.com/articles/top-12-humanoid-robots-of-2026. (Year: 2026).
https://startup-weekly.com/Figure-announces-70m-Seres-A-to-support-commercialization-of-Figure-01-humanoid-obot5/312/2023 ( Year: 2023).
https://itcanthink.substack.com/p/how-human-should-your-humanoid-be Sep. 17, 2026) (Year: 2026).
https://parametric-architecture.com/figure-03-a-humanoid-robots/?srsltid=AfmBOorxq38eNuCOH_IOI3YygfB_WB3WxOC9fHbAij_j4vWoy3rW_KI_(Oct. 15, 2025) (Year: 2025).
https://www.techeblog.com/xpeng-iron-humanoid-robot-specs-launch-reveal/(Nov. 5, 2025) (Year: 2025).
http://www.yankodesign.com/2025/03/25/neo-gamma-humanoid-robot-dons-a-3d-printed-fabric-skin-to-better-blend-with-your-home/ (Mar. 25, 25) (Year: 2025).
http/ww.forbes.com/sites/jonoetsier/2026/01/02/scientists-give-obots-skin-with-pain-sensations-and-human-like-reftees/ (Jan. 3, 2026) (Year: 2026).
CN-111267126-A Machine Translation (Year: 2020).
Merged original document with English translation (CN 115070744); paragraphs added for citation purposes. (Year: 2026).
Merged original document with English translation (KR 20180107353). (Year: 2026).
Li et al., "Supervision Exists Everywhere: a Data Efficient Contrastive Language-Image Pre-Training Paradigm," arXiv:2110.05208v2 (Mar. 14, 2022).
Li et al., BLIP: Bootstrapping Language-Image Pre-training for Unified Vision-Language Understanding and Generation, Proceedings of the 39 th International Conference on Machine Learning, Baltimore, Maryland, USA, PMLR 162, 2022.
Lin et al., "Feature Pyramid Networks for Object Detection," IEEE Xplore (2017).
Lin et al., "Feature Pyramid Networks for Object Detection," IEEE Xplore (2024).
Lin et al., "VILA: On Pre-training for Visual Language Models," https://github.com/Efficient-Large-Model/VILA (2024).
Liu et al., "A Survey of Attacks on Large Vision-Language Models: Resources, Advances, and Future Trends," Journal of Latex Class Files, vol. 14, No. (Aug. 8, 2021).
Liu et al., "Imitation from Observation: Learning to Imitate Behaviors from Raw Video via Context Translation," arXiv:1707.03374v2 (Jun. 18, 2018).

(56) References Cited

OTHER PUBLICATIONS

Liu et al., "Improved Baselines with Visual Instruction Tuning," IEEE Xplore (2024).
Liu et al., "RoBERTa: A Robustly Optimized BERT Pretraining Approach," arXiv:1907.11692v1 (Jul. 26, 2019).
Liu et al., "Visual Instruction Tuning," 37th Conference on Neural Information Processing Systems (NeurIPS 2023).
Lohmeier et al., Modular joint design for performance enhanced humanoid robot LOLA, 2006, IEEE, p. 88-93 (Year: 2006).
Lynch, Corey, and Pierre Sermanet. "Language conditioned imitation learning over unstructured data." arXiv preprint arXiv:2005.07648 (Jul. 7, 2020).
Lynch, Corey, et al. "Interactive language: Talking to robots in real time." IEEE Robotics and Automation Letters (Oct. 12, 2023).
Lynch, Corey, et al. "Learning latent plans from play." Conference on robot learning. Pmlr, (Dec. 20, 2020).
Lynch, Corey, Kamelia Aryafar, and Josh Attenberg. "Images don't lie: Transferring deep visual semantic features to large-scale multimodal learning to rank." Proceedings of the 22nd ACM SIGKDD international conference on knowledge discovery and data mining. (Nov. 20, 2015).
Mandi et al., "Towards More Generalizable One-shot Visual Imitation Learning," bencharXiv:2110.13423v2 [cs.RO] Feb. 8, 2022.
Maniparambil et al., "Do Vision and Language Encoders Represent the World Similarly?" IEEE Xplore (2024).
Mike, (date published Dec. 18, 2023), Tesla Optimus Gen 2 Humanoid Robot, Mikeshouts.com, URL: (https://mikeshouts.com/tesla-optimus-gen-2-humanoid-robot/, (Year: 2023).
N. Vahrenkamp, S. Wieland, P. Azad, D. Gonzalez, T. Asfour and R. Dillmann, "Visual servoing for humanoid grasping and manipulation tasks," Humanoids 2008—8th IEEE-RAS International Conference on Humanoid Robots, Daejeon, Korea (South), 2008, pp. 406-412, doi: 10.1109/ICHR.2008.4755985. (Year: 2008).
Nvidia "Object Detection Synthetic DataGeneration," Nvidia Corporation, (Nov. 9, 2024).
Online Hierarchical Optimization for Humanoid Control (Year: 2016).
Park et al., Whole-body walking pattern using pelvis-rotation for long stride and arm swing for yaw angular momentum compensation, 2021, IEEE, p. 47-52 (Year: 2021).
Peng et al., "DeepMimic: Example-Guided Deep Reinforcement Learning of Physics-Based Character Skills," ACM Trans. Graph., vol. 37, No. 4, Article 143. Publication date: Aug. 2018.
Pertsch, Karl, et al. "Fast: Efficient action tokenization for vision-language-action models." arXiv preprint arXiv:2501.09747 (2025).
Pirk, Sören, et al. "Online object representations with contrastive learning." arXiv preprint arXiv:1906.04312 (Jun. 10, 2019).
Radford et al., "Improving Language Understanding by Generative Pre-Training," 2018.
Radford et al., "Language Models are Unsupervised Multitask Learners," 2019.
Radford et al., "Learning Transferable Visual Models From Natural Language Supervision," Proceedings of the 38 th International Conference on Machine Learning, PMLR 139, 2021.
Raffel et al., "Exploring the Limits of Transfer Learning with a Unified Text-to-Text Transformer," Journal of Machine Learning Research 21 (2020) 1-67.
Ramachandruni et al., "Attentive Task-Net: Self Supervised Task-Attention Network for Imitation Learning using Video Demonstration," 2020 IEEE International Conference on Robotics and Automation (ICRA) May 31—Paris, France. (Aug. 31, 2020).
Rombach et al., "High-Resolution Image Synthesis with Latent Diffusion Models," IEEE Xplore (2022).
Sanh et al., "DistilBERT, a distilled version of BERT: smaller, faster, cheaper and lighter," arXiv:1910.01108v4 (Mar. 1, 2020).
Schulman et al., "Proximal Policy Optimization Algorithms," arXiv:1707.06347v2 (Aug. 28, 2017).
Sermanet, Pierre, et al. "Time-contrastive networks: Self-supervised learning from video." 2018 IEEE international conference on robotics and automation (ICRA). IEEE, (Mar. 20, 2018).
Sharma et al., "Third-Person Visual Imitation Learning via Decoupled Hierarchical Controller," 33rd Conference on Neural Information Processing Systems (NeurIPS 2019), Vancouver, Canada.
Sieb et al., "Graph-Structured Visual Imitation," 3rd Conference on Robot Learning (CoRL 2019), Osaka, Japan. (May 12, 2020).
Smith et al., "AVID: Learning Multi-Stage Tasks via Pixel-Level Translation of Human Videos," arXiv:1912.04443v3 (Jun. 21, 2020).
Stadie et al., "Third-Person Imitation Learning," arXiv:1703.01703v2 (Sep. 22, 2019).
Sun et al., "Learning by Watching via Keypoint Extraction and Imitation Learning," Machines 2022, 10, 1049. https://doi.org/10.3390/machines10111049 (Nov. 9, 2022).
Team, Octo Model, et al. "Octo: An open-source generalist robot policy." arXiv preprint arXiv:2405.12213 (May 20, 2024).
Tian et al. "Design of a Flexible Articulated Robotic Hand for a Humanoid Robot," Oct. 15-17, 2019, 2019 IEEE-RAS 19th International Conference on Humanoid Robots (Humanoids), pp. 572-577. (Year: 2019).
Touvron et al., "Llama 2: Open Foundation and Fine-Tuned Chat Models," arXiv:2307.09288v2 (Jul. 19, 2023).
Tsagarakis et al., Lower Body Design of the 'iCub' a Human-baby like Crawling Robot, 2006, IEEE., p. 450-455 (Year: 2006).
Tsagarakis et al., The design of the lower body of the compliant humanoid robot "cCub", 2011, IEEE, p. 2035-2040 (Year: 2011).
Vaswani et al., "Attention Is All You Need," 31st Conference on Neural Information Processing Systems (NIPS 2017), Long Beach, CA, USA. (Jun. 12, 2017).
Wang et al., "Structbert: Incorporating Language Structures Into Pre-Training for Deep Language Understanding,," arXiv:1908.04577v3 (Sep. 27, 2019).
Wiedebach, Georg, et al. "Walking on partial footholds including line contacts with the humanoid robot atlas." 2016 IEEE-RAS 16th International Conference on Humanoid Robots (Humanoids). IEEE, 2016.
Xiong et al., "Learning by Watching: Physical Imitation of Manipulation Skills from Human Videos," arXiv:2101.07241v2 (Nov. 14, 2021).
Yao et al., "Filip: Fine-Grained Interactive Language-Image Pre-Training," arXiv:2111.07783v1 (Nov. 9, 2021).
Ye, Seonghyeon, et al. "Latent action pretraining from videos." arXiv preprint arXiv:2410.11758 (2024).

* cited by examiner

EXTERIOR COVERING SYSTEM FOR A HUMANOID ROBOT

CROSS-REFERENCE TO RELATED APPLICATIONS

This application is a continuation of U.S. patent application Ser. No. 19/066,122, filed on Feb. 27, 2025, which: (i) is a continuation-in-part of U.S. Design application Ser. No. 29/889,764 filed on Apr. 17, 2023, and (ii) claims the benefit of and priority to U.S. Provisional Patent Application No. 63/626,028 filed on Feb. 27, 2024, 63/697,793, filed on Sep. 23, 2024, 63/697,816, filed on Sep. 23, 2024, 63/757,440, filed on Feb. 12, 2025, and 63/759,665, filed on Feb. 18, 2025.

TECHNICAL FIELD

This disclosure relates to exterior covering system for a robot, specifically a general-purpose humanoid robot. In particular, the exterior covering system are designed to selectively cover the robot's components (e.g., exoskeleton structures), while not limiting the range of motion and degrees of freedom of those robot components.

BACKGROUND

The field of humanoid robotics is rapidly evolving as a strategic response to an unprecedented labor shortage in the United States—where over 10 million jobs are considered unsafe or undesirable for human workers. This shortage has accelerated efforts to develop advanced, general-purpose humanoid robots that can take on hazardous or unappealing tasks in human-centric environments. These humanoid robots are designed to mirror the human form, typically featuring two legs, two arms, and an interface such as a screen. Beyond their human-like appearance, the design emphasis is on replicating the intricate range of motion and dexterity of the human torso and appendages. This is crucial not just for aesthetic imitation, but for functional excellence: a robot's torso and limbs must enable its end effectors to interact seamlessly with a wide variety of objects and perform complex manipulations, all while operating in a cost-effective, durable, and energy-efficient manner.

Despite significant progress, existing humanoid robots often struggle with limitations in their range of motion and fine motor skills—particularly in the upper body. Additionally, traditional rigid exterior coverings can impede movement and pose safety risks during interactions with humans. These challenges have underscored the need for a flexible exterior covering system. Such a system would not only protect the robot's internal components but also provide the necessary flexibility to maintain a full range of motion, enhancing both performance and safety. In summary, as industries increasingly integrate robots into workspaces, developing a flexible and responsive exterior is needed. This system will help enable humanoid robots to fully realize their potential in addressing labor shortages by safely and efficiently handling tasks in environments that are challenging or unsuitable for human workers.

SUMMARY

The present disclosure provides a humanoid robot having at least 45 degrees of freedom and comprising an upper portion that includes at least an extent of a torso, a head, a left shoulder, left arm, a left end effector, a right shoulder, a right arm, and a right end effector, and wherein said upper portion of the humanoid robot includes at least 65% of the at least 45 degrees of freedom; a flexible cover assembly that does not overlie every degree of freedom contained in the at least 45 degrees of freedom, but includes: (i) a first region that overlies an extent of a joint associated with a degree of freedom that is positioned between the torso and the left end effector, and wherein the first region has a first pattern, and (ii) a second region that does not overline the extent of the joint associated with the degree of freedom, and wherein the second region has a second pattern that is different from the first pattern.

The present disclosure provides a humanoid robot comprising: a torso; a neck coupled to an extent of the torso; a shoulder coupled to an extent of the torso and having an energy attenuation member positioned adjacent to an extent of said shoulder; a textile cover assembly positioned over an extent of the torso and the energy attenuation member, and wherein the textile cover assembly is secured to the humanoid robot using a coupling means.

The present disclosure provides a humanoid robot comprising: a torso; a neck, a left arm, and a right arm, each of which are coupled to an extent of the torso; a head coupled to the neck and having: (i) a semi-transparent frontal shell with a rear edge, and (ii) a non-transparent rear shell with a frontal edge, and wherein a portion of the frontal edge is configured to abut the rear edge of the frontal shell in an assembled head position; an cover assembly having: (i) a first textile region that overlies an extent of the neck and has a first pattern, and (ii) a second textile region that overlines an extent of the left arm and has a second pattern different from the first pattern.

The present disclosure provides a humanoid robot, comprising: a torso portion; an arm assembly extending from the torso portion; a leg assembly extending from the torso portion; an exterior covering system configured to cover at least a portion of the torso portion, arm assembly, and leg assembly, the exterior covering system comprising: an energy attenuation assembly positioned adjacent to at least one of the torso portion, arm assembly, or leg assembly; a cover assembly positioned over the energy attenuation assembly; and a coupling means for securing the cover assembly to the humanoid robot.

The present disclosure provides a humanoid robot, comprising: a torso portion; an arm assembly extending from the torso portion; a leg assembly extending from the torso portion; and an exterior covering system configured to cover at least a portion of the torso portion, arm assembly, and leg assembly, the exterior covering system comprising: an energy attenuation assembly comprising a plurality of energy attenuation members, each energy attenuation member configured to be positioned at a specific location on the humanoid robot; a cover assembly comprising a plurality of cover components, each cover component configured to cover a corresponding energy attenuation member; and a coupling means for securing each cover component to the humanoid robot.

The present disclosure provides a method of manufacturing an exterior covering system for a humanoid robot, comprising: forming a plurality of energy attenuation members, each energy attenuation member configured to be positioned at a specific location on the humanoid robot, and wherein the multi-layered structure for at least one energy attenuation member, the multi-layered structure comprising: a first layer having a first hardness and configured to be positioned closer to the humanoid robot; and a second layer having a second hardness different from the first density and configured to be positioned farther from the humanoid robot than the first layer; fabricating a plurality of cover components, each cover component configured to cover a corresponding energy attenuation member; and producing a coupling means for securing each cover component to the humanoid robot.

The present disclosure provides a humanoid robot, comprising: a torso portion; an arm assembly extending from the torso portion; a leg assembly extending from the torso portion; and an exterior covering system configured to cover at least a portion of the torso portion, arm assembly, and leg assembly, the exterior covering system comprising: an energy attenuation assembly comprising a plurality of layers, including an inner layer adjacent to the humanoid robot, and an outer layer; wherein the inner layer of the energy attenuation assembly has a first stiffness, and the outer layer has a second stiffness, wherein the first stiffness is greater than the second stiffness; a cover assembly positioned over the outer layer of the energy attenuation assembly; and a coupling means for securing the cover assembly to the humanoid robot.

The present disclosure provides an exterior covering system for a humanoid robot, comprising: an energy attenuation assembly comprising a plurality of layers, including an inner layer configured to be adjacent to the humanoid robot, and an outer layer; wherein the inner layer has a first density, and the outer layer has a second density, wherein the first density is greater than the second density; a cover assembly configured to be positioned over the outer layer of the energy attenuation assembly; and means for coupling the cover assembly to the humanoid robot.

The present disclosure provides a humanoid robot, comprising: a torso portion; an arm assembly extending from the torso portion; a leg assembly extending from the torso portion; and an exterior covering system configured to cover at least a portion of the torso portion, arm assembly, and leg assembly, the exterior covering system comprising: an energy attenuation assembly comprising a plurality of interconnected energy attenuation elements, each energy attenuation element having a specific geometric configuration; a cover assembly positioned over the energy attenuation assembly; and a coupling means for securing the cover assembly to the humanoid robot.

The present disclosure provides a method of designing an exterior covering system for a humanoid robot, comprising: determining a plurality of impact-prone areas on the humanoid robot; designing an energy attenuation assembly comprising a plurality of interconnected energy attenuation elements, each energy attenuation element having a specific geometric configuration based on its corresponding impact-prone area; creating a cover assembly configured to be positioned over the energy attenuation assembly; and developing a coupling means for securing the cover assembly to the humanoid robot.

The present disclosure provides an exterior covering system for a humanoid robot, comprising: an energy attenuation assembly comprising a plurality of interconnected energy attenuation elements, each energy attenuation element having a at least one of: a hexagonal shape, a circular shape, a square shape, or a triangular shape, and wherein the energy attenuation assembly further comprises multiple layers, each layer having energy attenuation elements with different densities, with an inner layer adjacent to the humanoid robot having a higher density than an outer layer farther from the humanoid robot; a cover assembly configured to be positioned over the energy attenuation assembly; and means for coupling the cover assembly to the humanoid robot.

The present disclosure provides an exterior covering system for a humanoid robot, comprising: an energy attenuation assembly comprising at least one energy attenuation member comprising a smart material configured to change its properties in response to external stimuli; a cover assembly configured to be positioned over the energy attenuation assembly; and means for coupling the cover assembly to the humanoid robot.

The exterior covering system for a humanoid robot optionally features a head design that includes a semi-transparent frontal shell with a rear edge and a non-transparent rear shell with a frontal edge, where a portion of the frontal edge abuts the rear edge. These edges may be angled relative to the robot's coronal plane, when the robot 1 is in a neutral position. The robot further incorporates a torso energy attenuation member that surrounds the torso and portions of the shoulders, comprising regions with differing stiffness and thickness—such as a stiffer, less deformable region near the left shoulder and a thicker upper portion compared to a thinner lower portion. In certain configurations, the upper part of the robot is actuated by tendon-driven mechanisms. For example, the humanoid robot may include a plurality of actuators providing a number of degrees of freedom greater than 30, and wherein a majority of the plurality of actuators are coupled to tendons. Also, the exterior covering system may include a flexible cover assembly designed without an extended hood over the head.

Complementing these features, the system may include a cover assembly divided into left and right portions that are coupled using a zipper or a frame with deformable projections to achieve an interference fit with the robot's torso housing, ensuring the cover remains within a close proximity (no more than five inches) of the housing. This cover can exhibit regions with different patterns and thicknesses, particularly distinguishing areas overlying joints from those that do not. Additionally, the energy attenuation assembly comprises multiple members-such as those for the torso, elbow, hip, knee, or shin—each possibly constructed as a multi-layered structure with inner layers of higher density and outer layers of lower density, arranged in various geometric shapes (hexagonal, circular, square, or triangular). These components may be optimized using finite element analysis and fabricated through additive manufacturing to effectively simulate and manage impact forces.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
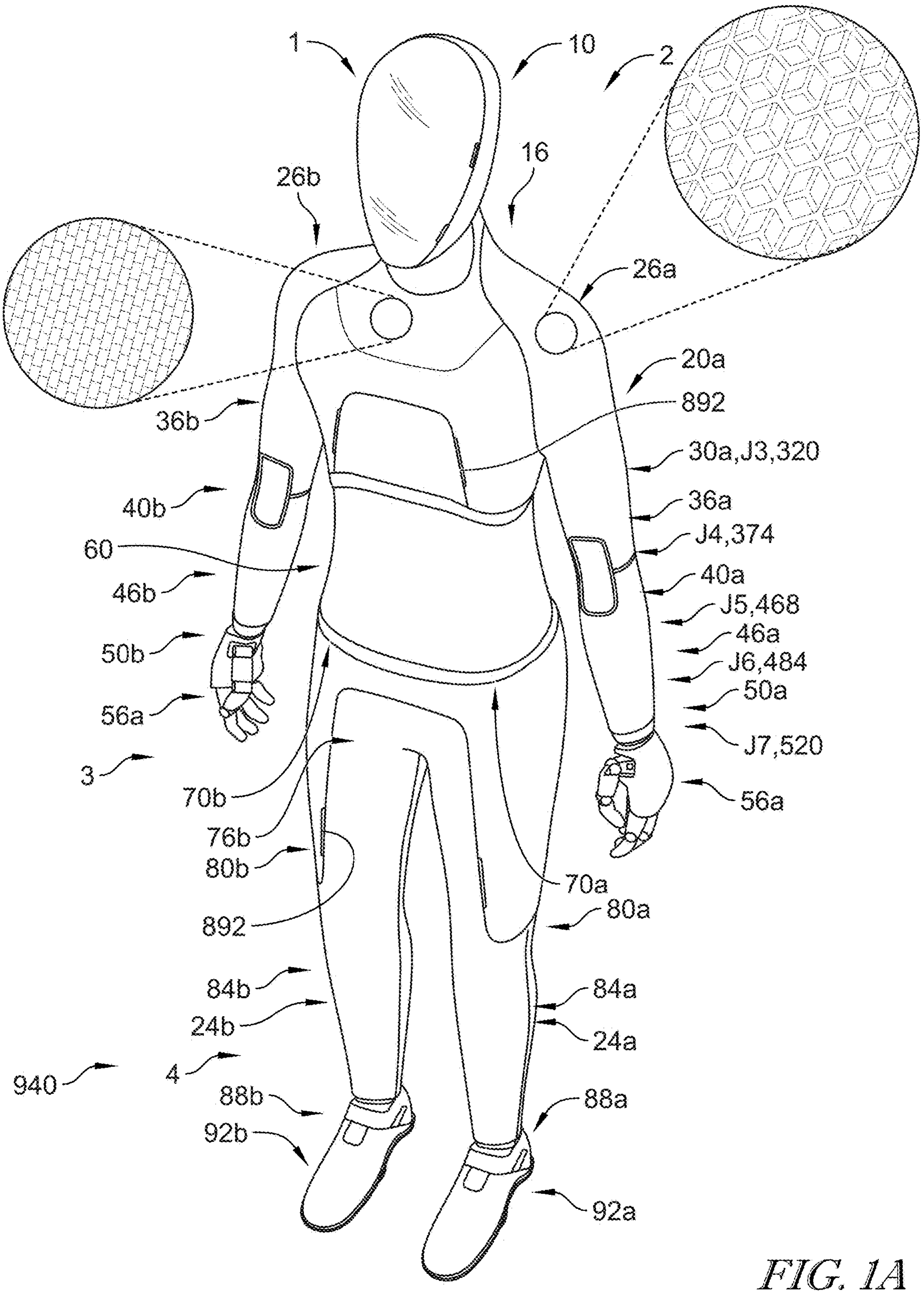
FIGS. 1A-1B is a perspective view of a humanoid robot in an neutral position and including an exterior covering system, and wherein said robot includes: (i) an upper portion having the following parts: (a) a head/neck, (b) a torso, (c) left and right shoulders, (d) left and right upper arm assemblies that each include an upper humerus, lower humerus, upper forearms, and lower forearms, (e) left and right wrists, and (f) left and right hands, (ii) a central portion having the following parts: (a) a waist/spine, (b) a pelvis, (c) left and right hips, (d) left and right upper thighs, and (f) left and right lower thighs, and (iii) a lower portion having the following parts: (a) left and right shins, (b) left and right talus, and (c) left and right feet.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes several embodiments in many different forms, there is shown in the drawings and will herein be described in detail embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. Accordingly, the drawings, flow charts and detailed description are to be regarded as illustrative in nature, not restrictive or limiting.

A. Introduction

General-purpose humanoid robots are designed to emulate human form and functionality, featuring two legs, two arms, and a display screen. The development of these robots necessitates torso and arm assemblies that closely replicate human movement, capabilities, and structural nuances. The need for these assemblies extends beyond mere cosmetic resemblance; it is important that they enable the robot's end effector to interact seamlessly with and physically manipulate a wide array of objects within complex environments. Additionally, these assemblies must be designed for durability, cost-effectiveness, and efficient power consumption, ensuring optimal functionality while operating within the robot's limited battery resources.

The humanoid robot is comprised of various assemblies that function cohesively to achieve a humanoid shape and facilitate human-like movement. For example, the upper arm structure, spanning from the shoulder to the elbow, may include a shoulder assembly, an upper humerus assembly, a lower humerus assembly, and an upper forearm assembly. These assemblies may feature one or more housings, which serve multiple purposes as they protect the internal operational systems (such as actuators, electronics, and batteries), provide structural integrity to the robot, and offer aesthetic continuity. The housings 890 may be designed to be hard, rigid, or substantially inflexible to ensure durability. Furthermore, these housings 890 incorporate (i) internal mounting features to secure internal systems and assemblies, (ii) structural reinforcements engineered to withstand operational loads, and (iii) external features that facilitate interoperability between adjacent components while maintaining a human-like appearance. In some cases, component housings include detachable shells that overlay the main casing, allowing for maintenance access and further refinement of the robot's external form.

While a consistent exterior appearance for the humanoid robot 1 is desirable, variations in structural and operational demands necessitate using different materials for different housings. As such, materials for specific component housings may be selected based on factors such as strength, toughness, elasticity, yield point, strain energy, resilience, elongation under load, weight, and thermal or electrical conductivity. Additionally, certain complex housing designs may be better suited for specific manufacturing techniques. Fabrication methods for housing components include machining, die casting, injection molding, compression molding, and composite fabrication. For instance, some housings may be produced via metal casting rather than machining to optimize cost, form factor, manufacturing speed, and mechanical properties.

Due to the inclusion of different housing materials or housing manufacturing reasons, it may be advantageous to obscure the exterior of housings using an exterior covering system. Said exterior covering system may provide additional benefits, as it can be easily replaced if damaged, protects internal components from dust and debris, conforms to the robot's form without excessive wrinkling, is generally inexpensive, and accommodates ventilation and thermal regulation needs. Further, exterior covering systems may not impede the robot's 1 range of motion, maintain access to underlying components, and allow for access and/or operation of indicators or other functional elements (e.g., buttons, levers, etc.) on the robot's exterior surface. Various exterior coverings may include attachment mechanisms for secure, detachable mounting at multiple locations, such as the collar, waist, sleeves, ankles, etc. Multi-point attachment ensures a snug fit, reducing the risk of interference between the robot and factory equipment. In some instances, the exterior coverings attach directly to the surface of specific components or their portions. The exterior covering systems are constructed from highly durable textiles with high stretch capabilities and resistance to pilling, abrasions, and cuts.

The disclosed exterior covering system for the humanoid robot 1 is form-fitting, meaning it is neither loose nor detached by more than a small margin (e.g., between 1 inch and 5 inches, preferably 3 inches) from the robot's exterior surface or the outer surface of the energy attenuation assembly without becoming disconnected. In other words, rather than draping loosely over the robot's frame, the exterior covering system is precisely and securely fitted to specific regions. The exterior covering material exhibits an elongation or stretch percentage exceeding 10% (preferably more than 30%, and most preferably greater than 50%), ensuring that when affixed to the robot 1, it remains under tension to conform closely to the robot's structure.

Furthermore, a single exterior cover of the exterior covering system does not cover or surround all actuators within the robot 1, a majority of the actuators contained in an upper portion of the robot 1, nor does it typically enclose more than three actuators at a time. In other words, the single exterior cover does not resemble an oversized jumpsuit with a single zipper extending from the pelvis to the head region. Additionally, it does not feature a hood that covers a substantial portion of the robot's head. Instead, the exterior covering system may be designed to include textile inserts positioned strategically between moving joint components to further ensure that pivoting motion is not restricted at the robot's joints. Different textile patterns are incorporated to facilitate movement in specific regions, enhancing the robot's functional dexterity.

The humanoid robot 1 may also integrate an energy attenuation assembly comprising multiple energy attenuation members. These members are positioned beneath the exterior coverings and in contact with certain housings, contributing to impact absorption and structural integrity. The inclusion of energy attenuation members is beneficial for protecting the robot during operation and interaction with its environment. These members may be strategically placed adjacent to particular housings or specific portions thereof to provide additional support and protection to underlying components. The energy attenuation members are composed of non-rigid, deformable, compressible, or energy-absorbing materials. For example, component housings may include coupling features designed to accommodate energy attenuation members, particularly in interference zones where excessive rotation could result in a component collision. The energy attenuation members can be designed as detachable and replaceable elements. Depending on the embodiment, they may be coupled directly to the housing, surround the housing, or be secured via the exterior coverings. These features allow for modularity, enabling the replacement or removal of energy attenuation members as needed.

B. Robot

Figure 1B:
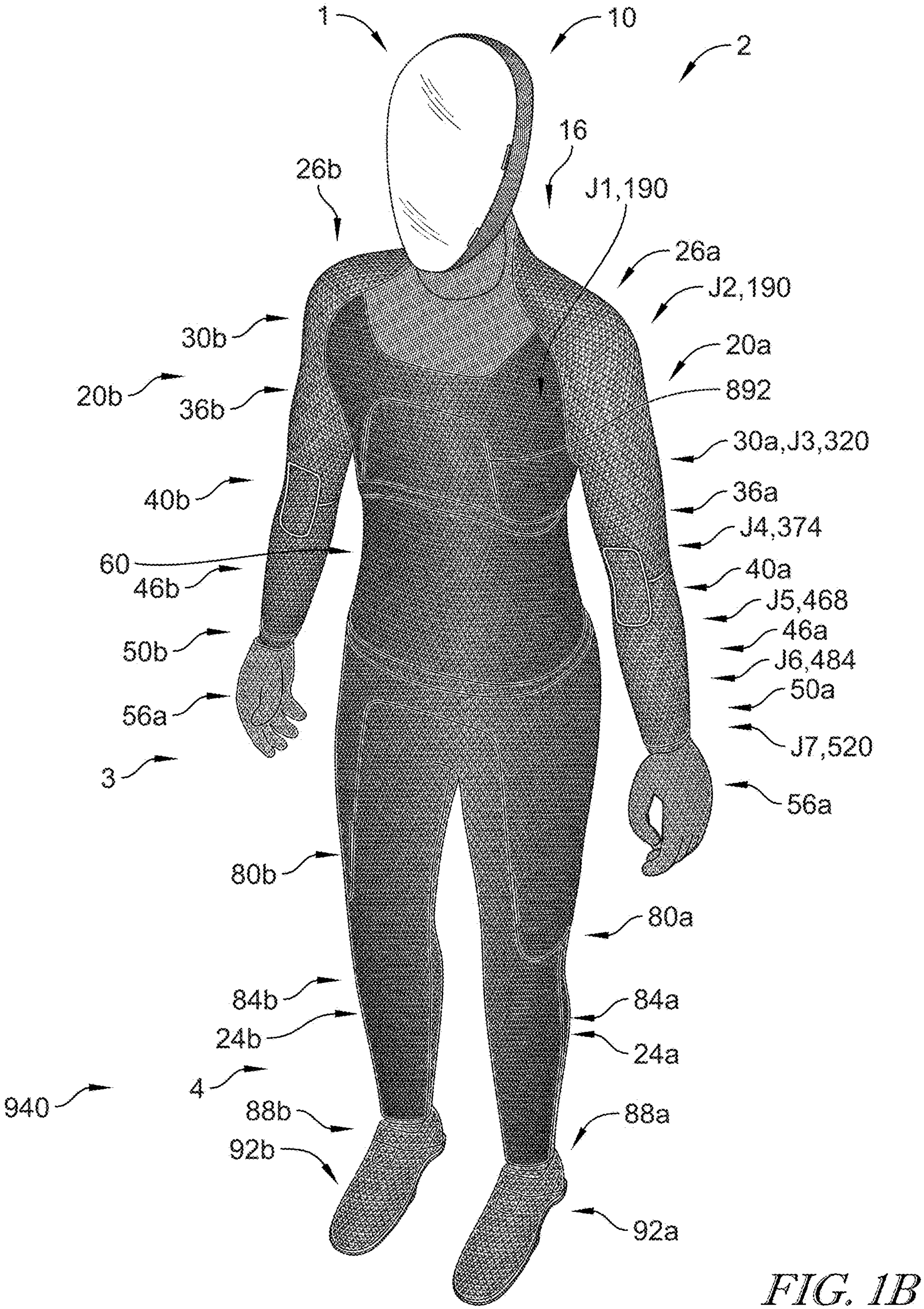
Figure 2:
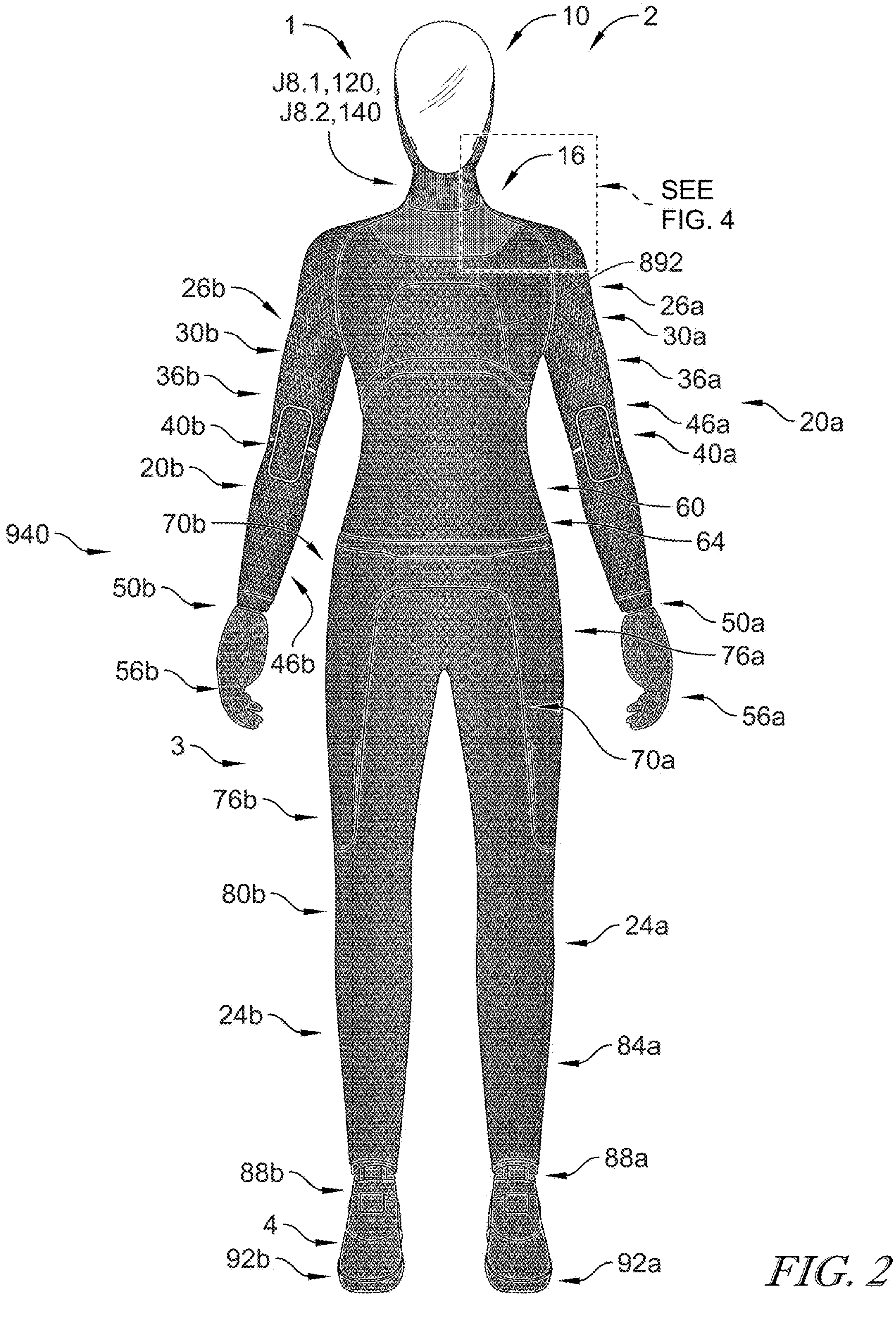
FIG. 2 is a front view of the humanoid robot of FIG. 1.

The figures disclose various embodiments of desirable components and an arrangement of the same in versatile and highly-functional humanoid robots 1. FIGS. 1-2 show a humanoid robot 1 including a head/neck 10, torso 16, left and right arms, and left and right legs.

As best shown in FIGS. 1-6, the illustrative robot 1 includes an upper portion 2 having the following parts: (a) a head/neck 10, (b) a torso 16, (c) left and right shoulders 26*a*, 26*b*, (d) left and right upper arm assemblies 20*a*, 20*b* that each include an upper humerus 30*a*, 30*b*, a lower humerus 36*a*, 36*b*, upper forearms 40*a*, 40*b*, and lower forearms 46*a*, 46*b*, (e) left and right wrists 50*a*, 50*b*, and (f) left and right end effectors 56*a*, 56*b*. The left and right end effectors 56*a*, 56*b* may have more than ten degrees of freedom, potentially eleven degrees of freedom, and possibly 16 degrees of freedom.

Specifically, said robot 1 may have two arms 5 that extend from the left and right sides of a torso 16. The arms 5 may include: (i) an arm actuator assembly (J1) 190 housed in the torso 16 with its output coupled to the shoulder 26*a*, 26*b*, (ii) a shoulder actuator assembly (J2) 280 housed in the shoulder 26*a*, 26*b* with its output coupled to the upper humerus 30*a*, 30*b*, (iii) an upper humerus actuator assembly (J3) 320 housed in the upper humerus 30*a*, 30*b* with its output coupled to the lower humerus 36*a*, 36*b*, and (iv) a lower humerus actuator assembly (J4) 374 housed in the lower humerus 36*a*, 36*b* with its output coupled to the upper forearm 40*a*, 40*b*, at least partially defining the movement of the elbow. The lower forearm 46*a*, 46*b* includes two actuators: (i) a lower arm twist actuator assembly (J5) 468 and (ii) a wrist flex actuator assembly (J6) 484. A wrist pivot actuator assembly (J7) 520 housed in the wrist 50*a*, 50*b* may be configured to cooperate with the lower arm twist actuator assembly (J5) 468 and the wrist flex actuator assembly (J6) 484. Together, the three lower arm actuators J5-J7 are positioned such that their individual axes are perpendicular to each other to control roll (J5), pitch (J6), and yaw (J7) of the wrist 50*a*, 50*b* to position the hand 56*a*, 56*b*.

Figure 3:
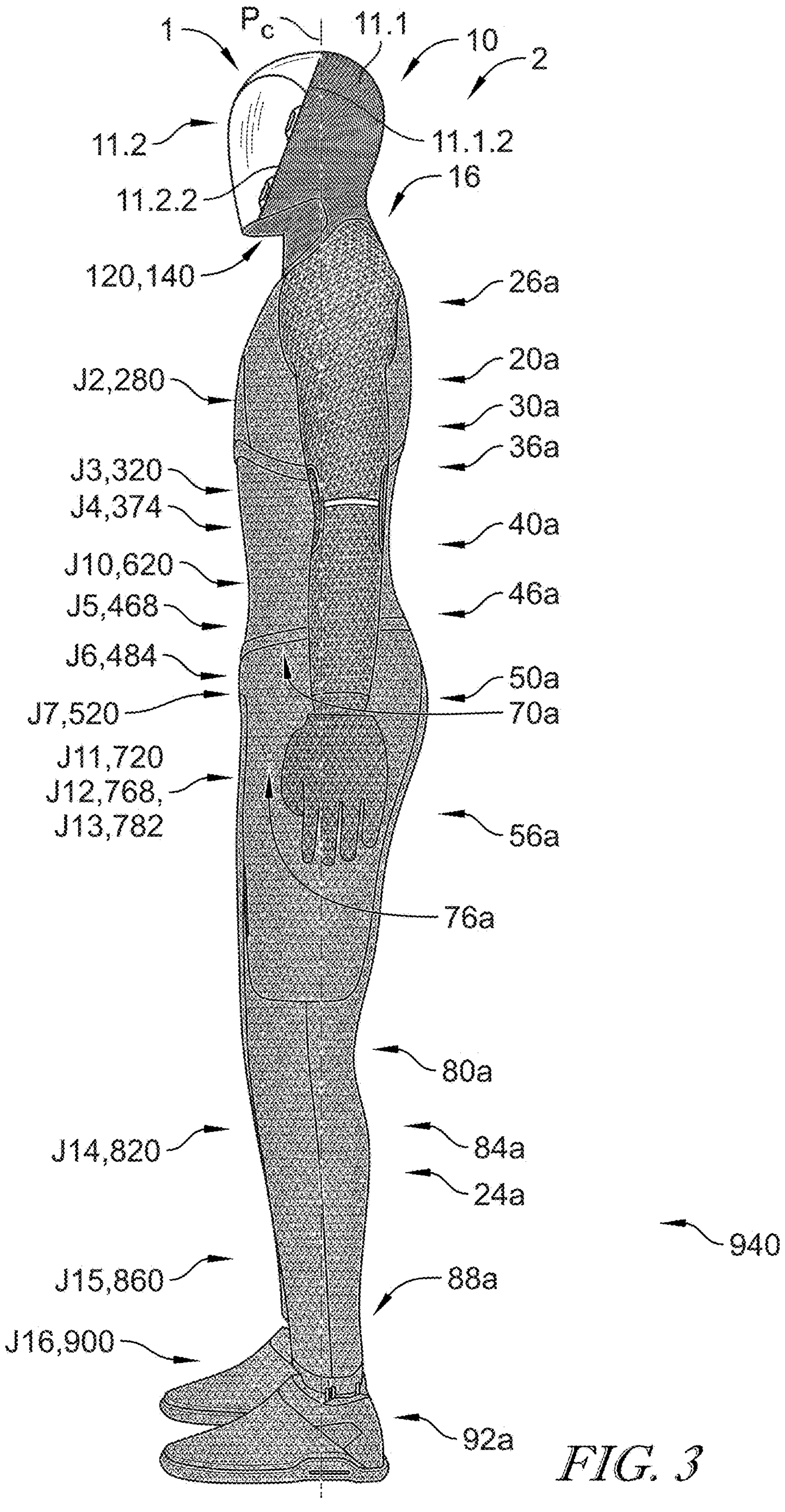
FIG. 3 is a left view of the humanoid robot of FIG. 1.

The head 10 may include a semi-transparent frontal shell 11.2 with a rear edge 11.2.2, and a non-transparent rear shell 11.1 with a frontal edge 11.1.2, and wherein a portion of the frontal edge 11.1.2 is configured to abut the rear edge 11.2.2. Additionally, the frontal and rear edges 11.1.2, 11.2.2 are angled at a non-zero angle relative to a coronal plane Pc when the humanoid robot 1 is in a neutral position (as shown in FIG. 3). Further, lights may be disposed on the lateral sides of the head 10. Also, the above described display may be visible through the semi-transparent frontal shell. Additional details about the structural arrangement and configuration of the head are disclosed in U.S. patents application Ser. Nos. 18/919,263, 18/919,274, 19/033,973, and PCT/US25/12544, each of which is incorporated herein by reference.

In addition, the head and neck 10 may include: (i) a head twist actuator (J8.1) 120 that may twist or rotate the head 10 with respect to the torso 16 and (ii) a head nod actuator (J8.2) 140 to adjust the pitch of the head. The actuators J8.1 and J8.2 are positioned to provide 2 DoF of the head 10 (i.e., roll and pitch). Although the head and neck 10 are not intended to contact or manipulate objects, the head 10 completes the human like form and may contain cameras, displays, or other user interfaces. For example, the head twist actuator (J8.1) 120 and/or the head nod actuator (J8.2) 140 may be used to direct the field of view of one or more cameras or sensors contained within the head 10. The head twist actuator (J8.1) 120 and the head nod actuator (J8.2) 140 may cooperate with each other for movement of the head 10, but are not generally linked to the other actuators.

In summary, the humanoid robot 1 may include actuators (J1-J16) housed within components of the robot 1 to actuate the movement of said components. Below is a summary table showing the actuator reference names and numbers, actuator names, and associated components from a high level configuration of the robot 1.

TABLE 1

| Actuator | Actuator Name | Actuator Axis |
|---|---|---|
| J1 (190) | Arm Actuator | Arm Axis, $A_1$ |
| J2 (280) | Shoulder Actuator | Shoulder Axis, $A_2$ |
| J3 (320) | Upper Arm Twist, Upper Arm X, or Upper Arm Roll Actuator | Upper Arm Twist, Upper Arm X, or Upper Arm Roll Axis, $A_3$ |
| J4 (374) | Elbow, Arm Z, Arm Yaw, or Lower Humerus Actuator | Elbow, Arm Z, Arm Yaw, or Lower Humerus Axis, $A_4$ |
| J5 (468) | Lower Arm Twist, Lower Arm X, or Lower Arm Roll Actuator | Lower Arm Twist, Lower Arm X, or Lower Arm Roll Axis, $A_5$ |
| J6 (484) | Wrist Flex, Wrist/Hand Y, Wrist/Hand Pitch, or Flick Actuator | Wrist Flex, Wrist/Hand Y, Wrist/Hand Pitch, or Flick Axis, $A_6$ |
| J7 (520) | Wrist Pivot, Wrist/Hand Z, Wrist/Hand Yaw, or Wave Actuator | Wrist Pivot, Wrist/Hand Z, Wrist/Hand Yaw, or Wave Axis, $A_7$ |
| J8.1 (120) | Head Twist, Head No, or First Head Actuator | Head Twist, Head No, or First Head Axis, $A_{8.1}$ |
| J8.2 (140) | Head Nod, Head Yes, or Second Head Actuator | Head Nod, Head Yes, or Second Head Axis, $A_{8.2}$ |
| J9 (680) | Torso Lean, Spine X, Torso/Spine Roll, or First Spine Actuator | Torso Lean Actuator, Spine X, Torso/Spine Roll, or First Spine Axis, $A_9$ |
| J10 (620) | Torso Twist, Spine Z, Torso/Spine Yaw, or Second Spine Actuator | Torso Twist, Spine Z, Torso/Spine Yaw, or Second Spine Axis, $A_{10}$ |
| J11 (720) | Hip Flex, Hip Y, Hip/Leg Pitch, Forward Kick, or First Hip Actuator | Hip Flex, Hip Y, Hip/Leg Pitch, Forward Kick, or First Hip Axis, $A_{11}$ |
| J12 (768) | Hip Pivot, Hip X, Hip/Leg Roll, Sideways Kick, or Second Hip Actuator | Hip Pivot, Hip X, Hip/Leg Roll, Sideways Kick, or Second Hip Axis, $A_{12}$ |
| J13 (782) | Leg Twist, Hip Z, or Hip/Leg Yaw Actuator | Leg Twist, Hip Z, or Hip/Leg Yaw Axis, $A_{13}$ |
| J14 (820) | Knee, Lower Thigh, Lower Leg Y, Lower Leg Pitch, or Rear Kick Actuator | Knee, Lower Thigh, Lower Leg Y, Lower Leg Pitch, or Rear Kick Axis, $A_{14}$ |
| J15 (860) | Foot Flex, Foot Y, Foot Pitch, or First Ankle Actuator | Foot Flex, Foot Y, Foot Pitch, or First Ankle Axis, $A_{15}$ |
| J16 (900) | Talus, Foot Roll, Foot X or Second Ankle Actuator | Talus, Foot Roll, Foot X or Second Ankle Axis, $A_{16}$ |

The robot 1 also includes: (i) a central portion 3 having the following parts: (a) a spine 60, (b) a pelvis 64, and (c) left and right hips 70*a*, 70*b*, and (ii) a lower portion 4 having the following parts: (a) left and right upper leg assemblies 24*a*, 24*b* that each include left and right upper thighs 76*a*, 76*b*, left and right lower thighs 80*a*, 80*b*, and left and right shins 84*a*, 84*b*, (b) left and right tali 88*a*, 88*b*, and (c) left and right feet 92*a*, 92*b*. The arrangement of actuators in the central and lower portions of the body includes actuators J9-J16 The spine or torso twist actuator assembly (J10) 620 is coupled to the bottom of the torso 16 at the waist 6. The spine or torso lean actuator assembly (J9) 680 is housed in the pelvis 64 with its output coupled to the waist or spine 60. The actuators J9 and J10 are positioned to provide 2 DoF of the torso 16 (i.e., yaw and roll). Further, a hip flex actuator assembly (J11) 720 is coupled to the left and right sides of the pelvis 64. The upper thigh 76*a*, 76*b* includes (i) a hip pivot actuator assembly (J12) 768 coupled to the output of the hip flex actuator assembly (J11) 720 and (ii) a leg twist actuator (J13) 782 coupled to the lower thigh 80*a*, 80*b*, providing an additional degree of freedom. The knee actuator (J14) 820 is housed in the lower thigh 80*a*, 80*b* and provides bending motion to the leg. A foot flex actuator (J15) 860 is housed in the shin 84*a*, 84*b* and actuates the pitch movement of the foot 92*a*, 92*b*. A foot roll actuator (J16) 900 is housed within the talus 88*a*, 88*b* to allow a rolling motion of the foot.

The above-described humanoid robot 1 includes desirable components and an arrangement of the same to enable the humanoid robot 1 to either handle undesirable and hazardous tasks and/or generate data from performing such tasks. These desirable components and their arrangement may also provide at least 30 degrees, preferably at least 45 degrees, and most preferably at least 60 degrees, and in some embodiments 62 degrees of freedom (DoF). In particular, the 62 degrees of freedom are distributed within the robot 1 as follows: (i) 48 degrees of freedom are contained in the upper portion 2 of the robot 1, (ii) 10 degrees of freedom are contained in the central portion 3 of the robot 1, and (iii) 4 degrees of freedom are contained in the lower portion 4 of the robot 1. Stated another way, the 62 degrees of freedom are distributed within the robot 1 as follows: (i) 16 degrees of freedom are contained in each end effector 56*a*, 56*b*, (ii) 6 degrees of freedom are contained in each arm assembly 5, and (iii) 2 degrees of freedom are contained in each of the neck 10, upper torso 16, and spine/pelvis 60, 64. The number and distribution of the degrees of freedom provide the robot 1 several significant advantages over conventional robots. For example, positioning over 60%, preferably over 65%, most preferably over 72%, and about 77% of the degrees of freedom in the upper portion 2 of said robot 1 allows it to perform complex, dexterous tasks that could not be performed without a substantial majority of the degrees of freedom being positioned in said upper portion. As another example, minimizing the number of degrees of freedom in the central portion 3 allows the robot 1 to have a larger torso 16, which permits the inclusion of a larger battery pack and additional computing power, thereby improving the performance and reliability of the robot 1. As a further example, including at least 5% of the degrees of freedom within the lower portion 4 of the robot 1 allows it to minimize the time and number of steps required for turning, which enables the robot 1 to have more humanlike movements and increases the speed at which certain tasks can be accomplished.

The above described 62 degrees of freedom of the robot 1 are provided by a combination of fewer than 60 actuators, preferably fewer than 50, and most preferably fewer than 45 actuators, and about 42 electric rotary and linear actuators (J1-J16), wherein an overwhelming majority (e.g., over 95%) of the actuators are electric rotary actuators as compared to linear actuators. In other words, the robot 1 includes only 2 linear actuators out of the 42 actuators contained in said robot 1. Of the 42 electric actuators, a majority (e.g., over 60%) are not configured to drive a linkage; instead, said actuators are designed to directly drive the next part(s) of the robot 1. In particular, linkages are coupled to: (i) 14 of the 40 rotary actuators, and (ii) all of the linear actuators. In other words, 35% of the rotary actuators and 100% of the linear actuators are coupled to a linkage. These linkages allow: (i) the fingers and thumb to be under-actuated, meaning the fingers and thumb retain their ability to flex, curl, or rotate around an object while eliminating the need for an actuator to control each joint or degree of freedom, (ii) the wrist to have two degrees of freedom that not only interact with one another but are also substantially perpendicular to one another, and (iii) the foot to pivot around an axis that is located well forward (e.g., more than 10% of the overall length of the foot) of the center of the drive linkage. In other embodiments, the humanoid robot 1 may include at least 45 degrees of freedom, wherein an upper portion includes at least an extent of a torso, a head, a left shoulder, a left arm, a left end effector, a right shoulder, a right arm, and a right end effector. Here, the upper portion 2 of the humanoid robot 1 includes at least 65% of the at least 45 degrees of freedom, and wherein a majority of the degrees of freedom positioned in the upper portion 2 of the humanoid robot 1 are provided by tendon-driven actuators. Specifically, each of the 32 degrees of freedom contained in the robot's 1 end effectors 56*a*, 56*b* may be controlled by tendon-driven actuators.

In addition to optimized kinematic configurations, the robot 1 may have high-precision actuators paired with real-time sensor feedback loops and a control system. The sensors may be designed to continuously monitor the robot's orientation, speed, and the force exerted on one or more robot components (e.g., arm assembly, leg assembly, etc.). The control system may comprise a computing device including a processor and memory, and instructions that, when executed by the computing device, receive data from a plurality of sensors and control the actuators to affect the movement of one or more of the robot components. The computing device of the robot may reside in a networked environment and execute additional instructions and/or applications not disclosed herein. The collected data can be processed by an advanced computing architecture, residing in the networked environment, to further train the neural networks that enable the robot 1 to perform its tasks (e.g., enabling it to walk more human-like, climb stairs, or traverse uneven terrain with fluidity and stability) or said data may be used to train other neural networks that are designed to control different robots. Additionally, the disclosed advanced robots may also address technical challenges related to dexterity and object manipulation. For example, the disclosed robots may include end effectors that feature multi-jointed designs with a high number of degrees of freedom, enabling complex and precise movements. Additionally, tactile sensors may be embedded in said end effectors to provide detailed feedback on pressure, texture, and temperature, which again can be used to train local or remote neural networks to improve the execution of the set of tasks and/or the response to other sensor input. To enable the robot to perform the described tasks or commands, the robot may include local or remote access to compute that can: (i) receive a natural language command, (ii) process said command into text, (iii) tokenize the text to enable said text, along with other tokenized sensor data (e.g., images of the robot's environment, current position and rotational data of the robot, etc.) to be processed by an AI model. The AI model may be a transformer-based model and can include a first pre-trained transformer-based AI model, and a second pre-trained transformer-based AI model. The first model of the AI model can process the data to break the command into sub-steps based on the provided data, (v) a second model of the AI model can then be employed to provide positions and rotations to the whole body controller of the robot, (vi) said whole body controller can translate these positions and rotations to actuator controls in order to allow the humanoid robot to perform the identified sub-step, and (vii) points v and vi are repeated until all of the sub-steps are performed, which therefore completes the received command from the user. In other embodiments, the first and second models may be combined into a single model or the first and second AI models can be split into several (e.g., between 3 and 20) models.

The first AI model can be remotely accessible, locally deployed, or a combination thereof. Additionally, said first model may be based on a multimodal large language model (i.e., MLLM), a bipedal action model (i.e. BAM), a combination of both, or a hierarchical arrangement of models that may include multiple MLLMs, BAMs, and/or LLMs. Like the first model, the second model can be remotely accessible, locally deployed, or a combination thereof. Additionally, said second AI model may be based on a bipedal action model (i.e. BAM), or a hierarchical arrangement of language models that may include multiple MLLMs, BAMs, and/or LLMs.

As described herein, the bipedal action model (i.e. BAM) may be based upon a multimodal large language model (i.e., MLLM) that has been retrained, refined, or modified in any manner using data collected from various sources, which may include: (i) image data (e.g., raw image data, annotated image data, synthetic data comprising computer-generated images used to augment real image datasets such as in instances where usable data is scarce, etc.), (ii) video data (e.g., raw video data, annotated video data, synthetic data comprising simulated video data used to train models on dynamic scenarios and interactions, etc.), (iii) text data (e.g., natural language instructions, dialogue data, machine readable instructions, natural language mapping data, etc.), (iv) depth data (e.g., map data, point cloud data, etc.), (v) robot joint trajectories, (vi) robot joint locations, (vii) robot joint location data (e.g., obtained from teleoperation of a robot), (viii) robot joint rotations data (e.g., obtained from teleoperation of a robot), (ix) other robot sensor data (e.g., inertial measurement unit (IMU) data, force and torque data, proximity sensor data, etc.), (x) simulation data, (xi) human demonstration data (e.g., images or videos of humans performing the task), (xii) robot demonstration data (e.g., images or videos of other robots performing the task), (xiii) any combination of the above data, and/or (xiv) any other known data type. It should be understood that the data may be labeled or unlabeled.

Specifically, the robot can use the BAM to determine and control actions of a robot necessary to perform a given command or sub-steps of a command based on information from multiple sources. Wherein said multiple sources may include: (i) an audio or speech input prompt to perform a task, (ii) image data from onboard or remote cameras, and (iii) robot state data, which may include current positional and rotational locational data. The output from the BAM may include: (i) position information (e.g., X, Y, Z), (ii) changes in positions (e.g., ΔX, ΔY, ΔZ), (iii) changes in location(s) (e.g., ΔX, ΔY, ΔZ), (iv) rotational position (e.g., A°, B°, C°), (v) rotational locations (e.g., A°, B°, C°), (vi) changes in rotational position (e.g., ΔA°, ΔB°, ΔC°), (vii) changes in rotational location(s) (e.g., ΔA°, ΔB°, ΔC°). In one example, the BAM may generate continuous actions (e.g., floating point values that can define wrist poses and finger joint angles) at 200 hz for 24 degrees of freedom based in part on the onboard images at 10 hz, speech from a human, and images from a camera coupled to the robot. The output from the BAM can then be provided to the whole body controller to translate the output from the BAM to the joint positions or joint torques at 1 khz for every actuator (e.g., all 42 actuators) contained in the humanoid robot. These outputs enable the robot to achieve incredibly accurate placement tolerances (e.g. less than 3 cm, less than 1 cm).

The robot 1 may further include a cutting-edge computer vision system, which may be equipped with depth perception and object recognition capabilities. By integrating sensory data with artificial intelligence algorithms, the robot 1 may learn from experience, improving its ability to grasp and manipulate a wide variety of objects over time. Predictive algorithms may also enable the robot 1 to anticipate the behavior of dynamic objects, such as catching a ball in mid-air or interacting with moving conveyor belts in industrial settings. Also, the capabilities of robot 1 may be enhanced by the incorporation of human-robot interaction (HRI) capabilities with the robot 1. Equipped with auditory sensors and advanced natural language processing (NLP) algorithms, the robot 1 may engage in verbal communication, understanding and generating speech in multiple languages. It may process contextual information to generate appropriate responses and detect emotional nuances in human speech, enabling meaningful and context-aware interactions. Additionally, the robot 1 may integrate non-verbal communication cues, such as gestures and block-based expressions (e.g., non-verbal communication indicia) displayed on its screen, to create intuitive and human-like interactions. These features may make the robot 1 highly adaptable to social environments, including classrooms, eldercare facilities, and hospitality settings.

It should be noted that the actuators (J1)-(J16) may utilize a range and/or combination of advanced motor types, including brushless DC motors, stepper motors, servo motors, coreless DC motors, synchronous AC motors, asynchronous induction motors, linear motors, piezoelectric motors, direct-drive motors, switched reluctance motors, permanent magnet synchronous motors (PMSMs), axial flux motors, and hybrid stepper motors. These motors may employ rare-earth permanent magnets, such as neodymium-iron-boron (NdFeB) alloys, samarium-cobalt (SmCo) magnets, ferrite magnets, alnico magnets, flexible magnets, bonded rare-earth magnets, and high-temperature permanent magnets, to achieve high torque density and energy efficiency. Motor windings may include high-conductivity copper wire with advanced ceramic or polyimide insulation for superior thermal and electrical performance. The motors may be coupled with various high-reduction gear mechanisms designed for precision and load handling, such as strain wave gearboxes (e.g., Harmonic drives), cycloidal reducers, planetary gearboxes, bevel gear systems, worm gears, parallel shaft helical gear mechanisms, spur gear assemblies, crossed helical gear systems, double-enveloping worm gears, herringbone gears, hypoid gears, rack-and-pinion systems, bevel hypoid gears, epicyclic gear trains, and differential gear systems. Additionally, some implementations may incorporate custom gear profiles optimized for torque transfer efficiency, backlash reduction, and noise minimization.

Examples of these alternative combinations include the arm actuator (J1) 190 or the shoulder actuator (J2) 280 utilizing a synchronous reluctance motor (SynRM) coupled with a compound planetary gearbox. In contrast, the wrist pivot actuator (J7) 520 might employ a coreless DC motor paired with a strain wave gearbox. This system could achieve reduction ratios in the range of 1:50 to 1:160, depending on the specific performance requirements. For actuators requiring a balance between speed and torque, such as the elbow actuator (J4) 374, a hybrid stepper motor combined with a cycloidal drive might be employed. This combination could achieve reduction ratios (1:30 to 1:87), offering a good compromise between speed and force.

In applications where back drivability is useful, such as in the knee actuator (J14) 820, a direct drive torque motor might be used in conjunction with a tendon-driven differential mechanism. The tendon system could be designed to achieve modest reduction ratios (e.g., 1:5 to 1:15) while maintaining high efficiency and low friction. For joints requiring extreme precision, like the head nod actuator (J8.2) 140, a closed-loop stepper motor system coupled with a micro-harmonic drive could be implemented. This configuration allows for micro-stepping capabilities and ultra-high reduction ratios (potentially exceeding 1:1000), enabling very fine angular adjustments. In scenarios where weight reduction is paramount, such as in distal joints like the wrist flex actuator (J6) 484, a flat or pancake-style brushless DC motor might be combined with a strain wave gearbox. This ultra-compact design could achieve reduction ratios from 1:50 to 1:160 while minimizing the added mass at the end of the arm assembly. For actuators that experience widely varying loads, like the hip flex actuator (J11) 720, a variable transmission system could be employed. This might involve a continuously variable planetary (CVP) gearbox coupled with a high-torque AC servomotor. The CVP allows for dynamic adjustment of the reduction ratio (e.g., from 1:1.5 to 1:120) based on real-time load conditions, optimizing performance across different operating scenarios.

In applications requiring high power density and thermal management, such as the torso twist actuator (J10) 620, a liquid-cooled axial flux permanent magnet motor could be paired with a multi-stage epicyclic gearbox. This setup allows for high continuous torque output while achieving reduction ratios up to 1:500 or more through the cascaded planetary stages. For joints that benefit from inherent compliance, like the foot roll actuator (J16) 900, a series elastic actuator (SEA) configuration might be used. This could involve a standard brushless DC motor coupled with a ball screw mechanism and a torsional spring element. The effective reduction ratio of this system can vary based on the spring stiffness and ball screw pitch, potentially ranging from 1:10 to 1:100. In scenarios where extremely high reduction ratios are required, such as in a fine manipulation end-effector, a combination of different gearing types might be employed. For example, a worm gear (providing a reduction of 1:50) could be coupled with a cycloid reducer (1:87 reduction), resulting in a compound reduction ratio of 1:4350. Additionally and/or alternatively, a majority or every actuator contained in the robot 1 may be tendon-driven.

Additionally, to achieve exceptional positional accuracy and ensure reliable operation, each motor may be equipped with advanced encoders, which could be optical, magnetic, capacitive, inductive, resistive, piezoelectric, hall-effect, potentiometric, or ultrasonic. These encoders may facilitate sub-millimeter-level accuracy, critical for applications requiring meticulous movement control. To complement positional data, said actuators may include integrated torque sensors that have strain gauges, piezoresistive sensors, magnetoelastic sensors, capacitive sensors, fiber-optic sensors, or rotary transformers. Additionally or alternatively, the actuators may include current sensors, such as Hall-effect sensors, shunt resistors, fluxgate sensors, Rogowski coils, or magnetoresistive sensors. Furthermore, the system may incorporate micro-electromechanical systems (MEMS) gyroscopes and/or accelerometers, which provide additional sensory data related to orientation, angular velocity, and linear acceleration. This sensory integration enhances the robot's ability to navigate complex environments and maintain stability during operation.

Further, the actuators or the output of the actuators may include bearing housings constructed using advanced materials like carbon-fiber-reinforced polymers (CFRPs), fiberglass-reinforced polymers (FRPs), metal alloys, polyetheretherketone (PEEK), thermoplastic composites, and ultra-high-molecular-weight polyethylene (UHMWPE). Additionally, the manufacturing processes for CFRPs, such as filament winding or automated fiber placement, allow for precise control over fiber orientation, further optimizing the mechanical performance of the housings. The bearings themselves can be fabricated from, include, or be processed using high-grade steel alloys (e.g., AISI 52100, M50, or 440C stainless steel), high-performance nickel-based superalloys (e.g., Inconel 718 or Hastelloy), cobalt-based alloys (e.g., Stellite), advanced ceramics (e.g., alumina or zirconia-based composites), and polymer matrix composites reinforced with carbon or aramid fibers. These materials may also benefit from advanced heat treatments (e.g., vacuum hardening or cryogenic treatment), surface engineering processes (e.g., ion implantation or physical vapor deposition), or specialized coatings.

To further optimize performance, the rolling elements of the bearings may be composed of advanced ceramic materials (e.g., silicon nitride, tungsten carbide, or zirconia), sapphire, or composite materials combining ceramic with metal or polymer matrices. In another embodiment, the assembly may incorporate cylindrical roller bearings, angular contact ball bearings, or hybrid bearings that combine steel races with ceramic rolling elements. Additionally, spherical roller bearings, tapered roller bearings, needle roller bearings, magnetic bearings, or hybrids or combinations thereof. Cutting-edge manufacturing techniques, including additive manufacturing methods like selective laser melting (SLM), could be employed to create complex bearing geometries. These geometries may integrate features such as internal cooling channels, lubrication reservoirs, or textured surfaces to enhance lubrication retention and minimize wear.

The incorporation of such features allows for improved thermal management, reduced friction, and consistent lubrication distribution, even under challenging operating conditions. Additive manufacturing also enables the production of customized bearing designs with minimal material waste, aligning with sustainable manufacturing practices. In addition to additive manufacturing, other advanced processes like precision machining, laser hardening, or chemical vapor deposition (CVD) coatings may be applied to enhance the surface properties of the bearings. These techniques can improve wear resistance, reduce friction, and provide protection against corrosion, further extending the operational life of the components. The integration of smart sensors within the bearing housing is another potential enhancement, allowing for real-time monitoring of parameters such as temperature, vibration, and load. This data can be used to predict maintenance needs and prevent unexpected failures, ensuring optimal performance and reliability in critical applications.

Additionally and/or alternatively, common actuators may be used in the humanoid robot 1, which have the following torque ratings.

TABLE 2

| Actuator Type | Actuator | Momentary Peak Torque (N-m) | Preferred Momentary Peak Torque (N-m) |
|---|---|---|---|
| 1 | J11 (720)<br>J14 (820) | 265.6-398.4 | 298.8-365.2 |
| 2 | J9 (680)<br>J10 (620)<br>J12 (768)<br>J13 (782) | 101.6-152.4 | 114.3-139.7 |
| 3 | J1 (190)<br>J2 (280)<br>J3 (320)<br>J4 (374) | 72.8-109.2 | 81.9-100.1 |
| 4 | J16 (900) | 96-144 | 108-132 |
| 5 | J5 (468)<br>J6 (484)<br>J7 (520) | 17.6-26.4 | 19.8-24.2 |
| 5a | J8.1 (120)<br>J8.2 (140) | 72.8-109.2 | 81.9- 100.1 |
| 6 | J15 (860)<br>linear | 96-144 | 108-132 |
| 7 | Hands | 3.1-4.7 | 3.5-4.3 |

Further, the above described actuators can provide the following ranges of motion

TABLE 3

| Actuator | First Angle | Second Angle | Range of Motion | Preferred First Angle | Preferred Second Angle | Preferred Range of Motion |
|---|---|---|---|---|---|---|
| JI | −162 | 108 | 270 | −148 | 99 | 247 |
| J2 | −129 | 48 | 177 | −118 | 44 | 162 |
| J3 | −144 | 144 | 288 | −132 | 132 | 264 |
| J4 | −162 | 18 | 180 | −148.5 | 16.5 | 165 |
| J5 | −182 | 182 | 364 | −176 | 176 | 352 |
| J6 | −54 | 54 | 108 | −49.5 | 49.5 | 99 |
| J7 | −108 | 108 | 216 | −99 | 99 | 198 |
| J8.1 | −108 | 108 | 216 | −99 | 99 | 198 |
| J8.2 | −30 | 30 | 60 | −27.5 | 27.5 | 55 |
| J9 | −36 | 36 | 72 | −33 | 33 | 66 |
| J10 | −108 | 108 | 216 | −99 | 99 | 198 |
| J11 | −192 | 42 | 234 | −176 | 38 | 214 |
| J12 | −30 | 54 | 84 | −27.5 | 49.5 | 77 |
| J13 | −108 | 108 | 216 | −99 | 99 | 198 |

TABLE 3-continued

| Actuator | First Angle | Second Angle | Range of Motion | Preferred First Angle | Preferred Second Angle | Preferred Range of Motion |
|---|---|---|---|---|---|---|
| J14 | −18 | 174 | 192 | −16.5 | 159.5 | 176 |
| J15 | −72 | 48 | 120 | −66 | 44 | 110 |
| J16 | −54 | 54 | 108 | −49.5 | 49.5 | 99 |

It is understood that the number/location of actuators, range of motion, and/or arrangement of the axis of rotation associated with the disclosed humanoid robot 1 materially and substantially differ from the number/location of actuators, range of motion, and/or arrangement of axis of rotation for a non-humanoid robot. As such, the structures, number/location of actuators, range of motion, and/or arrangement of the axis of rotation associated with a non-humanoid robot cannot be simply adopted or implemented into a humanoid robot without careful analysis and verification of the complex realities of designing, testing, and manufacturing a general-purpose humanoid robot. Theoretical designs that are an attempt to implement such modifications from a non-humanoid robot are insufficient (and in some instances, woefully insufficient) because they amount to mere design exercises that are not tethered to the complex realities of successfully designing, testing, and manufacturing a general-purpose humanoid robot.

In addition to their structural design, each of the above actuators (J1-J16) is coupled to or positioned within a housing 890. The housing 890 may partially enclose or encase said actuator, and in some embodiments, may act as the actuator housing. Accordingly, the actuator may not include a separate housing. Therefore, the housing 890 may act or perform as an exoskeleton for the robot 1. Although some of the actuators of the robot 1 are positioned at locations resembling the natural joints of a human, other actuators are included in the components to provide additional range of motion. For example, the shoulder actuator (J2), lower humerus actuator (J4), and wrist pivot actuator (J7) are located at positions that resemble the shoulder, elbow, and wrist of a human; however, the arm actuator (J1) in the torso 16 and upper humerus actuator (J3) provide additional degrees of freedom for the upper arm and the lower arm twist actuator (J5) and the wrist flex actuator (J6) provide additional degrees of freedom for the upper arm and wrist 50*a*, 50*b*.

C. Exterior Covering System

The exterior covering system 940 includes: (i) an energy attenuation assembly 942, (ii) a cover assembly 943, and (iii) a coupling means 946. The energy attenuation assembly 942 is configured to be positioned between the housings 890 and the cover assembly 943, while the coupling means 946 is designed to secure the cover assembly 943 and/or the energy attenuation assembly 942 to the robot 1. It should be understood that in other embodiments, the energy attenuation assembly 942 or the cover assembly 943 may be omitted.

a. Energy Attenuation Assembly

The exterior covering system 940 comprises an energy attenuation assembly 942, which is specifically engineered to mitigate the transfer of impact forces by deforming upon contact with an external object or a person. This deformation mechanism serves to reduce the magnitude of impact forces that would otherwise be directly transmitted between the robot 1 and an external entity. By incorporating materials and structures designed to absorb and dissipate kinetic energy, the energy attenuation assembly 942 helps protect nearby individuals and enhances the structural integrity of the robot 1. The controlled deformation process ensures that impact forces are distributed and attenuated before reaching critical internal components, thereby prolonging the operational longevity and durability of the robot 1. Additionally, the extent and manner of deformation may be tailored to specific impact scenarios (e.g., a forward fall, a sideways fall, self-impact with an arm assembly, etc.) with variations in energy attenuation properties being distributed uniformly or selectively across different regions of the assembly. As disclosed below, the assembly 942 may include collapsible honeycomb structures, viscoelastic materials, shape-memory alloys, microcellular foams, and composite laminates to optimize energy dissipation and structural adaptability.

Beyond its primary function of energy absorption and dissipation, the energy attenuation assembly 942 can also be designed and configured to influence the external shape and aesthetic characteristics of the robot 1 without significantly increasing its weight. This feature may be particularly advantageous in making the robot 1 appear more human-like, thereby improving social acceptance and interaction in environments where human-robot collaboration is expected. The structural properties of the energy attenuation assembly 942 can be customized to suit different operational settings, with modifications in material composition, thickness, and geometric design aimed at optimizing performance based on anticipated impact conditions. Furthermore, the assembly 942 may integrate active or semi-active materials capable of dynamically altering their stiffness or damping properties in response to real-time operational factors, thereby further enhancing the adaptability and protective capabilities of the system. In some embodiments, the assembly may include piezoelectric materials that generate electrical signals upon deformation, which could be used for sensing impact forces and adjusting robotic responses.

It is to be understood that the energy attenuation assembly 942 may be fabricated as a standalone component designed for attachment to or integration with the housing or exoskeleton 890 of the robot 1. The coupling of the energy attenuation assembly 942 to the robot 1 can be achieved through various means, including mechanical fasteners, chemical bonding techniques, integration, or a combination thereof. Specifically, the energy attenuation assembly 942 may be affixed to different regions of the robot's exoskeleton or housing 890 using mechanically deformable projections that securely engage with designated slots or cavities, areas prepared for chemical adhesion, and/or compression fitting techniques within the cover assembly 943. In some embodiments, the energy attenuation assembly 942 may be integrated directly into the structural framework of the robot 1 in areas that are more susceptible to contact or impact, such as articulated joints, limb extremities, or surfaces intended for human interaction. And in a final embodiment, the energy attenuation assembly 942 may be installed on the robot 1 and the exterior covering may be omitted. In this embodiment, the energy attenuation assembly 942 can act as and will be the external cover. Variations in the attachment methods may include the use of interlocking modular panels that can be replaced or reconfigured based on wear and tear or mission-specific requirements. Some embodiments may incorporate detachable and replaceable attenuation modules to facilitate maintenance and adaptability in different operational conditions.

Figure 7:
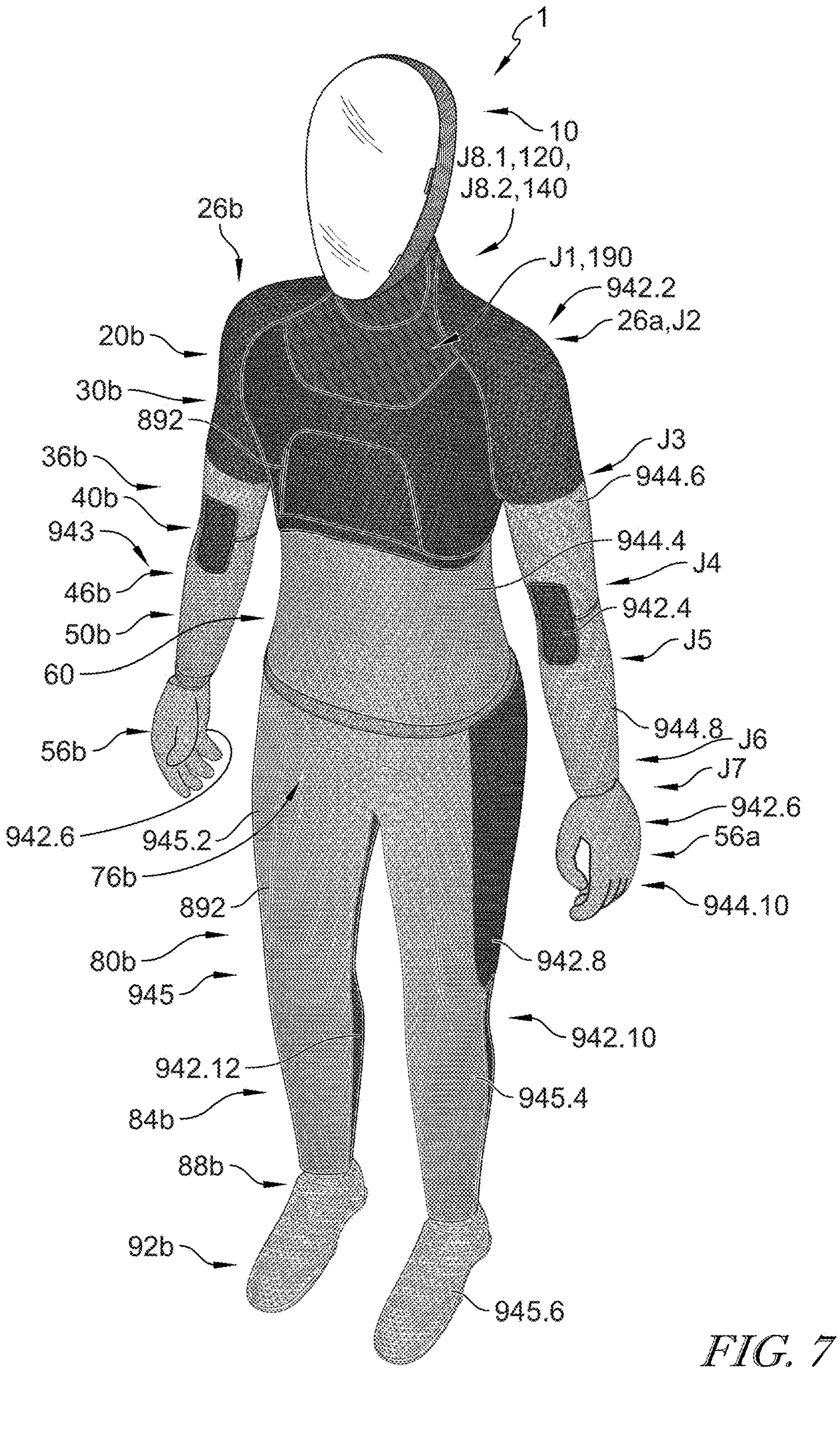
FIG. 7 is a perspective view of the humanoid robot showing the energy attenuation assembly positioned under the cover assembly, wherein said energy attenuation assembly includes a plurality of energy attenuation members.

The energy attenuation assembly 942 comprises one or more strategically positioned energy attenuation members 942.2-942.12, each tailored to regions of the robot 1 that are prone to contact or collisions. As depicted in FIG. 7, these include: (i) a torso energy attenuation member 942.2 attached to the torso 16, (ii) elbow energy attenuation members 942.4 coupled to the upper humerus 30*a*, 30*b* and/or lower humerus 36*a*, 36*b*, (iii) end effector energy attenuation members 942.6 affixed to the end effectors 56*a*, 56*b*, (iv) hip energy attenuation members 942.8 positioned on the pelvis 64 and/or hips 70*a*, 70*b*, (v) knee energy attenuation members 942.10 integrated into the lower thighs 80*a*, 80*b* and/or the shins 84*a*, 84*b*, and (vi) shin energy attenuation members 942.12 affixed to the shins 84*a*, 84*b*. It is to be noted that additional energy attenuation members 942.2-942.12 may be incorporated within the energy attenuation assembly 942 in alternative embodiments. For instance, energy attenuation members may also be positioned in the core region, forearms, or feet for additional protection. Conversely, certain attenuation members may be omitted or reduced in specific configurations. For example, the shin energy attenuation member 942.12 may be excluded in cases where shin protection is deemed unnecessary or redundant based on environmental or functional considerations.

Figure 8B:
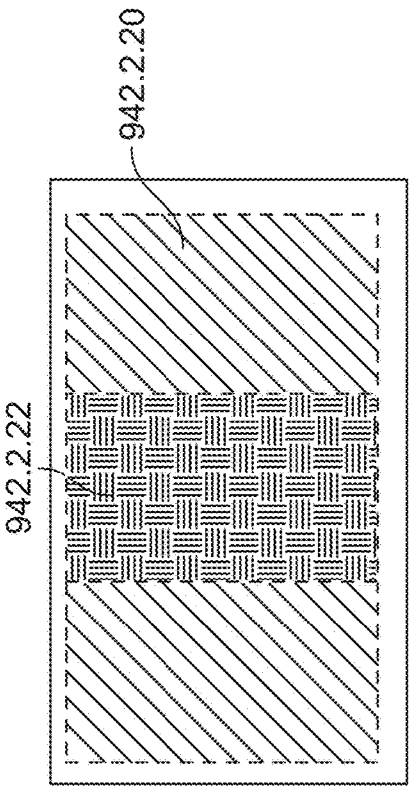
FIG. 8B is a frontal schematic view of a torso energy attenuation member, which shows the utilization of different materials on the lateral edges of a central portion of said energy attenuation member.
Figure 8C:
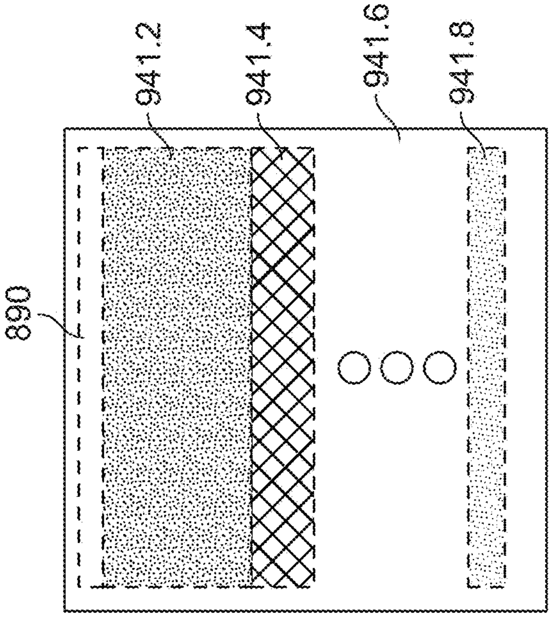
FIG. 8C is a cross-sectional schematic view of a torso energy attenuation member, showing a layered arrangement of materials that can be arranged depth-wise or vertically.
Figure 8A:
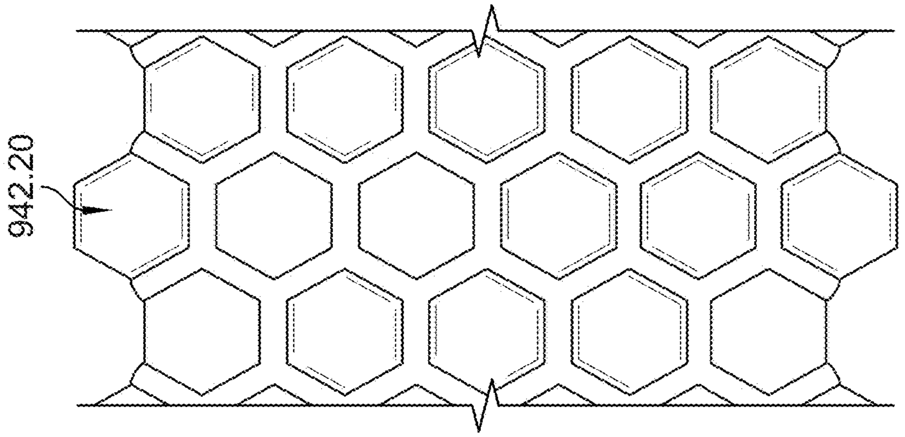
FIG. 8A is a top view of a plurality of energy attenuation elements contained in an energy attenuation member.
Figure 9:
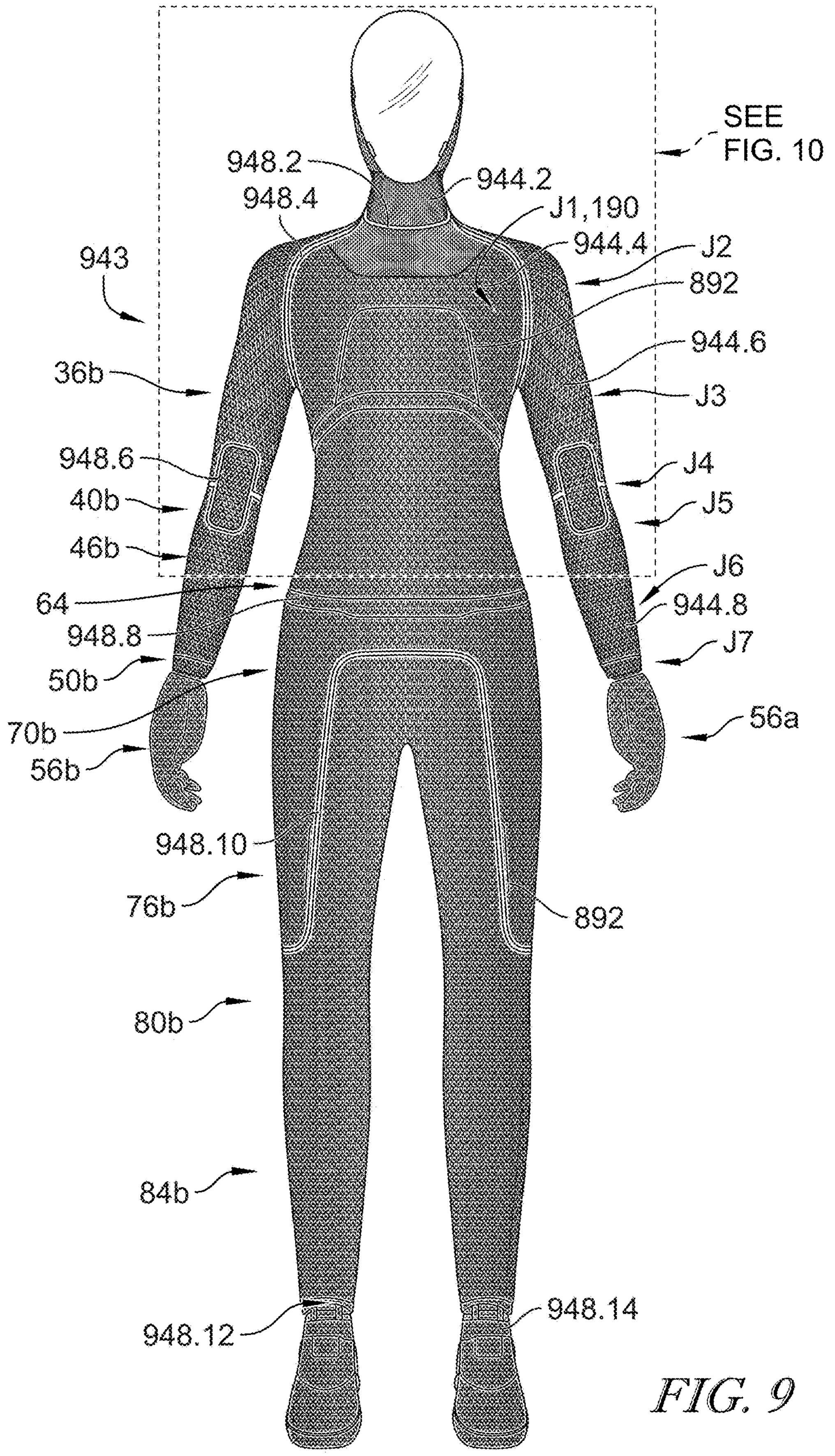
FIG. 9 is a front view of the humanoid robot of FIG. 2 and showing locations where the cover assembly is coupled to the humanoid robot, wherein the identified locations include a connection means.
Figure 10:
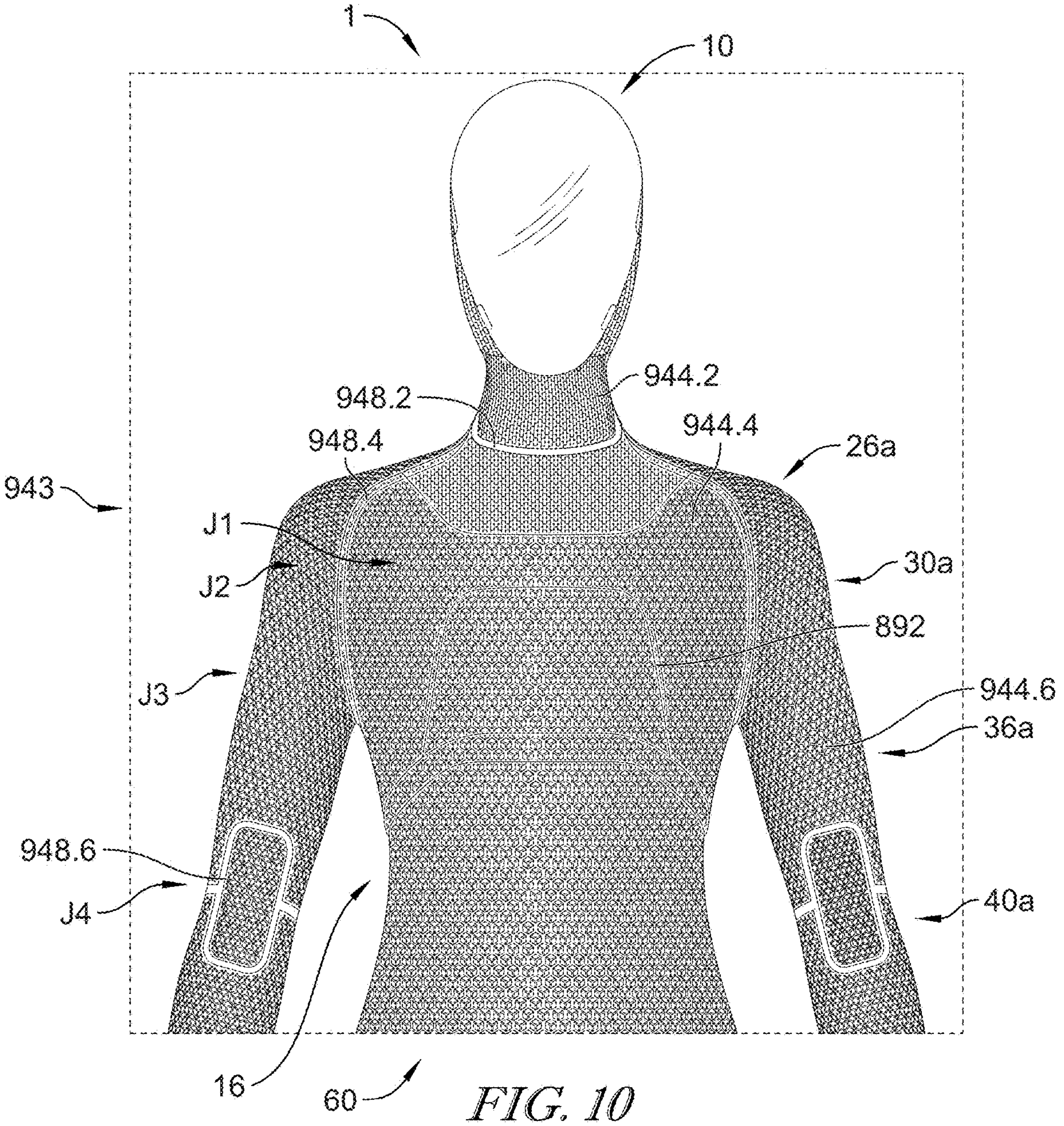
FIG. 10 is a zoomed-in view of an upper portion of the humanoid robot of FIG. 9.

As shown in FIG. 8A, the energy attenuation members 942 may incorporate one or more (e.g., between one and 100) energy attenuation elements 942.20 distributed laterally across said members 942. These energy attenuation elements 942.20 may adopt various geometric configurations, including hexagons, circles, squares, or other suitable shapes. Additionally or alternatively, the energy attenuation members 942.2-942.12 and/or their constituent energy attenuation elements 942.20 may be constructed with multiple layers, ranging between one and ten layers (as shown in FIG. 8C), to further refine impact mitigation properties. The selection and arrangement of these elements and layers can be optimized to balance energy absorption efficiency with structural integrity, ensuring effective force attenuation while maintaining the robot's mobility and performance. Other modifications may include temperature-adaptive materials, pressure-sensitive damping structures, or configurable rigidity systems that can be controlled based on environmental conditions and operational demands.

i. Component Energy Attenuation Members

As shown in FIG. 7, the component energy attenuation members include the torso energy attenuation member 942.2, end effector energy attenuation members 942.6, hip energy attenuation members 942.8, and/or shin energy attenuation members 942.12. While the following disclosure applies to each of these members 942.2, 942.6, 942.8, 942.12, the following disclosure will focus on the torso energy attenuation member 942.2. In particular, the torso energy attenuation member 942.2 can be coupled to the housing 162 of the robot 1 at the torso 16 by sliding it over the robot's head and then chemically bonding said member 942.2 to the housing of the torso and arms.

The torso energy attenuation member 942.2: (i) is positioned adjacent to the front and rear extents of the torso 16, (ii) surrounds a portion of the upper arm assembly 20*a*, 20*b*, (iii) extends around the sides of the robot 1, and (iv) is designed to fill a portion of the gap that is formed between the torso 16 and the upper arm assembly 20*a*, 20*b*. In other embodiments, the configuration of said torso energy attenuation member 942.2 may be modified or changed. For example, said torso energy attenuation member 942.2 may only cover the torso 16 and not the arms. In other embodiments, said torso energy attenuation member 942.2 may only be positioned on a frontal extent of the robot 1 or a rear extent of the robot 1. Finally, the torso energy attenuation member 942.2 may only wrap around an upper extent of the torso 16, which is adjacent to the robot's shoulder 26*a*, 26*b*. Finally, the torso energy attenuation member 942.2 may only wrap around the robot's shoulder 26*a*, 26*b*.

The torso energy attenuation member 942.2 can be made of a plurality (e.g., between 2 and 20) of different materials. The different materials may be distributed laterally (see FIG. 8B), wherein a first material 942.2.20 is positioned in a first or outer region (near the arms) and a second material 942.2.22 is positioned in a second or inner region that is located between the outer regions (covering the core of the torso). In an alternative embodiment, the different materials may be distributed depth-wise (see FIG. 8C), wherein a first material 941.2 is positioned in an inner region that is closest to the robot's center or battery and a second material 941.4 is positioned in an outer region that is outside of the inner region (closer to the cover assembly 943). In a final alternative embodiment, the different materials may be distributed length-wise, wherein a first material is positioned in an upper region that is closest to the robot's shoulders and a second material is positioned in a lower region that is adjacent to the upper region and positioned near the robot's stomach. In other words, the torso energy attenuation member 942.2 may include any known number of layers 941.2, 941.4, 941.6 (any number of layers-namely between 1 and 50), 941.8, wherein said variation may be lateral, depth, vertical, and/or a combination thereof.

The first and second materials may vary in any known manner, including changes between the manufacturing method, timing of the manufacturing method, and physical and/or material properties. As such, the first and second materials may have different densities, hardnesses, Young's moduli, compression sets, indentation force deflections (IFD), tensile strengths, damping capacities, or Poisson's ratios, wherein the first region may have greater values associated with the above variables in comparison to the second region. In this example, the material included in the outer region may have a density that is greater than the density of the material included in the inner region. In another example, the material included in the outer region may have a hardness that is greater than the hardness of the material included in the inner region.

In an alternative embodiment, the second region may have greater values associated with the above variables in comparison to the first region. Finally, the entire torso energy attenuation member 942.2 may include only a single region that includes substantially equal hardnesses, Young's moduli, compression sets, IFDs, tensile strengths, damping capacities, densities, and/or Poisson's ratios. A non-homogeneous (e.g., multiple or dual density) design/construction may be desirable to allow for a harder material to be positioned where the robot arm may contact the torso to help prevent damage from occurring when/if the robot contacts itself, and including a softer material in the center of the torso that is more likely to contact people or other objects. On the other hand, a homogeneous (e.g., single density) design/construction may be desirable to simplify manufacturing.

In one example, the torso energy attenuation member 942.2 can be made of two different densities of polyurethane. In other examples, the torso energy attenuation member 942.2 can be made from and/or include: (i) polymers (e.g., polyethylene foam (PE Foam), ethylene vinyl acetate (EVA) foam, polyurethane foam (including Memory Foam and Open-cell Polyurethane Foam), polyimide foam, polyvinyl chloride (PVC) foam, expanded polypropylene (EPP) foam, cross-linked polyethylene foam (XLPE), polyethylene terephthalate (PET) Foam), (ii) rubber foams (e.g., neoprene foam, silicone rubber foam, nitrile butadiene rubber (NBR) foam, ethylene propylene diene monomer (EPDM) foam, vinyl nitrile foam, thermoplastic elastomer (TPE) foam, elastomeric foam), (iii) natural foams, (iv) engineered foams (e.g., microcellular urethane (MCU) foam, reticulated polyurethane foam, melamine foam, convoluted foam), (v) composite and hybrid materials (e.g., multi-layered foams, fiberglass foam composites, metalized foam composites), (vi) expanded polystyrene (EPS), (vii) expanded polypropylene (EPP), (viii) Koroyd®, (ix) D3O®, (x) Poron® XRD, (xi) thermoplastic elastomers (TPEs), (xii) thermoplastic polyurethane (TPU), (xiii) any other known plastics, (xiv) any combination of the above, and/or (xv) any other material known to one of skill in the art.

Further, the torso energy attenuation member 942.2 may include any known structure of said materials, wherein said structures may include lattices, non-repeating units, and/or repeating units (e.g., cube, sphere, cylinder, cone, pyramid, torus, prism, tetrahedron, dodecahedron, octahedron, icosahedron, ellipsoid, paraboloid, cuboid, hexahedron). It should be understood that the repeating unit or lattice cell may be contained in a specific region or may propagate throughout the torso energy attenuation member 942.2. As such, the torso energy attenuation member 942.2 may include multiple different regions that each include a unique selection of: (i) material, including its chemical composition, (ii) properties, including mechanical and/or material based properties, (iii) shape, including lattice cells (e.g., surface or strut based) or material based shapes (e.g., porous materials), (iv) arrangements of shapes, etc. For example, variations between materials, properties, shapes, and/or the arrangement of said shapes can be optimized through computer simulation (FEA) to optimize the energy attenuation member or assembly for local loading conditions.

ii. Joint Energy Attenuation Members

The joint energy attenuation members primarily include elbow energy attenuation members 942.4 and knee energy attenuation members 942.10. While aspects of the component energy attenuation members may be positioned in and/or adjacent to a joint, the joint energy attenuation members are specifically designed to have an extent positioned within the joint itself rather than merely adjacent to it. By integrating these energy attenuation members 942.4, 942.10 directly into the joint space, controlled force dissipation and mechanical buffering can be achieved, reducing stress and impact forces transmitted through the robotic structure during movement. The joint energy attenuation members are configured to compress and/or expand dynamically as the robot moves its assemblies, allowing for both active and passive energy absorption to mitigate the effects of sudden acceleration, deceleration, or unexpected impacts. Their placement within the kinematic framework of the joint enables controlled compliance while preserving joint stability.

For example, the arm assembly 5 is configured to bend inward at the elbow actuator (J4), which couples the lower humerus 36*a*, 36*b* and the upper forearm 40*a*, 40*b*. When the robot 1 bends the lower arm inward, the upper forearm 40*a*, 40*b* may contact the lower humerus 36*a*, 36*b* at the limit of the joint's range of motion. To prevent structural damage and reduce mechanical wear, the elbow energy attenuation member 942.4 is designed to compress upon elbow flexion, thereby limiting the movement of the upper forearm 40*a*, 40*b* toward the lower humerus 36*a*, 36*b*. In certain embodiments, the elbow energy attenuation member 942.4 may be modularly replaceable, allowing for customization based on operational demands, damage, and/or wear and tear.

The joint energy attenuation members may be constructed from various materials, structures, configurations, chemical compositions, and/or designs, including those described in connection with the torso energy attenuation member 942.2. In some embodiments, the elbow energy attenuation members 942.4 may incorporate a multi-layered composition where different materials are arranged to achieve graded mechanical properties. For instance, the elbow energy attenuation members may consist of two or more distinct materials, with a softer material positioned on the outermost region and a harder, more rigid material located on the inner regions closer to the joint's central axis. This configuration creates a material gradient wherein stiffness increases progressively from the outer boundary of the elbow joint toward its core structure.

iii. Alternative Embodiments

Other embodiments of the energy attenuation assembly 942 and/or energy attenuation members may combine various advanced materials and architectural designs to absorb and dissipate impact energy across multiple scales. In one embodiment, multi-layered composite structures may incorporate phase-change materials (PCMs), such as microencapsulated paraffin wax embedded within high-performance polymer matrices. These PCMs absorb energy during thermal transitions from solid to liquid states, with the encapsulation size and concentration tuned to specific load conditions. Similarly, functionally graded materials (FGMs) or other multi-layered assemblies may be utilized, wherein the material composition or layers vary—from a stiff, impact-resistant outer layer to a soft, more compliant, energy-dissipative inner core—to optimize load distribution. Alternatively, the FGMs or multi-layered assemblies may vary from a soft, more compliant outer layer to a stiff, impact-resistant inner core. Further, and as discussed above, the FGMs or multi-layered assemblies' material composition or layers may vary in stiffness or have other properties that vary laterally. In summary, said stiffness or other properties of the energy attenuation member or assembly may vary across the depth of the member, laterally across the width, vertically across the height, or any combination thereof. Such FGMs or multi-layered assemblies can be further enhanced by incorporating gradient nanocomposites, where nanoparticles or nanofibers are dispersed in controlled gradients to tailor mechanical responses. In other examples, FGMs or multi-layered assemblies may include alternating layers of rigid and flexible materials to dissipate impact forces. Further, these composite attenuation members may be strategically located in critical regions, such as joints, limb segments, and torso sections, where localized energy dissipation is most needed.

Additional embodiments integrate adaptive damping mechanisms using smart fluids and electromechanical components. For example, magnetorheological (MR) fluids or magnetorheological elastomers (MREs) may be contained within flexible pouches or embedded channels; when subjected to controlled magnetic fields generated by integrated coils, their viscosity or stiffness rapidly increases, enabling real-time adjustment of damping properties. Additionally or alternatively, the energy attenuation assemblies and/or energy attenuation members may include compressible chambers with optional microfluidic networks, wherein said chambers may be filled with hydrogel, air, or any other liquid or gas. Further enhancements include shear-thickening fluids (STFs) impregnated in flexible fabrics, which instantly stiffen under high strain rates, and electroactive polymers that modify their mechanical properties upon exposure to electrical stimuli. Finally, said energy attenuation assemblies and/or energy attenuation members may include: (i) origami-inspired folding structures that could be integrated into the attenuation members, wherein the structures are designed to allow for controlled deformation and energy absorption, (ii) sacrificial structures designed to plastically deform or fracture in a controlled manner during high-energy impacts, and/or (iii) Kirigami-inspired structures that include engineered cut patterns designed to allow for controlled out-of-plane deformation and energy absorption, while maintaining in-plane flexibility. Wherein said structures are intended to be replaceable.

b. Cover Assembly

The cover assembly 943 is designed to: (i) be positioned adjacent to the energy attenuation assembly 942, the robot housings 890, or a combination thereof, and (ii) serve multiple functions that enhance the robot's durability, safety, and aesthetic appeal. Structurally, the cover assembly 943 may be flexible and acts as a protective barrier, shielding internal components from mechanical damage, environmental contaminants, and unintended interference. Functionally, it obscures the underlying robot housings 890 from view, contributing to a more polished and approachable appearance that facilitates human-robot interaction. Additionally, the cover assembly 943 is engineered to minimize potential damage the robot 1 could inflict upon external objects in the event of accidental contact. The disclosed cover assembly 943 may overlie all, a majority, or a minority of the actuators, degrees of freedom, and/or housings 890. Specifically, said cover assembly 943 may lack end effector covers or gloves; thus, at least 20 degrees of freedom, potentially more than 30 degrees of freedom, and probably at least 32 degrees of freedom will remain uncovered.

To achieve these objectives, the cover assembly 943 is constructed from advanced materials that balance flexibility, durability, and impact resistance. Given the dynamic nature of robotic movement, the cover assembly 943 is specifically designed to stretch, deform, or articulate in sync with the robot 1's range of motion. This is accomplished through the use of various textiles (e.g., woven fabric), segmented structures, articulated linkages, or embedded shape-memory materials that allow controlled expansion and contraction without impeding performance. In some implementations, the cover assembly 943 may incorporate an array of strain, pressure, or deformation sensors embedded within its structure, enabling real-time monitoring of mechanical stress and predictive maintenance. As such, it should be understood that all cover assemblies disclosed herein may not include textiles.

The cover assembly 943 is composed of multiple covers, each specifically designed to accommodate the anatomical segmentation of the robot 1 while ensuring compatibility with its articulated joints. The upper portion 2 includes an upper cover 944, which comprises several components: a neck cover 944.2 that provides protection while allowing rotational and tilting motion; a torso cover 944.4 that shields the central body while permitting flexion and torsional movements; an upper arm cover 944.6 and a lower arm cover 944.8, both of which safeguard the arm segments while maintaining freedom of movement; and an end effector cover 944.10 that encloses the robot's gripping or tool attachment mechanism, potentially incorporating soft, compliant materials to cushion contact with delicate objects.

Similarly, the lower portion 4 includes a lower cover 945, which comprises an upper leg cover 945.2, designed to enclose the robot's thigh while allowing unrestricted hip articulation; a lower leg cover 945.4, which protects the knee joint and tibial region and may feature accordion-like flexible structures to accommodate bending motions; and a foot cover 945.6, which ensures protection while maintaining stability and traction with the ground surface. While these covers are defined as discrete components, they may be coupled to one another using any known method (e.g., stitching, heat, pressure, chemical bonding, or mechanical coupling).

Figure 4:
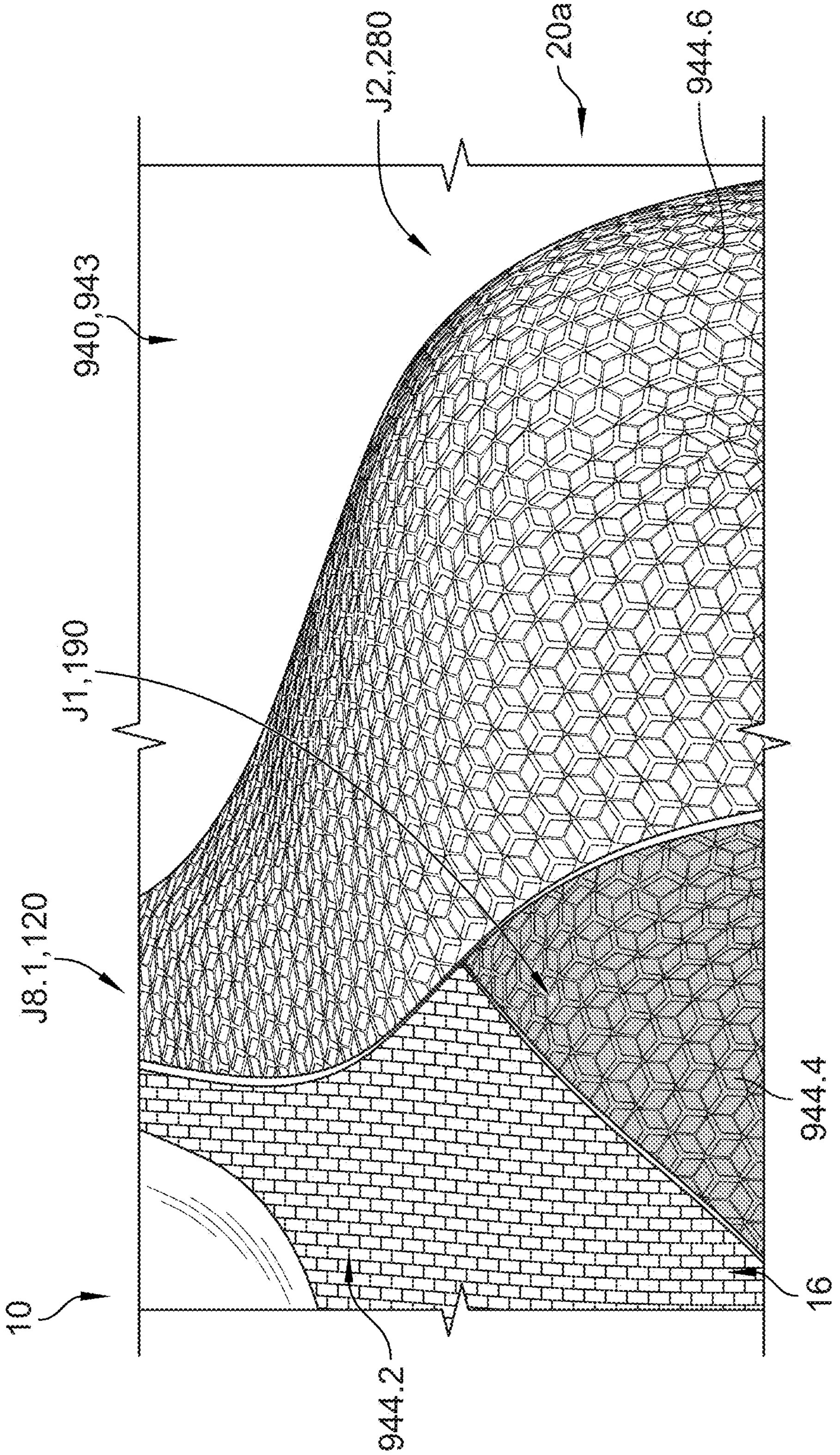
FIG. 4 is a zoomed-in view of the left shoulder, and an extent of the left arm of the humanoid robot of FIG. 2.
Figure 5:
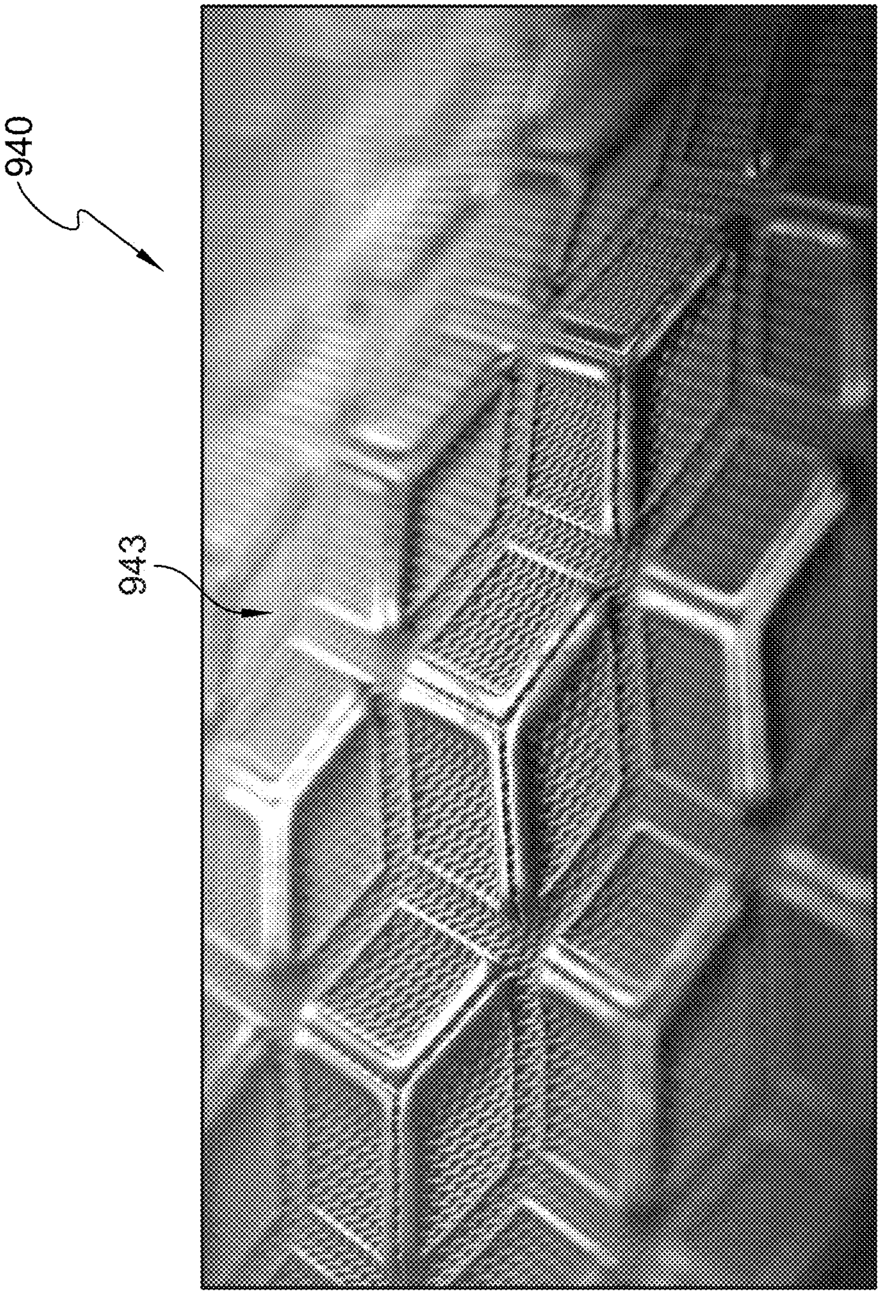
FIG. 5 is a zoomed-in view of an extent of the exterior covering system of FIG. 4.
Figure 6:
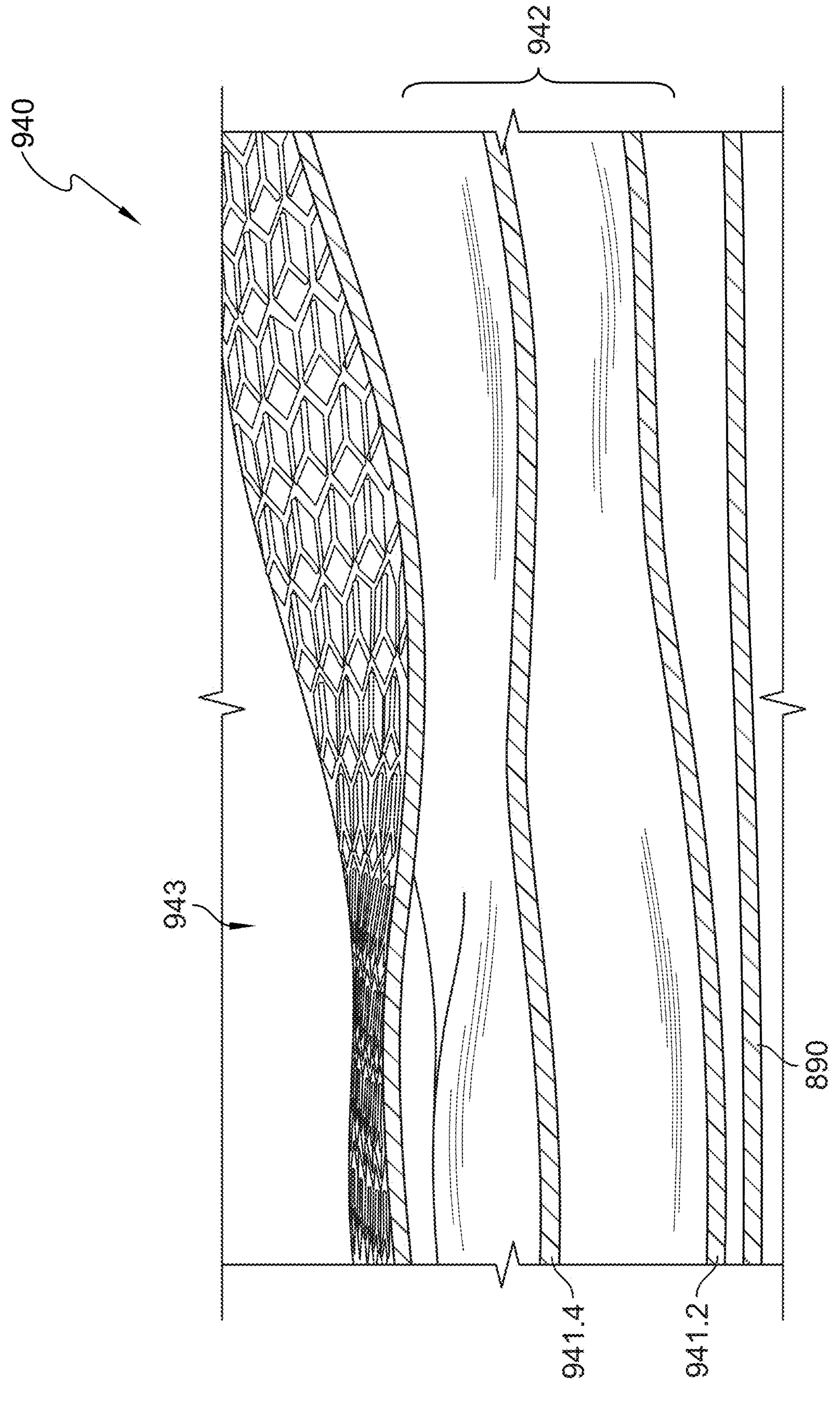
FIG. 6 is an exploded view of the exterior covering system, showing a cover assembly, an energy attenuation assembly, and the housing of the humanoid robot.

In addition to including a plurality of covers within the cover assembly 943, each cover 944.2, 944.4, 944.6, 944.8, 944.10, 945.2, 945.4, 945.6 may include one or more regions (e.g., between 1 and 500). Where a region is defined by more than a minor change to any material, structural, or chemical property of the cover. Primarily, the regions are defined by changes to the texture/pattern, thickness, and/or stiffness of the cover. In particular, certain regions may be disposed over joints, while other regions may not be disposed over a joint. Further, a certain region may be disposed in front of the torso, while a second region may be disposed around the neck. In fact, FIG. 4 shows the use of three different regions that are disposed within the neck, torso, and shoulder, wherein the neck region is the most flexible, then the torso, and finally the shoulder. Other combinations or versions are contemplated by this disclosure.

Further, the configuration of each cover and/or region may be adjusted depending on design requirements. In a first example, the torso cover 944.4 may not extend past or below the pelvis of the robot 1. In a second example, certain components, such as the lower leg cover 945.4, may be subdivided into smaller modular elements to enhance flexibility, facilitate easier maintenance, or provide more precise coverage over complex joint structures. Conversely, multiple components may be merged into a single integrated unit using advanced manufacturing techniques such as multi-material 3D printing, over-molding, knitting, or thermoformed composites. For instance, the upper and lower arm covers, along with the torso cover, may be formed as a single, seamless structure to enhance overall mechanical integrity while minimizing the number of assembly points.

i. Component Covers

While the following disclosure applies to each of these covers 944.2, 944.4, 944.6, 944.8, 944.10, 945.2, 945.4, 945.6, the following disclosure will focus on the neck cover 944.2. In particular, the neck cover 944.2 may be designed to extend from an upper portion of the torso 16 to a lower portion of the head 10 (and specifically over a majority of the head (but not the entire head)). In particular, the neck cover 944.2 is configured to wrap around at least an edge portion of the bottom extent of the head enclosure and at least an edge portion of the gorget interface of the torso 16. In doing so, said neck cover 944.2 obscures the actuators J8.1, J8.2 and other electronics and structures contained therein. Here, unlike some other locations in the robot 1, the neck region lacks an external housing. Thus, the only layer that is protecting and obscuring the neck components is said neck cover 944.2.

The neck cover 944.2 is designed to return to its original state when the head 10 returns to its normal state (e.g., forward-facing). The neck cover 944.2 may be made from a cover material that is deformable and allows the head to twist in both directions and pitch forward and back without bunching or pulling. The deformable material can be the same textile used throughout the cover assembly 943 to provide a uniform exterior appearance.

As shown in FIG. 4, the humanoid robot 1 may include a cover assembly 943 that is comprised of a neck cover 944.2, a torso cover 944.4, and an arm cover 944.6. The neck cover 944.2 is made from a different material and forms a first region with a first pattern, where the torso cover 944.4 is made from a different material and forms a second region with a second pattern. The first region may overlie a joint (e.g., neck actuators), while the second region does not overlie a joint. In this embodiment, the first region may have a first thickness at a location that is less than a second thickness of the second region at a second point. As such, the first region may be more deformable than the second region.

Also shown in FIG. 4, the arm cover 944.6 is made from a different material and forms a first region with a first pattern, where the torso cover 944.4 is made from a different material and forms a second region with a second pattern. The first region may overlie a joint (e.g., J2, shoulder actuator), while the second region does not overlie a joint. In this embodiment, the first region may have a first thickness at a first location that is greater than a second thickness of the second region at a second point. As such, the first region may protect the actuator and deform less than the second region to avoid causing the cover 944.6 to be pinched during movement of the arm. In other embodiments, each or some covers within the cover assembly 943 may be made from a different material or have a different knitting pattern (e.g., rib knit, interlock knit, warp knit tricot, honeycomb knit, jacquard stretch knit, spacer fabric, mesh knit, piqué knit, ottoman knit, chevron weave, herringbone weave).

ii. Cover Materials

The cover assembly 943 can be made from highly durable materials that have high stretch and are resistant to pilling, abrasions, and cuts. Said material may include any known material, including but not limited to cotton, polyester, nylon, linen, wool, rayon, modal, viscose, Tencel, elastane (spandex), acrylic, denim, chambray, poplin, tweed, fleece, velvet, canvas, recycled polyester, microfiber, lycra, gabardine, broadcloth, batiste, chiffon, georgette, tulle, mesh fabric, pique knit, interlock knit, rib knit, seersucker, brocade, herringbone weave, jacquard fabric, polyvinyl chloride (PVC), polyurethane (PU), thermoplastic polyurethane (TPU), ethylene vinyl acetate (EVA), polyethylene (PE), polypropylene (PP), low-density polyethylene (LDPE), elastomers, thermoplastic elastomers (TPE), nylon (polyamide), flexible polycarbonate, plasticized PVC, soft silicone, latex, neoprene, synthetic rubber, soft vinyl, flexible acrylic, bioplastics, polyester blends with thermoplastics, fluoropolymers, plastic foams (memory foam blends), polyethylene terephthalate (PET) sheets, thermoplastic polyurethane (TPU) sheets, polypropylene (PP) sheets, polycarbonate sheets, polyvinyl chloride (PVC) sheets, polymethyl methacrylate (acrylic) sheets, high-density polyethylene (HDPE) sheets, fluoropolymer sheets (e.g., PTFE), flexible vinyl sheets, plasticized film sheets, rubberized polymer sheets, ethylene vinyl acetate (EVA) sheets, thermoformed polymer sheets, heat-sealable polymer sheets, antimicrobial polymer sheets, translucent polyethylene sheets, flexible PVC blends, breathable polymer films, coated polymer fabrics, microporous plastic sheets, stretchable polymer films, polyimide sheets, UV-resistant polymer films, electrically conductive polymer sheets, reinforced polymer films, eco-friendly polymer laminates, elastomeric films, neoprene, softshell fabrics, E-PTFE membranes, rubberized fabrics, mesh polymers, plastic-coated textiles, reflective fabrics, phase change materials (PCMS) for thermal regulation, graphene-infused fabrics, smart fabrics with sensors, hydrophobic nanocoated fabrics, Kevlar® reinforced fabrics, carbon fiber-infused textiles, fire-retardant textiles, shape-memory polymers, UV-blocking fabrics, biodegradable plastics for wearable use, conductive fabrics (for wearable electronics), gel-layered fabrics, insulative aerogels, aluminized fabrics, electrospun nanofibers, polylactic acid (PLA) fabrics, self-healing polymers, flexible optical fabrics, fluorescent/glow-in-the-dark polymers, antistatic polymer blends, and nanoparticle-infused fabrics, transparent polymer films for garments. In other words, the use of the term textile here is not simply limited to woven materials.

The cover assembly 943 can be customized or selected to reduce wrinkling or the appearance of wrinkling and to allow for twisting or movement of the underlying components without restriction or substantial distortion. For example, the cover assembly 943 should allow the upper arm to twist to rotate from about −160 degrees to about 160 degrees. An example of a material that may be used includes a 4-way stretch knit textile with a thickness of between 0.1 mm and 10 mm, and preferably between 1.75 mm and about 2.25 mm, with a stretch between 0% and 100%, and preferably between 25% and 80%.

As shown in the Figures, the cover assembly 943 can include multiple weaves or patterns woven into a custom textile, with or without seams, and adapted to conform with the 3D features of the underlying robot 1. Examples of materials that may be used include repeating patterned elements disposed over a knitted textile or fabric. Said repeating pattern may be located in specific regions (e.g., shoulder, elbow, etc.), while different repeating patterns are used in other locations (e.g., neck, torso, etc.).

Additionally, it should be understood that the cover assembly 943 may include (i) a reduction in the thickness in the cervical-thoracic junction to allow air to flow out from the torso cooling system, (ii) an indicator light 892 positioned below the torso cover 944.4, wherein the light from said indicator light is visible from the exterior of said torso cover 944.4, and (iii) a power button indicator that is coupled to the exterior of the torso cover 944.4 and designed to show humans where the power button for the robot 1 is located, which said button is obscured by the torso covering 944.4. In other words, the materials of the external covering system may be selected to allow for the cooling, viewing of lights, and/or operation of buttons through said external covering. This provides a substantial benefit over conventional system that lack these features.

It should be understood that this Application contemplates using or including materials in the cover assembly 943: (i) that integrate lights 892 from the robot 1 into said external covering, (ii) that may be translucent or temporarily translucent (e.g., time or environment-based), (iii) that can be woven in a manner that allows light to transmit through the textile. Specifically, lights (e.g., fiber optic lighting, led strip lights, led rope lights, micro-led string lights, led neon flex, phosphorescent paint, OLED panels (organic light-emitting diode), laser diode lighting, neon tubing, electroluminescent panels, led edge-lit panels, flexible led sheets, flexible OLED strips, inductive electroluminescent displays, laser fiber cables, quantum dot light-emitting displays, phosphor-coated led strips, laser-activated fluorescent materials, electroluminescent paint, laser-illuminated fiber bunches, phosphor-coated electroluminescent (PCEL) materials, smart RGB led strips, light-up silicone tubing (LED or EL-based), laser wire, or other electroluminescent materials (EL wire, EL tape, EL film, etc.)) may be visible through the textile.

The cover assembly 943 may include textiles that include reflective yarn or night-luminous yarn that changes appearance when light is shining on the surface. For example, the reflective yarn includes reflective material, which can reflect the light back to the original light source and provide a better reflective and warning effect. In various embodiments, a shiny, reflective, iridescent, matte, or textured polyurethane film can be applied to the surface of the textile in certain areas for an additional reflective effect or other purpose (e.g., logo, pattern, labels, etc.).

The cover assembly 943 can also include features to accommodate thermal considerations of the robot 1. In various examples, the cover material can be a custom textile, including various weaves within a textile that allow ventilation and have heat sinks built into said textiles. Additionally and/or alternatively, the cover assembly 943 can include textiles or threads that are heat-sensitive and change color with a change in temperature. For example, a heat-sensitive material can visually indicate that the underlying component is overheated.

In summary, the cover assembly 943 may be made from, include, or specifically omit any one or any combination of the following materials:

- Reflective Textiles: retroreflective fabric, high-visibility (hi-vis) fabric, reflective nylon, microprismatic reflective film, Scotchlite™ reflective fabric, aluminum-coated fabric, reflective polyester, glass bead-coated fabric, reflective PVC, reflective tape integrated textiles.
- Heat-Sensitive Textiles: thermochromic fabrics, phase-change materials (PCMS), color-changing fabrics (thermal reactive), smart fabrics with embedded sensors, thermo-responsive polymer blends, shape memory alloys integrated into fabrics, temperature-regulating fabrics (Outlast®), heat-activated stretch fabrics.
- Durable Textiles: Kevlar®, Dyneema®, Cordura®, ballistic nylon, ripstop nylon, heavyweight denim, waxed canvas, teflon-coated fabrics, ultra-high molecular weight polyethylene (UHMWPE), aramid fiber blends, high-tensile polyester, nylon spandex blends, canvas duck cloth.
- Illuminant Textiles: fiber optic fabric, electroluminescent (EL) fabric, led-embedded fabric, light-emitting fiber threads, glow-in-the-dark fabric, luminous fabric (photoluminescent), luminescent yarn, solar-powered light-emitting textiles, organic led (OLED) integrated textiles, phosphorescent fabric.
- Flame-Resistant Textiles: Nomex®, Carbonx®, Pyrovatex® treated cotton, flame-retardant polyester, modacrylic blends, Indura® cotton, PBI (polybenzimidazole) fabric, Basofil® fabrics, treated wool.
- Waterproof Textiles: Gore-Tex®, neoprene, polyurethane-coated fabric, DWR (durable water repellent) treated fabric, PVC-coated polyester, waterproof softshell fabric, TPU (thermoplastic polyurethane) laminated fabric, waterproof canvas.
- Hazard Textiles: anti-static fabrics, arc-resistant fabrics, chemical splash protection fabrics, cut-resistant fabrics, flame-resistant hi-vis fabrics, biohazard protection fabrics, impact-resistant fabrics, radiation-protective fabrics, multi-hazard resistant workwear fabrics.
- Chemical-Resistant Textiles: Tychem® fabrics, Chemmax® fabrics, polyethylene laminated fabric, butyl-coated fabrics, Viton®-coated fabrics, rubberized protective fabrics, fluoropolymer-coated fabrics.

c. Coupling Means

Shown in FIGS. 9-17, the exterior covering system 940 and/or the cover assembly 943 may be coupled to the robot 1 using any known coupling means 946. The coupling means 946 may be disposed in any location on the robot 1, including the joints formed between the covers. These joints fall within one or more interconnect zones, wherein said zones include: (i) a neck zone 948.2, (ii) an arm zone 948.4, (iii) an elbow zone 948.6, (iv) a waist zone 948.8, (v) a leg zone 948.10, (vi) an ankle zone 948.12, and (vii) a foot zone 948.14. It should be understood that additional zones may be added to allow for additional covers to be utilized. In contrast, few zones may be used to reduce the number of covers. Additionally and/or alternatively, the disclosed zones may be move, altered, shrunk, and/or increased.

The coupling means 946 is primarily comprised of two separate parts, wherein a first part has a male component 946.2 and a second part has a female component 946.4 designed to receive the male component. Typically, the male component 946.2 is attached to the cover assembly 943, while the female component 946.4 is attached to the robot 1, the energy attenuation assembly 942, or a combination thereof. In other embodiments, the male and female components 946.2, 946.4 may be switched, such that the female component 946.4 is attached to the cover assembly 943 and the male component 946.2 is attached to the robot 1, the energy attenuation assembly 942, or a combination thereof.

The coupling means 946 may be manufactured separately from the robot 1 and the energy attenuation assembly 942. After said coupling means 946 is manufactured, an extent of said coupling means 946 may be secured to the robot 1, the energy attenuation assembly 942, or a combination thereof. This securement may be accomplished by attaching an extent of the coupling means 946 to an exterior surface of the housing or exoskeleton 890. In an alternative embodiment, at least one component of the coupling means 946 may be embedded into a channel formed in an extent of the housing or exoskeleton 890. In a further embodiment, instead of integrally forming a separate structure into the housing or exoskeleton 890, said extent of the coupling means 946 may be formed directly as a part of the housing or exoskeleton 890. For example, instead of integrally forming a female component 946.4 that includes a receptacle formed therein into an extent of the housing or exoskeleton 890, said receptacles may be directly formed in the housing or exoskeleton 890.

i. Interlocking Strips

Figure 11:
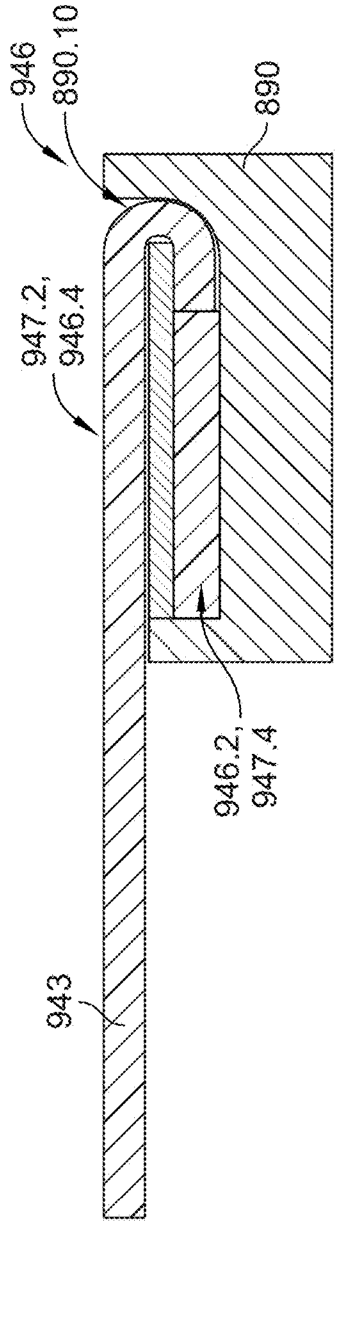
FIG. 11 is a cross-sectional view of a first embodiment of a portion of the connection means of FIG. 9.
Figure 13:
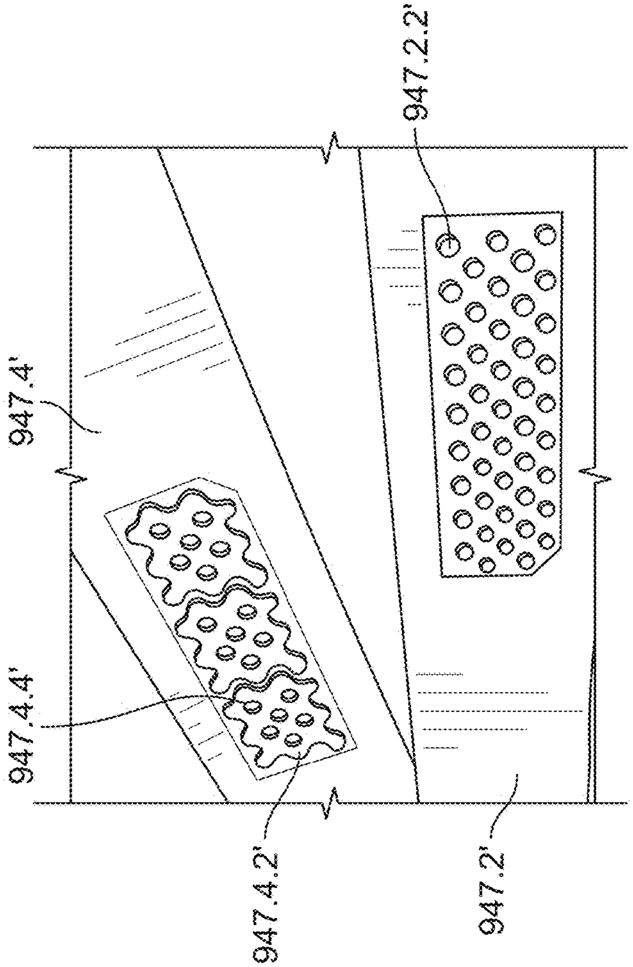
FIG. 13 is a perspective view of a second example of the first embodiment of the portion of the connection means shown in FIG. 11.
Figure 12:
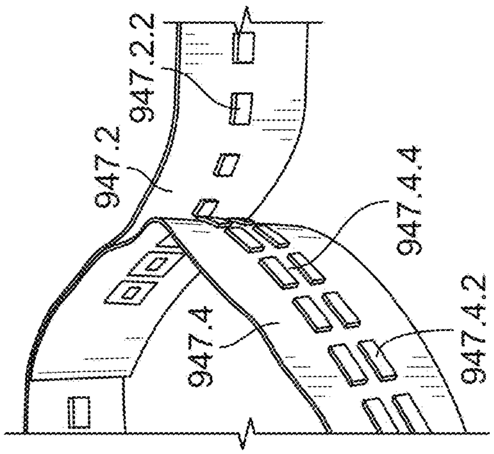
FIG. 12 is a perspective view of a first example of the first embodiment of the portion of the connection means shown in FIG. 11.

A first embodiment of a coupling means 946 is illustrated in FIG. 11. As previously described, the coupling means 946 comprises: (i) a male component 946.2 that is directly affixed to an extent of the cover assembly 943, and (ii) a female component 946.4 that is secured to the housing or exoskeleton 890. This disclosed coupling means 946 may be in the form of flexible interlocking strips 947.2, 947.4, as depicted in FIGS. 12-13. For instance, the flexible interlocking strips may employ a hook-and-loop fastening system (e.g., Velcro) or an alternative advanced fabric fastener mechanism. A first example is shown in FIG. 12 and labeled as 947.2, 947.4, while a second example is shown in FIG. 13 and labeled as 947.2', 947.4'. It should be understood that these are just examples and are not limiting.

The first flexible strip 947.2 is provided with a plurality of male projections 947.2.2, which are specifically designed to engage with and be received by corresponding female receivers 947.2.4 of the second flexible strip 947.4. The male projections 947.2.2 may adopt various geometries, including but not limited to button-like, pill-shaped, hexagonal, triangular, conical, or other known interlocking configurations designed for enhanced load distribution and shear resistance. The female receivers 947.2.4 may be in the form of cuts or slits defined by an array of structural blocks 947.4.2, apertures, perforations, or recesses integrated within the second flexible strip 947.4. The engagement between the male projections 947.2.2 and female receivers 947.2.4 is maintained through mechanical interlocking, friction fit, snap-fit retention, or alternative securement methods, including elastic deformation or magnetic coupling if incorporated.

In this embodiment, the housing or exoskeleton 890 may feature an integrally formed groove or recess 890.10, which serves as a shallow channel to house the second flexible strip 947.4. The inclusion of this recess 890.10 facilitates a seamless transition between the interconnect zone and the adjacent cover assembly 943, thereby reducing surface irregularities and minimizing potential snagging points. It should be noted that in alternative configurations, the recess 890.10 may be omitted, expanded, or modified to accommodate different integration methodologies. The second flexible strip 947.4 may be affixed within the recess 890.10 through various attachment techniques, including but not limited to mechanical fastening (e.g., screws, rivets, or clips), adhesive bonding (e.g., pressure-sensitive adhesives, epoxies, or contact cements), solvent welding, ultrasonic welding, thermal fusion, overmolding, or a hybrid approach incorporating multiple techniques to enhance durability and performance. In some embodiments, the blocks 947.4.2 of the female component may be integrally molded, cast, or otherwise fabricated as a monolithic structure with the housing or exoskeleton 890, further enhancing robustness and structural integrity.

Similarly, the first flexible strip 947.2 may be securely affixed to a substrate portion of the cover assembly 943. To reinforce this attachment, an extent of the cover assembly 943 may be folded over a section of the first flexible strip 947.2, encapsulating and securing the interlocking components in place. The fixation of the first flexible strip 947.2 may be achieved using a wide range of methodologies, including adhesive lamination, thermal bonding, ultrasonic sealing, stitching, mechanical fasteners, pressure-sensitive tapes, overmolding, or other conventional and advanced attachment means. Additionally, in some embodiments, the first flexible strip 947.2 may be directly co-molded or extruded with the cover assembly 943 as an integrated component, eliminating the need for secondary attachment operations and further enhancing system reliability.

ii. Snap-Fit Closure

Figure 14:
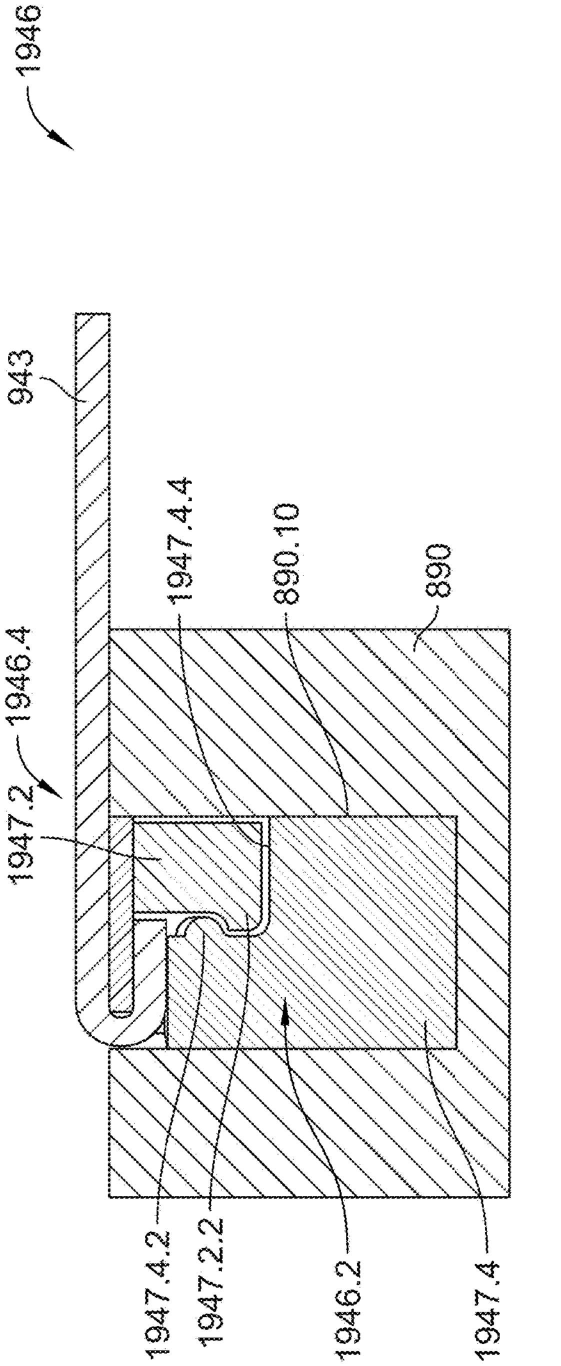
FIG. 14 is a cross-sectional view of a first example of a second embodiment of a portion of the connection means.
Figure 15:
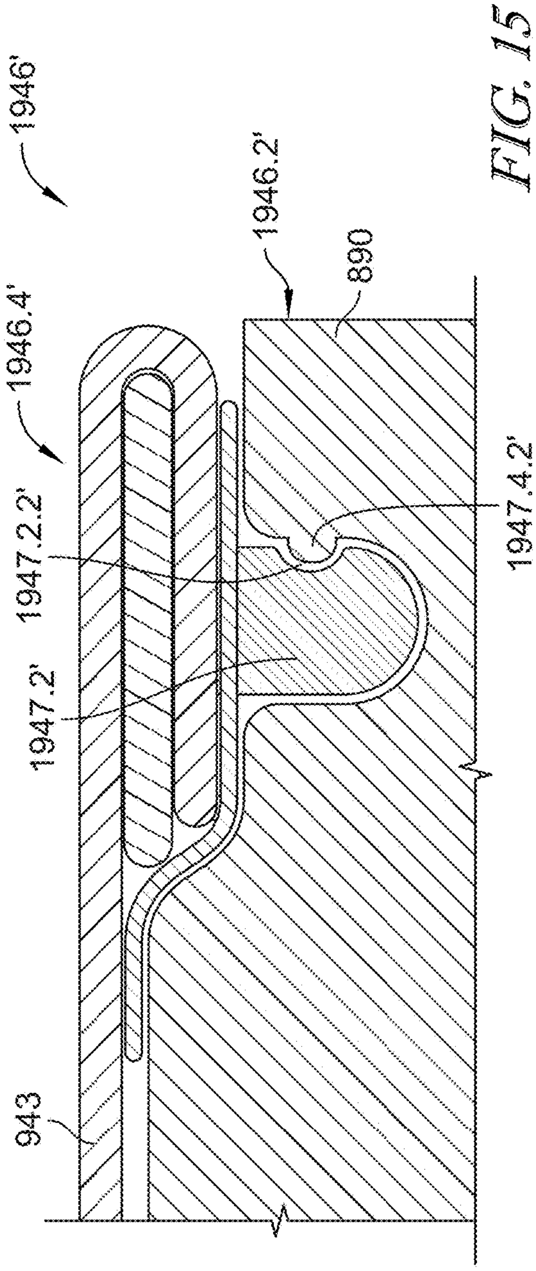
FIG. 15 is a cross-sectional view of a second example of the second embodiment of a portion of the connection means.

FIGS. 14-15 show a second embodiment of a coupling means 1946, 1946'. This coupling means 1946 a female coupling member 1946.2 includes a frame 1947.4 that is received within a channel 890.10 formed in the housing 890. The frame 1947.4 functions as a structural support for the coupling interface and is designed to ensure proper alignment and mechanical engagement of the snap-fit closure. The frame 1947.4 further includes a recess 1947.4.4 that serves as a receiving cavity for the engagement mechanism, and a projection 1947.4.2 positioned within the recess 1947.4.4. The projection 1947.4.2 acts as a retention feature, facilitating mechanical interlock with the male coupling member 1946.4.

The male coupling member 1946.4 comprises a main body 1947.2 that serves as the primary load-bearing structure and a locking member 1947.2.2 that extends outward from the main body 1947.2. The locking member 1947.2.2 is configured to engage with the projection 1947.4.2 through a snap-fit mechanism, which relies on controlled deformation and elastic recovery of at least one component. This engagement is achieved when the male coupling member 1946.4 is inserted into the female coupling member 1946.4 along a designated axis, allowing the locking member 1947.2.2 to deflect temporarily before seating securely beneath the projection 1947.4.2.

In operation, as the male coupling member 1946.4 is pressed into position, the inherent elasticity of the materials used for either the locking member 1947.2.2, the projection 1947.4.2, or both, permits momentary flexion. Once fully engaged, the structural recovery of these elements results in a positive retention force that prevents unintentional disengagement while allowing for efficient disassembly when necessary. The relative positioning of the locking member 1947.2.2 and the projection 1947.4.2 ensures that, upon insertion, the locking member 1947.2.2 is located below or towards the center of the robot 1 in comparison to the projection 1947.4.2. This configuration enhances mechanical stability and mitigates the risk of accidental decoupling due to vibrational or impact forces.

The primary distinction between the two embodiments, 1946 and 1946', lies in the structural integration of the coupling components. In embodiment 1946, the frame 1947.4 is a separate insert that is secured within the housing 890 via fasteners, adhesive bonding, or an interference fit, offering modularity and ease of replacement. Conversely, in embodiment 1946', the coupling elements are directly integrated into the housing 890, eliminating the need for a distinct frame and reducing overall part count. Additionally, embodiment 1946' features rounded geometries in the coupling elements that is designed to receive projection 1947.4.2', optimizing stress distribution during insertion and removal while enhancing durability by reducing stress concentrations.

iii. Magnetic Closure

Figure 16:
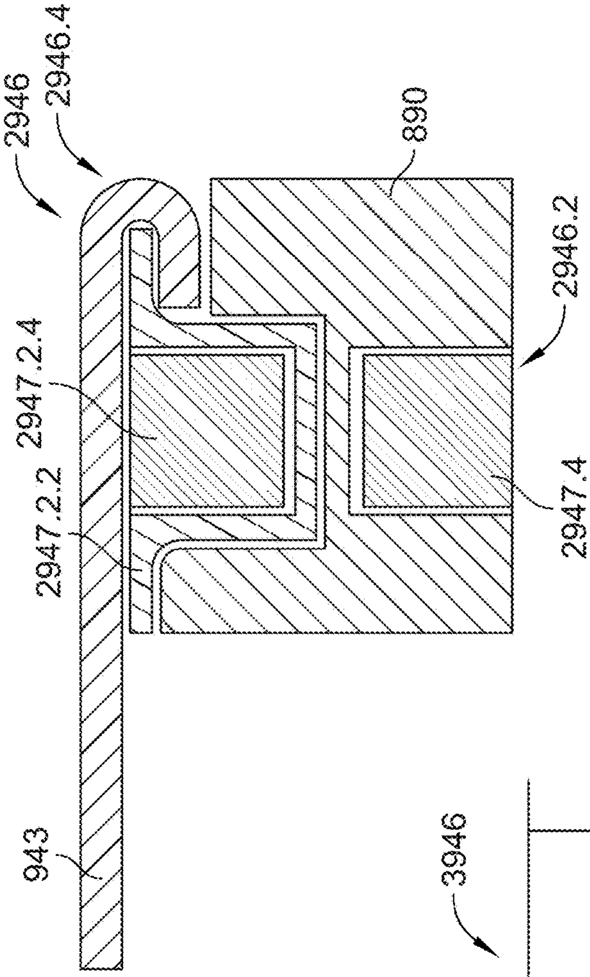
FIG. 16 is a cross-sectional view of a third embodiment of a portion of the connection means.

Shown in FIG. 16 is a third embodiment of a coupling means 2946 for the cover assembly 943. In this embodiment, a male coupling member 2946.4 includes a plurality of magnets 2947.2.4 may be coupled to the cover assembly 943 using a securement frame 2947.2.2. The securement frame 2947.2.2 may be constructed from a non-magnetic, high-strength material such as stainless steel, aluminum, or a fiber-reinforced polymer to ensure structural integrity while minimizing interference with the magnetic field. The magnets 2947.2.4 of the cover assembly 943 are arranged in an alternating polarity pattern with the magnets 2947.4 of the female coupling member 2946.2 that are secured in an extent of the housing 890. This alternating polarity arrangement enhances the magnetic flux linkage, thereby increasing the coupling strength while ensuring self-alignment during attachment.

In other embodiments, the coupling means 2946 may include integrating soft magnetic materials or flexible composite magnets within a compliant matrix to accommodate slight misalignments. Soft magnetic materials, such as high-permeability ferrite or amorphous metal alloys, can be embedded within an elastomeric substrate to enable adaptive positioning under variable mechanical loads. The flexible composite magnets may consist of bonded ferrite or neodymium particles within a polymeric binder, allowing the magnetic coupling to conform to irregular surfaces while maintaining a robust attachment. Further variations might utilize electromagnets that can be electronically activated or deactivated, thereby offering tunable connection strength. These electromagnets could be constructed using high-efficiency coil windings around soft iron cores, with control circuitry that adjusts the magnetic field intensity in response to environmental conditions or operational requirements. For example, embedded Hall-effect sensors or strain gauges could provide real-time feedback on the coupling status, enabling dynamic modulation of the electromagnetic force to optimize retention while minimizing power consumption.

Additional mechanical features, such as interlocking notches or textured surfaces, may be combined with the magnetic elements to enhance engagement under dynamic loads. Interlocking notches may be designed with precision-machined tolerances to provide supplementary mechanical resistance against lateral shear forces, while micro-textured surfaces could increase frictional grip, thereby reducing the risk of unintended detachment. Fabrication methods for these enhancements may include stamping, molding, or precision machining, depending on the required material properties and dimensional accuracy. Advanced surface treatments, such as plasma etching or laser texturing, may also be employed to optimize adhesion characteristics between mating components.

iv. Keyhole Closure

Figure 17:
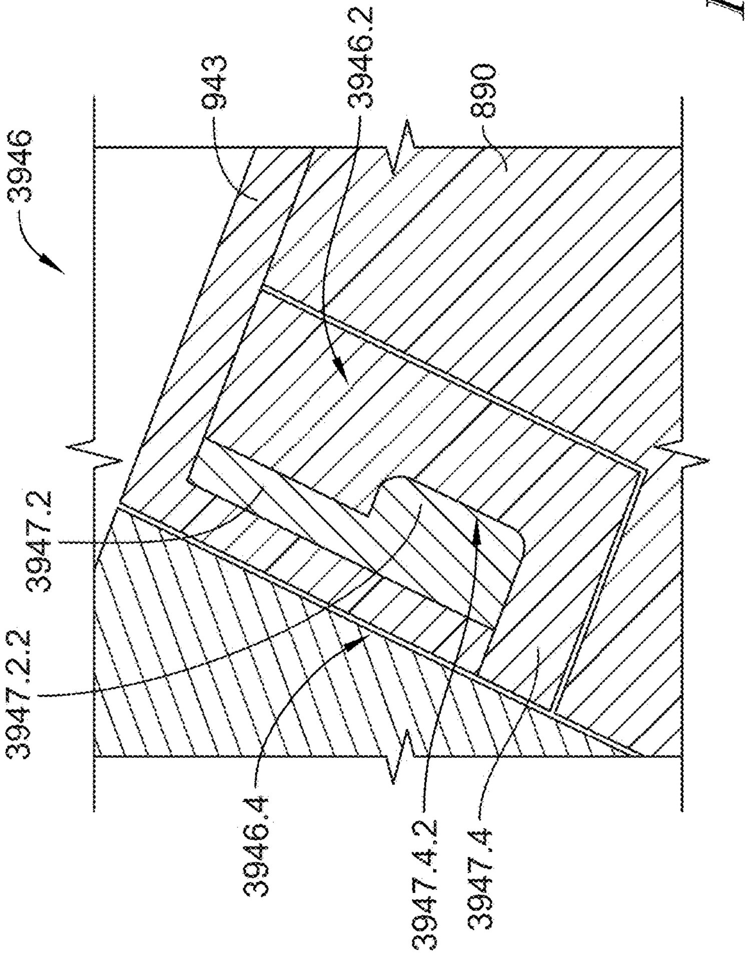
FIG. 17 is a cross-sectional view of a fourth embodiment of a portion of the connection means.

FIG. 17 shows a fourth embodiment of a coupling means 3946 for the cover assembly 943. In this embodiment, a female coupling member 3946.2 includes a frame 3947.4 may be positioned in a channel or groove formed in the housing 890. Said frame 3947.4 may be modified to include a plurality of keyhole apertures 3947.4.2 configured to receive projections 3947.2.2 from a trim 3947.2 of the male coupling member 3946.4 to couple the cover 943 to the robot 1. Alternatively, the frame 3947.4 can be omitted, and the plurality of keyhole apertures 3947.4.2 can be formed directly in the housing 890 in an interconnect zone.

v. Alternative Embodiments

In an alternative embodiment, the textile cover assembly 943 includes a left portion and a right portion, and the coupling means 946 is a zipper that couples said left portion of the textile cover to the right portion of the textile cover. In another alternative embodiment, the coupling means 946 may include: (i) a receiving frame coupled to the robot housing 890 and having a plurality of openings, and (ii) a locking trim coupled to the cover 943 and having a plurality of projections. The openings in the receiving frame are designed to receive the projections of the locking trim, thereby facilitating a secure mechanical engagement. The receiving frame is positioned within a channel formed in the robot housing 890 and secured therein via fasteners, adhesives, or an interference fit, ensuring a robust attachment while allowing for manufacturability and modular assembly.

The locking trim is substantially rigid and is coupled to the cover 943 by wrapping said cover around the trim. The projections on the locking trim are designed to temporarily deform upon insertion into the corresponding openings of the receiving frame, allowing them to snap into place. These projections are preferably fabricated from a resilient polymer or a spring-loaded metallic material that ensures structural integrity and maintains secure engagement after repeated attachment cycles. The projections may take various forms, including but not limited to mushroom pins, clips, dovetail latches, or barbed hooks, each optimized for different mechanical retention forces and environmental conditions. Once engaged, the locking trim and receiving frame create a tamper-resistant joint, ensuring that the cover 943 remains secured to the robot housing 890 during operational stresses such as vibrations, impacts, and thermal expansion. In one implementation, once secured, the locking trim can only be destructively decoupled from the receiving frame, providing an added security feature that prevents unintended disassembly.

In alternative embodiments, the receiving frame may be integrally formed with the robot housing 890 using injection molding, die casting, or additive manufacturing techniques to reduce assembly complexity. Additionally, the openings may be formed directly into the robot housing 890, eliminating the need for a separate receiving frame. In another variation, the locking trim can be designed to disengage from the receiving frame without damage, allowing for non-destructive maintenance or component replacement. This may be achieved through the use of flexible materials, live hinges, or secondary release mechanisms such as spring-loaded buttons or sliding locks. Furthermore, the locking trim may be constructed from a flexible elastomeric or composite material to accommodate manufacturing tolerances and ensure a tight seal when the cover 943 is attached. In some embodiments, the locking trim may be integrally formed with the cover 943, simplifying the assembly process while maintaining structural performance. This integral design may be achieved using co-molding techniques or multi-material fabrication processes, enabling the seamless integration of flexible and rigid components within a single structure.

In another alternative embodiment, a bayonet-style coupling means 946 is implemented wherein the locking trim comprises circumferential projections that mate with corresponding L-shaped slots in the receiving frame. In operation, the user aligns the projections with the open end of each L-shaped slot and then rotates the trim so that the projections slide along the longer leg until they seat securely in the shorter locking leg. Redundant micro-adjustable locking detents or adjustment screws may be incorporated to fine-tune the holding force. The components can be fabricated via injection molding of high-strength polymers or precision machining of metal alloys, with additional surface coatings applied to reduce wear or enhance corrosion resistance. Variations include integrating spring-biased elements to assist with engagement or disengagement and adapting the slot geometry to accommodate different load requirements in a humanoid robot 1.

In another alternative embodiment, a ratchet-style coupling means 946 is provided by a toothed strip on the collar locking trim that engages with a pawl on the collar receiving frame. This design enables successive incremental tightening, and an integrated release lever or button permits quick disengagement. Advanced embodiments may incorporate a multi-stage ratchet system, wherein an initial low-friction engagement is followed by a secondary stage with higher resistance to motion, ensuring secure locking under variable loads. Design modifications could include a variable geometry pawl that adjusts based on rotational speed or applied load, as well as wear-resistant coatings on the toothed surfaces. Fabrication techniques may involve high-precision machining and injection molding of advanced thermoplastics, with optional sensor integration to confirm proper seating.

In another alternative embodiment, interlocking puzzle-piece shaped projections and recesses are employed along the mating surfaces of the collar receiving frame and the collar locking trim. This configuration ensures that proper alignment results in a secure mechanical interlock, and the pattern itself can be modular or reconfigurable to meet different load requirements or aesthetic preferences. Enhancements may include embedding RFID tags or visual indicators within the interlocking surfaces to digitally verify engagement. Components can be produced using high-precision CNC machining or additive manufacturing, with design considerations focused on optimizing load distribution, minimizing assembly errors, and ensuring repeatable performance over multiple engagement cycles.

In another alternative embodiment, a vacuum-based coupling means 946 is utilized wherein discrete suction cups integrated into the collar locking trim create a vacuum seal when pressed against a smooth surface on the collar receiving frame. This configuration can be modified to include a continuous suction channel that ensures an even distribution of vacuum force across the interface, and hybrid systems may combine the initial vacuum adhesion with a subsequent mechanical latching mechanism for added security. The suction elements are typically fabricated from highly resilient elastomeric materials, and the mating surfaces may be treated or coated to ensure maximum smoothness and compatibility. Integrated sensors can further monitor the integrity of the vacuum seal during operation.

In another alternative embodiment, a hybrid coupling means 946 that combines miniature electromagnets and spring-loaded mechanical components is implemented. One variation embeds miniature electromagnets in both the collar receiving frame and collar locking trim to enable electronic activation or deactivation, while another variation utilizes spring-loaded ball bearings that snap into corresponding recesses, providing both tactile and audible confirmation of engagement. Sequential activation logic can be employed so that initial magnetic attraction facilitates alignment, followed by mechanical locking for added security. Fabrication may involve a combination of injection molding, micro-machining, and printed circuit board integration, with design considerations emphasizing durability, ease of maintenance, and low power consumption.

In another alternative embodiment, interlocking dovetail joints are used whereby dovetail features on the collar locking trim slide horizontally into complementary grooves on the collar receiving frame before locking vertically. Enhancements may include applying friction-lock coatings or designing variable cross-sectional profiles to enhance self-alignment during engagement. A related variant employs miniature pneumatic or hydraulic pistons that extend from the collar receiving frame to grip the collar locking trim when pressurized, providing active control over the locking process. These components can be fabricated via precision machining of metals or high-performance polymers, with micro-machining used for the piston components and design parameters optimized for rapid response, sealing integrity, and fail-safe release.

In another alternative embodiment, advanced smart materials are employed to achieve dynamic coupling. For example, shape memory polymers (SMPs) can be designed to alter their configuration upon reaching a transition temperature, thereby gripping or releasing the collar locking trim. Variations of this approach may incorporate electrorheological fluids whose viscosity changes with an electric field to create adaptable locking surfaces, or micro-structured adhesive patches inspired by gecko feet to provide strong yet reversible adhesion. Integrated micro-lubrication systems may be used to reduce wear, with fabrication methods including MEMS processes and high-resolution 3D printing, and design considerations focusing on actuation speed, power efficiency, and integration with the robot's control systems.

In another alternative embodiment, micro-structured surfaces inspired by remora fish are utilized on the mating interfaces of the collar receiving frame and collar locking trim. This design employs arrays of finely textured micro-channels and suction-cup-like features that, when pressed together, generate a strong grip through a combination of localized suction and friction. The mating surfaces can be fabricated from compliant polymers such as silicone or thermoplastic elastomers using micro-molding or laser ablation techniques. Variations may include the integration of micro-valves or pressure-sensitive coatings to adjust adhesion based on load conditions, along with embedded sensors to monitor engagement status and wear over repeated cycles.

In another alternative embodiment, interlocking carbon nanotube forests are utilized to achieve coupling. In this configuration, both the collar receiving frame and collar locking trim are equipped with vertically aligned carbon nanotube arrays that intermesh upon contact, distributing loads uniformly while forming a robust yet reversible bond. The nanotube arrays may be grown via chemical vapor deposition on prepared substrates, with process parameters such as density, length, and orientation finely tuned to balance adhesion strength and ease of release. Alternative embodiments may incorporate a polymer binder or nano-patterned layers to further customize the adhesion profile to suit various operational requirements.

In another alternative embodiment, coupling is achieved through micro-structured surfaces engineered to exhibit anisotropic friction properties. The mating surfaces are patterned with directional micro-grooves or asymmetrical protrusions that facilitate smooth sliding during assembly while providing high resistance to forces in the opposite direction to prevent accidental detachment. Fabrication may employ photolithography or nanoimprint lithography on elastomeric or composite materials, and additional modifications may include integrating shape memory polymer components that dynamically alter friction in response to external stimuli or specific vibrational frequencies to enable controlled disengagement.

In another alternative embodiment, miniature shape-shifting mechanisms inspired by origami principles are incorporated into the coupling system. These mechanisms consist of thin, flexible elements with pre-engineered crease lines that fold and unfold predictably when a small rotational or linear input is applied, creating interlocking structures that secure the connection between the collar receiving frame and collar locking trim. Fabrication techniques such as high-resolution 3D printing, laser cutting of flexible polymer sheets, or micro-machining of thin metal foils may be employed, with additional modifications like embedded magnets or micro-springs assisting the folding process. Sensors may also be integrated to provide feedback on the engagement state.

In another alternative embodiment, thermochromic indicators are integrated along the mating surfaces of the collar coupling means 946. Thermochromic materials that change color in response to temperature variations generated during mechanical engagement provide immediate visual confirmation of a secure attachment. These indicators may be applied as thin coatings or embedded as microcapsules within the structural material using techniques such as spray coating, screen printing, or integration during injection molding. Modified embodiments could allow for multi-stage color changes to indicate different levels of engagement or tension, offering valuable diagnostic feedback to operators or remote monitoring systems.

In another alternative embodiment, electroadhesive coupling is achieved by equipping the collar receiving frame with an array of electrodes that, when activated, generate an electrostatic field to attract the collar locking trim. The trim may incorporate complementary conductive or dielectric layers to enhance the attractive force, and the electrode configuration can be optimized through simulation to ensure uniform field distribution. Fabrication methods such as printed circuit board techniques or thin-film deposition on flexible substrates are employed, and additional embodiments may integrate sensor feedback to continuously monitor adhesion strength or combine the electroadhesive effect with secondary mechanical latches for enhanced security.

In another alternative embodiment, a ferrofluid-based coupling means 946 is implemented. Microfluidic channels integrated into the collar receiving frame are filled with a ferrofluid that responds to an externally applied magnetic field by increasing its viscosity or solidifying, thereby conforming to and gripping the mating surface of the collar locking trim. The channel geometry is optimized to maximize contact area and ensure robust locking, with fabrication achieved using soft lithography or precision molding techniques. Alternative configurations might include multiple channels with staggered activation or the integration of sensors to monitor the ferrofluid's state and provide real-time feedback on connection integrity.

In another alternative embodiment, electroactive polymer actuators are used to achieve the collar coupling. In this configuration, the collar receiving frame incorporates electroactive polymer elements—such as dielectric elastomers or ionic polymer-metal composites—that change shape when a voltage is applied, thereby gripping the collar locking trim. These polymers are selected based on their actuation response, durability, and strain characteristics, and fabrication methods such as screen printing, roll-to-roll processing, or laser patterning can be used to deposit thin films onto flexible substrates. Design considerations include optimizing actuator geometry for energy efficiency, ensuring precise voltage regulation through integrated control circuitry, and potentially using arrays of actuators in concert for a uniform grip with closed-loop sensor feedback to adapt to varying load conditions.

D. Industrial Application

It should be apparent to those skilled in the art that the present teachings may be practiced without requiring every detail disclosed herein. For example, alternative embodiments that provide the robot with the same or similar disclosed mechanical, electrical, learning capabilities, and/or kinematic capabilities are contemplated by this disclosure. These alternative embodiments may alter the robot's assemblies, the positional relationships of said assemblies, the size of one or more or the assemblies, the number of assemblies, sensors included or excluded from the robot, mechanical properties or configurations, electrical properties or configurations, and/or software-based systems (e.g., code, neural nets, machine learning) without departing from the scope of this disclosure. In other instances, well-known methods, procedures, components, learning methods (e.g., imitation learning or teleoperation, supervised learning, unsupervised learning, reinforcement learning, inverse reinforcement learning, regression techniques, or other established methodologies), sensors, kinematic arrangements of assemblies, and/or circuitry can be used in connection with or instead of the disclosed methods, procedures, components, learning methods, sensors, kinematic arrangements, and/or circuitry.

In addition, the disclosed technology can also provide one or more of the following advantages. For example, the disclosed technology allows for a bipedal humanoid robot to be commanded in natural language to generalize to new high-rate and continuous actions of bimanual behaviors via language prompting without requiring conventional computer coding or scripting. This overcomes a significant limitation of conventional robots because said conventional robots were unable to generalize their previous data sets to perform tasks in unseen environments, regarding unseen objects, or unseen backgrounds. As such, the disclosed technology provides technical solutions to such technical problems.

For example, the disclosed technology provides real-time analysis and processing of data from many sources using comprehensive, trained BAMs that are deployed on the edge (e.g., at the humanoid). These complex and uniquely trained BAMs or other similar models: (i) reduce processing time, (ii) improve consumption of available resources, (iii) enable the BAMs to perform respective tasks more effectively and more efficiently than the conventional systems for controlling the humanoid. This downstream use of the BAMs advantageously reflects a solution to technical issues related to conventional systems and thus can improve existing technology for controlling humanoids and other types of robots. In other words, conventional systems may not accurately determine the next actions to be performed by the humanoid in real-time as the humanoid is performing actions in order to cause the humanoid to seamlessly perform a set of actions to accomplish the human-desired task. This edge processing therefore provides lightweight and fast results with the available compute resources, allowing for accurate and seamless movement of the humanoid to perform the human-desired task in real-time.

Moreover, deploying trained BAMs at the edge allows for humanoid controls to be determined, executed, and adapted in real-time and on the fly, even when network communications are weak or nonexistent. This technical solution allows for the controls to be determined, executed, and adapted regardless of any networking interruptions, which is not realized by the conventional systems that lack lightweight and dynamic deployment of BAMs on the edge to control humanoids. Additionally, the disclosed technology may not be reasonably performed in the human mind, as the human mind is incapable of continuously receiving and processing hundreds to thousands of disparate data points from different sources (e.g., human speech, cameras, motion sensors, torque sensors, inertial sensors, sound sensors, touch sensors, proximity sensors, and/or environmental sensors), analyzing and tokenizing those data points in real-time using trained BAMs on the edge, and then generating relevant output such as controls for causing the humanoid to seamlessly perform actions to complete a human-desired task in real-time. The human mind is also incapable of iterative processing the disparate data points from the different sources as the humanoid performs actions to determine the next humanoid movements. Additionally, the human mind is incapable of iteratively processing the disparate data points from different sources to train and improve the BAMs that are deployed on the edge. Sometimes, the BAMs can be locally trained and improved on the edge, at the humanoid, thereby allowing for fast, efficient, and lightweight deployment of the improved BAMs at the humanoid.

While the disclosure shows illustrative embodiments of a robot (in particular, a humanoid robot), it should be understood that embodiments are designed to be examples of the principles of the disclosed assemblies, methods and systems, and are not intended to limit the broad aspects of the disclosed concepts to the embodiments illustrated. As will be realized, the disclosed robot, and its functionality and methods of operation, are capable of other and different configurations and several details are capable of being modified all without departing from the scope of the disclosed methods and systems. For example, one or more of the disclosed embodiments, in part or whole, may be combined with a disclosed assembly, method and system. As such, one or more steps from the diagrams or components in the Figures may be selectively omitted and/or combined consistent with the disclosed assemblies, methods and systems. Additionally, one or more steps from the arrangement of components may be omitted or performed in a different order. Accordingly, the drawings, diagrams, and detailed description are to be regarded as illustrative in nature, not restrictive or limiting, of the said humanoid robot.

While the above-described robot is designed as a head for use with a general-purpose humanoid robot, it should be understood that its assemblies, components, learning capabilities, and/or kinematic capabilities may be used with other robots. Examples of other robots include: articulated robot (e.g., an arm having two, six, or ten degrees of freedom, etc.), a cartesian robot (e.g., rectilinear or gantry robots, robots having three prismatic joints, etc.), Selective Compliance Assembly Robot Arm (SCARA) robots (e.g., with a donut shaped work envelope, with two parallel joints that provide compliance in one selected plane, with rotary shafts positioned vertically, with an end effector attached to an arm, etc.), delta robots (e.g., parallel link robots with parallel joint linkages connected with a common base, having direct control of each joint over the end effector, which may be used for pick-and-place or product transfer applications, etc.), polar robots (e.g., with a twisting joint connecting the arm with the base and a combination of two rotary joints and one linear joint connecting the links, having a centrally pivoting shaft and an extendable rotating arm, spherical robots, etc.), cylindrical robots (e.g., with at least one rotary joint at the base and at least one prismatic joint connecting the links, with a pivoting shaft and extendable arm that moves vertically and by sliding, with a cylindrical configuration that offers vertical and horizontal linear movement along with rotary movement about the vertical axis, etc.), self-driving car, a kitchen appliance, construction equipment, or a variety of other types of robot systems. The robot system may include one or more sensors (e.g., cameras, temperature, pressure, force, inductive or capacitive touch), motors (e.g., servo motors and stepper motors), actuators, biasing members, encoders, housing, or any other component known in the art that is used in connection with robot systems. Likewise, the robot system may omit one or more sensors (e.g., cameras, temperature, pressure, force, inductive or capacitive touch), motors (e.g., servo motors and stepper motors), actuators, biasing members, encoders, housing, or any other component known in the art that is used in connection with robot systems.

In other embodiments, other configurations and/or components may be utilized. As is known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer. In operation, the code is stored within the general-purpose computer platform. At other times, however, the software may be stored at other locations and/or transported for loading into the appropriate general-purpose computer system.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. The server functions may be implemented in a distributed fashion on a number of similar platforms, to distribute the processing load.

Hence, aspects of the disclosed methods and systems outlined above may be embodied in programming. Program aspects of the technology may be thought of as "products" or "articles of manufacture" typically in the form of executable code and/or associated data that is carried on or embodied in a type of machine-readable medium. "Storage" type media includes any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the disclosed methods and systems. Volatile storage media include dynamic memory, such as the main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

It is to be understood that the invention is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the invention, and the scope of protection is only limited by the scope of the accompanying Claims. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Reference is hereby made to: (i) U.S. patents application Ser. Nos. 18/919,263, 18/919,274, 19/006,191, 19/000,626, 19/038,657, 19/064,596, and 19/066,122 (ii) U.S. Provisional Patent Application Nos. 63/561,318, 63/556,102, 63/557,874, 63/626,039, 63/626,040, 63/696,533, 63/696,507, 63/706,768, 63/614,499, 63/617,762, 63/561,315, 63/573,226, 63/615,766, 63/620,633, 63/626,030, 63/626,034, 63/626,035, 63/626,037, 63/564,741, 63/707,547, 63/708,003, 63/626,105, 63/625,362, 63/625,370, 63/625,381, 63/625,384, 63/625,389, 63/625,405, 63/625,423, 63/625,431, 63/685,856, 63/626,028, 63/700,749, 63/722,057, 63/635,152, 63/561,317, 63/573,543, 63/633,931, 63/634,697, 63/632,630, 63/632,683, 63/633,941, (iii) U.S. Design patent application Ser. No. 29/889,764, and (iv) PCT Patent Application Nos. PCT/US25/12544, PCT/US25/11450, PCT/US25/10425, PCT/US25/16930, the disclosures of each of which is expressly incorporated by reference herein in its entirety.

It should also be understood that substantially utilized herein means a deviation of less than 15% and preferably less than 5%. It should also be understood that other configuration or arrangements of the above-described components is contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

In this Application, to the extent any U.S. patents, U.S. patent applications, or other materials (e.g., articles) have been incorporated by reference, the text of such materials is only incorporated by reference to the extent that they do not conflict with materials, statements and drawings set forth herein. In the event of such conflict, the text of the present document controls, and terms in this document should not be given a narrower reading in virtue of the way in which those terms are used in other materials incorporated by reference. It should also be understood that structures and/or features not directly associated with a robot cannot be adopted or implemented into the disclosed humanoid robot without careful analysis and verification of the complex realities of designing, testing, manufacturing, and certifying a robot for completion of usable work nearby and/or around humans. Theoretical designs that attempt to implement such modifications from non-robotic structures and/or features are insufficient (and in some instances, woefully insufficient) because they amount to mere design exercises that are not tethered to the complex realities of successfully designing, manufacturing and testing a robot.

The invention claimed is:

1. A humanoid robot comprising:

an AI model;

a torso including a rigid torso housing;

at least one limb operably coupled to the torso, and wherein said AI model is configured to generate an action for controlling an extent of the at least one limb;

a cover assembly that includes a torso cover; and an energy attenuation assembly comprising a torso energy attenuation member, wherein the torso energy attenuation member:

(i) is disposed about at least a portion of the torso, (ii) is positioned between the rigid torso housing and the torso cover, and (ii) includes a plurality of lattice cells formed from a polymeric material.

2. The humanoid robot of claim 1, wherein the plurality of lattice cells includes at least one strut-based lattice cell.

3. The humanoid robot of claim 1, wherein the torso cover is configured to one or more of: stretch, deform, or articulate with movement of the humanoid robot.

4. The humanoid robot of claim 1, wherein the cover assembly includes a textile material designed to provide the humanoid robot with an approachable appearance.

5. The humanoid robot of claim 1, further comprising a joint, and wherein the torso cover includes:

(i) a first region that overlies at least a portion of the joint, wherein the first region has a first pattern, and (ii) a second region that does not overlie said portion of the joint, wherein the second region has a second pattern that is different from the first pattern.

6. The humanoid robot of claim 1, further comprising a plurality of actuators providing a number of degrees of freedom greater than 30, and wherein a majority of the plurality of actuators are coupled to tendons.

7. The humanoid robot of claim 1, further comprising a head that is coupled to a neck, and wherein said head includes: (i) a semi-transparent frontal shell with a rear edge, and (ii) a non-transparent rear shell with a frontal edge, and wherein a portion of the frontal edge is configured to abut a portion of the rear edge in an assembled position of the head.

8. The humanoid robot of claim 7, further comprising a display positioned within the head and visible through the semi-transparent frontal shell.

9. The humanoid robot of claim 1, wherein the humanoid robot includes a coronal plane and a head coupled to a neck, and wherein the head comprises:

(i) a frontal shell with a rear edge, (ii) a rear shell with a frontal edge, and (iii) wherein a seam formed between a portion of the frontal edge and a portion of the rear edge is positioned at a non-zero angle relative to the coronal plane.

10. The humanoid robot of claim 1, wherein at least a portion of the cover assembly is maintained under tension.

11. A humanoid robot comprising:

an electric actuator;

a joint comprised of a first member operably coupled to the electric actuator, and a second member operably coupled to the electric actuator;

a processing unit configured to execute an AI model, wherein said AI model is configured to generate a action a command for actuating the joint;

an energy attenuation member including a polymeric material, wherein the energy attenuation member is positioned within a space of the joint such that the energy attenuation member is compressed between the first member and the second member at a rotational limit of the joint; and a cover disposed over at least a portion of the energy attenuation member.

12. The humanoid robot of claim 11, wherein the electric actuator includes a strain wave gearbox coupled to a pancake-style brushless DC motor.

13. The humanoid robot of claim 11, wherein the electric actuator includes an inductive encoder and is configured to generate a momentary peak torque greater than 365 Nm.

14. The humanoid robot of claim 11, wherein the energy attenuation member includes a honeycomb lattice structure.

15. The humanoid robot of claim 11, wherein the energy attenuation member is additively manufactured and includes strut-based lattice cells.

16. The humanoid robot of claim 11, wherein the energy attenuation member includes a first region with a first hardness and a second region with a second hardness that is greater than the first hardness.

17. The humanoid robot of claim 11, wherein the cover and the energy attenuation member are cooperatively shaped to mimic a human anatomical feature.

18. The humanoid robot of claim 11, wherein the humanoid robot comprises a plurality of joints defining a total number of degrees of freedom greater than 30, and wherein a majority of the plurality of joints are actuated by tendon-based mechanisms.

19. The humanoid robot of claim 1, further comprising an electric actuator with a strain wave gearbox coupled to a pancake-style brushless DC motor.

20. The humanoid robot of claim 1, wherein the torso energy attenuation member includes a honeycomb lattice structure.

21. The humanoid robot of claim 1, wherein the torso energy attenuation member includes a first region with a first hardness and a second region with a second hardness that is greater than the first hardness.

22. The humanoid robot of claim 11, wherein the cover includes a textile material designed to provide the humanoid robot with an approachable appearance.

23. The humanoid robot of claim 11, further comprising a torso and a torso energy attenuation member, wherein the torso energy attenuation member:

(i) is disposed about at least a portion of the torso, and (ii) includes a plurality of lattice cells.

24. The humanoid robot of claim 11, wherein the humanoid robot includes a coronal plane and a head coupled to a neck, and wherein the head comprises:

(i) a frontal shell with a rear edge, (ii) a rear shell with a frontal edge, and (iii) wherein a seam formed between a portion of the frontal edge and a portion of the rear edge is positioned at a non-zero angle relative to the coronal plane.

25. The humanoid robot of claim 11, further comprising an electric actuator with an inductive encoder.

* * * * *